June 16, 1931.  F. LJUNGSTRÖM  1,810,282
POWER TRANSMISSION
Original Filed Oct. 4, 1926   18 Sheets-Sheet 6
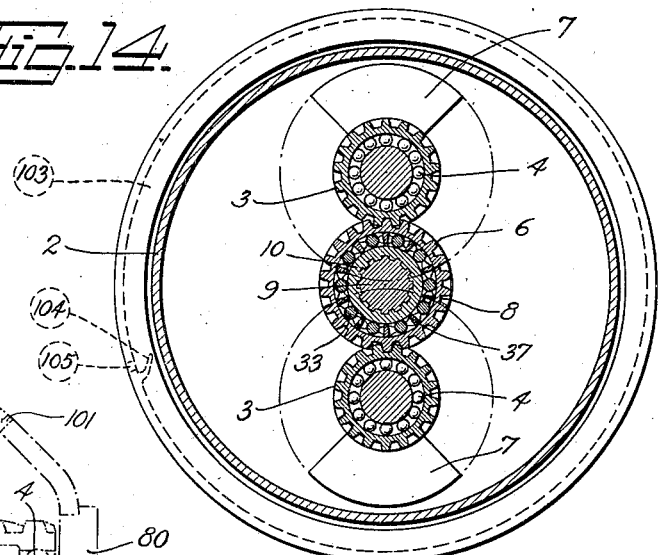
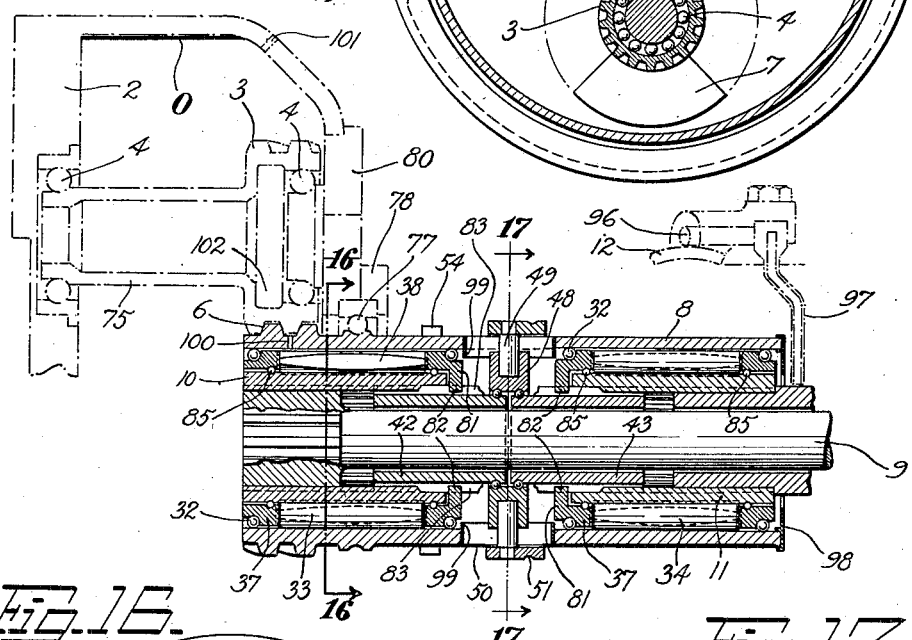
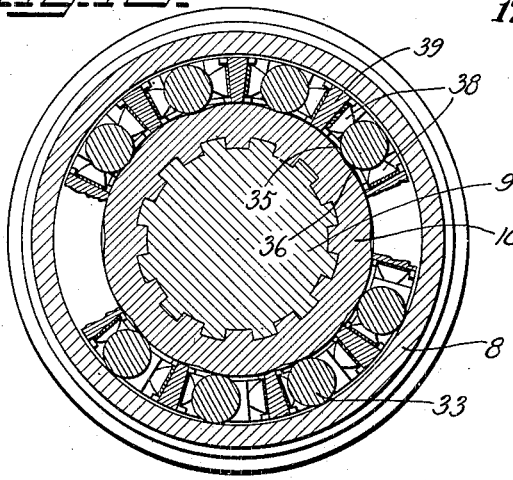
INVENTOR
Fredrik Ljungström
BY
N. T. Hedlund
his ATTORNEY

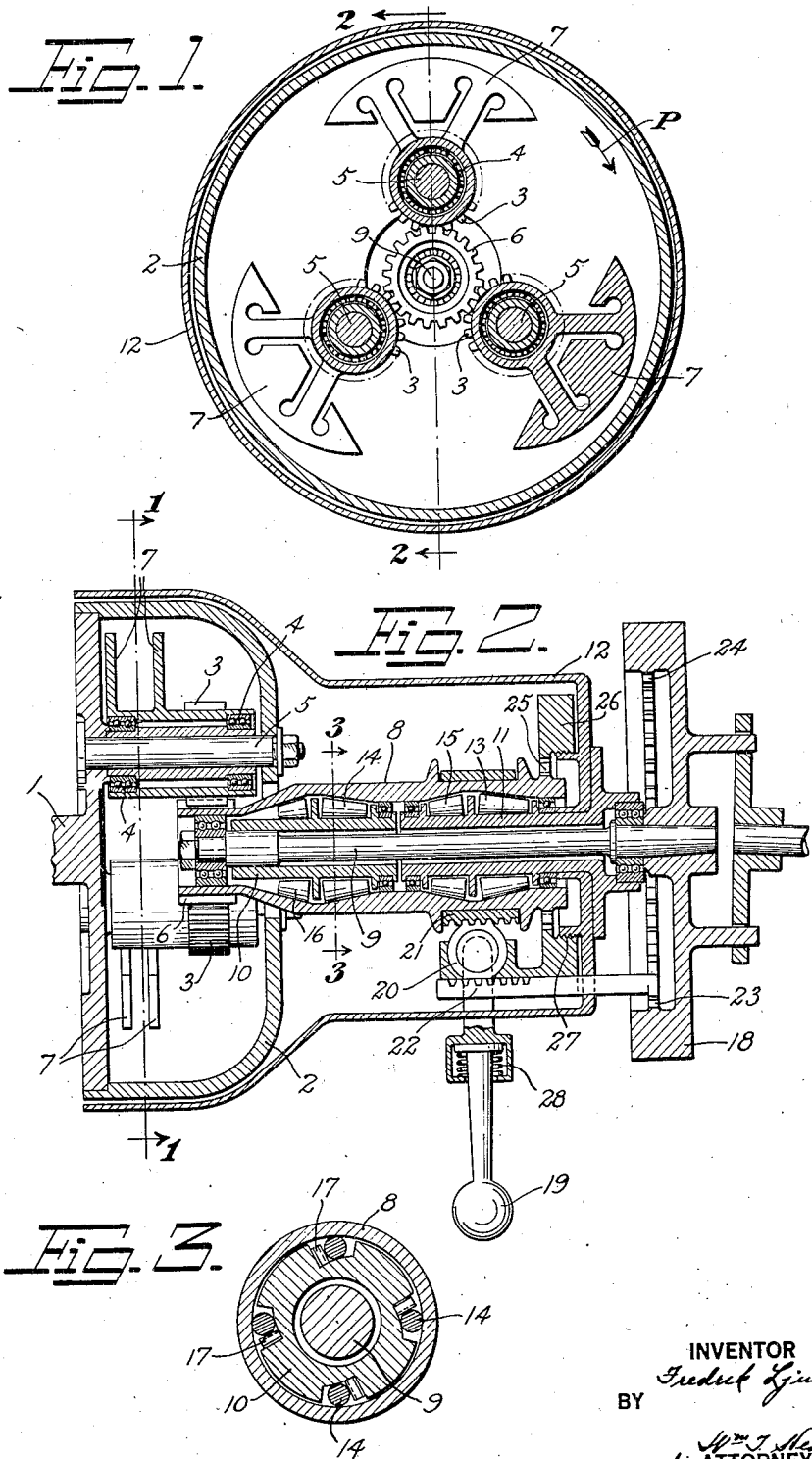

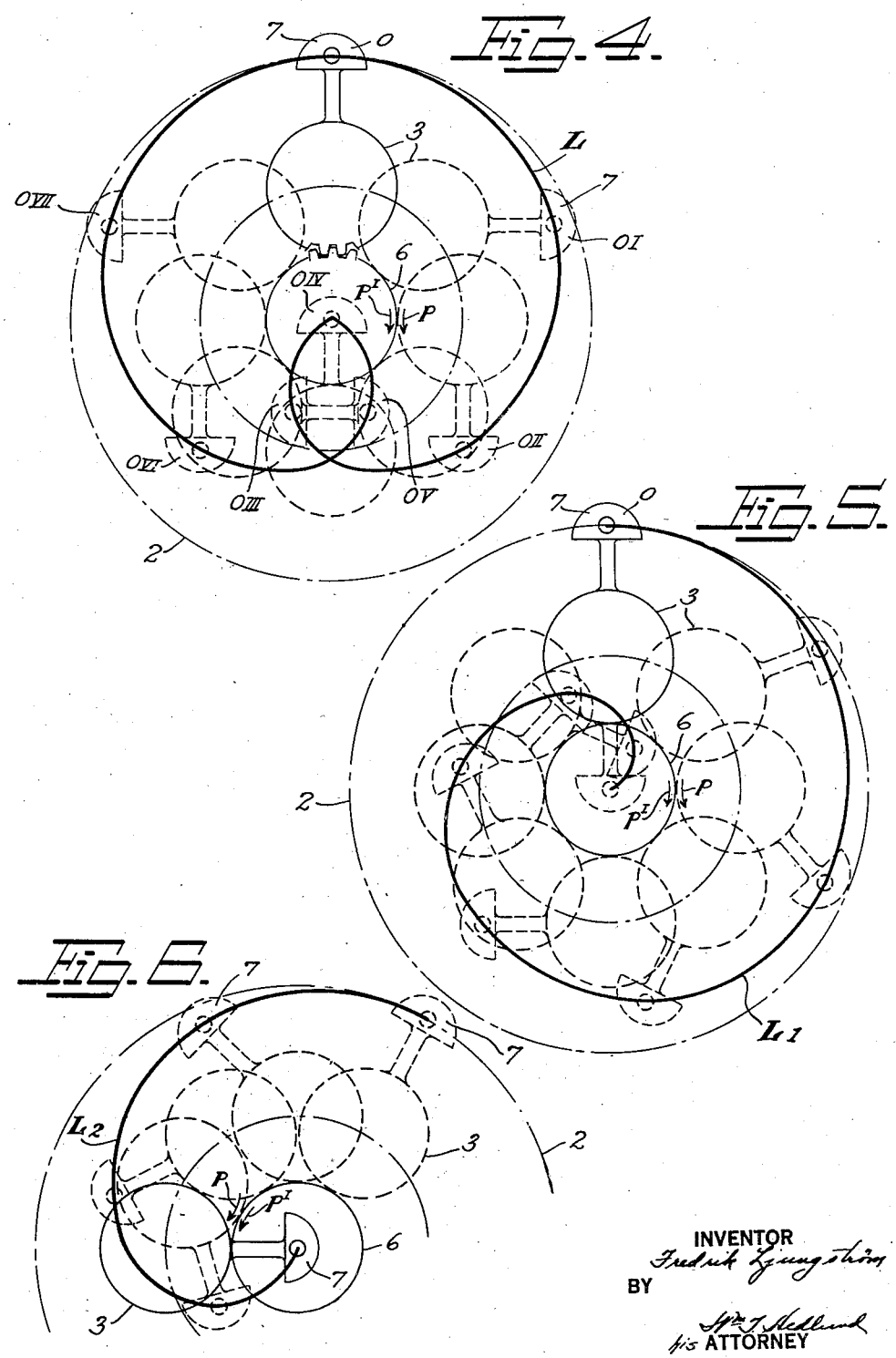

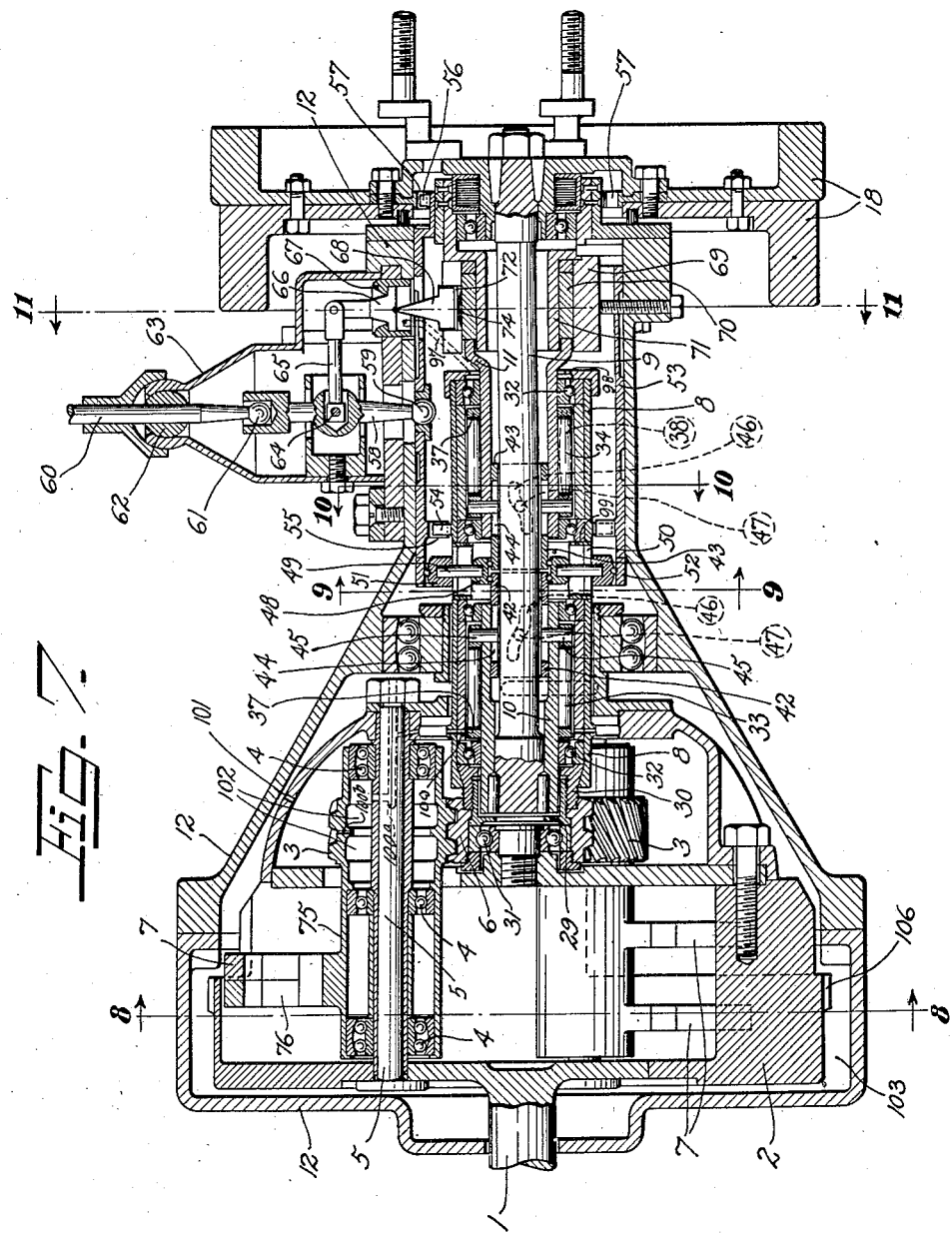

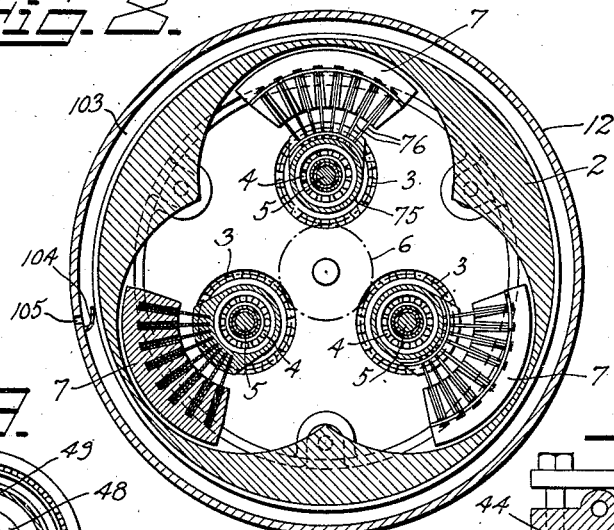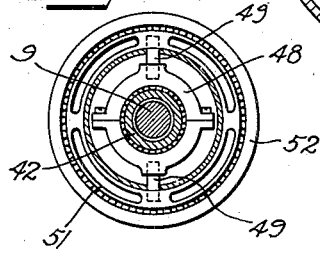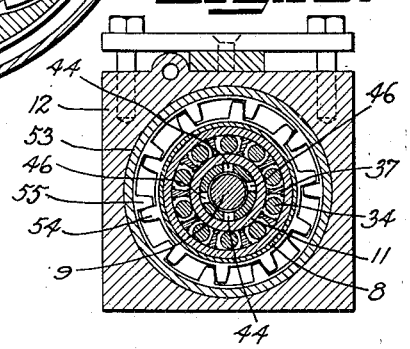

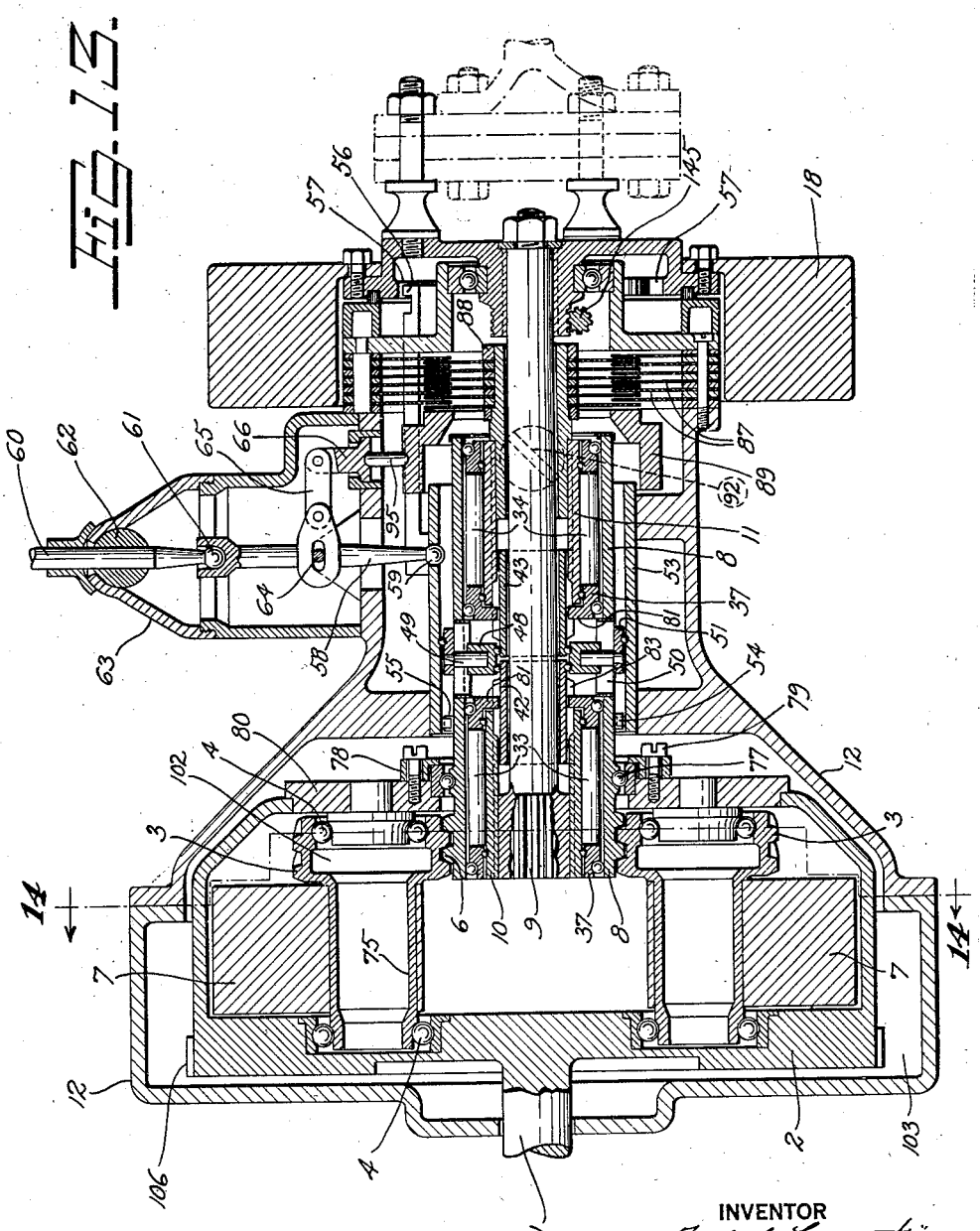

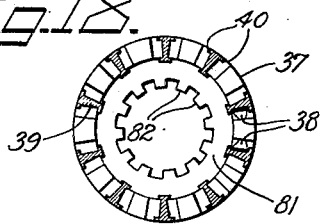
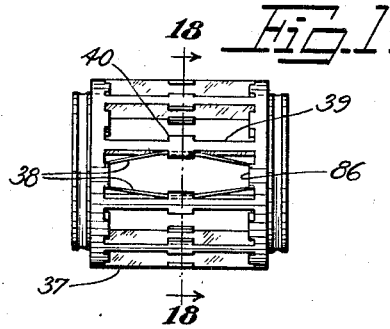
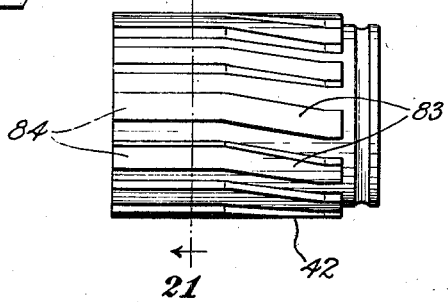
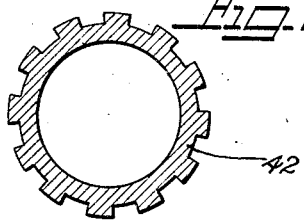
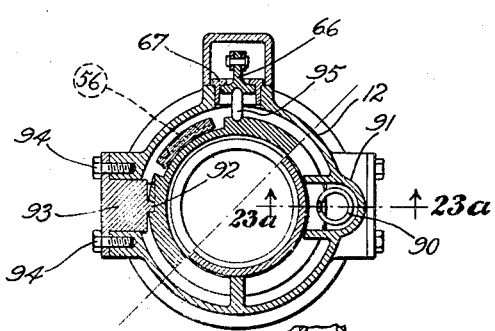
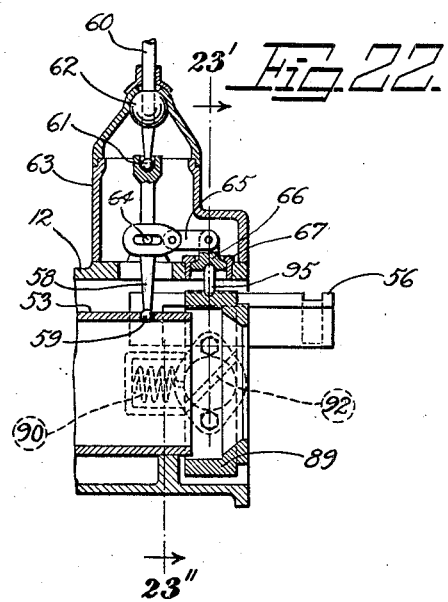
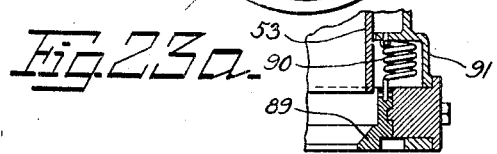
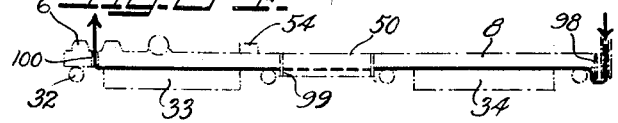

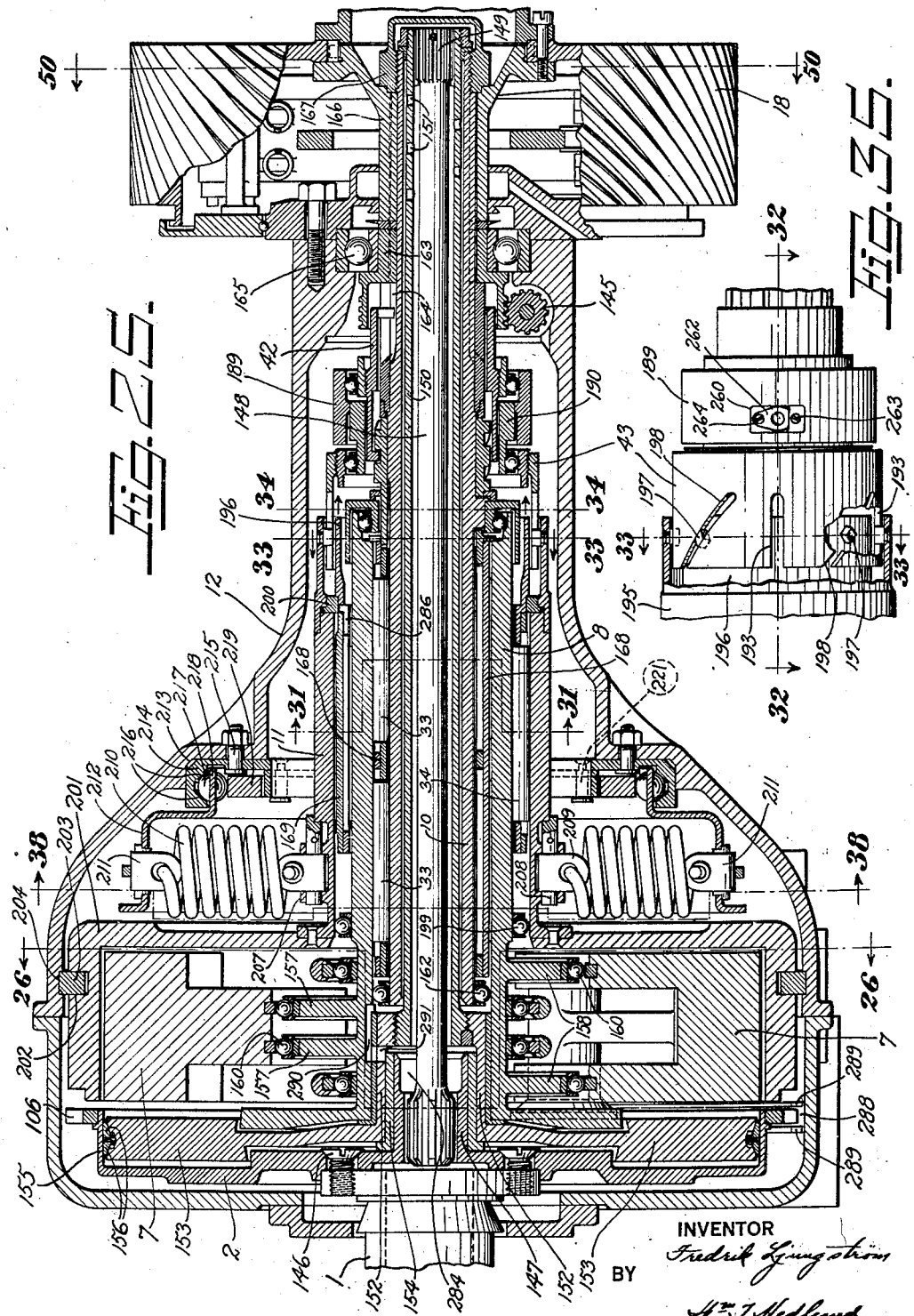

June 16, 1931.  F. LJUNGSTRÖM  1,810,282
POWER TRANSMISSION
Original Filed Oct. 4, 1926   18 Sheets-Sheet 9
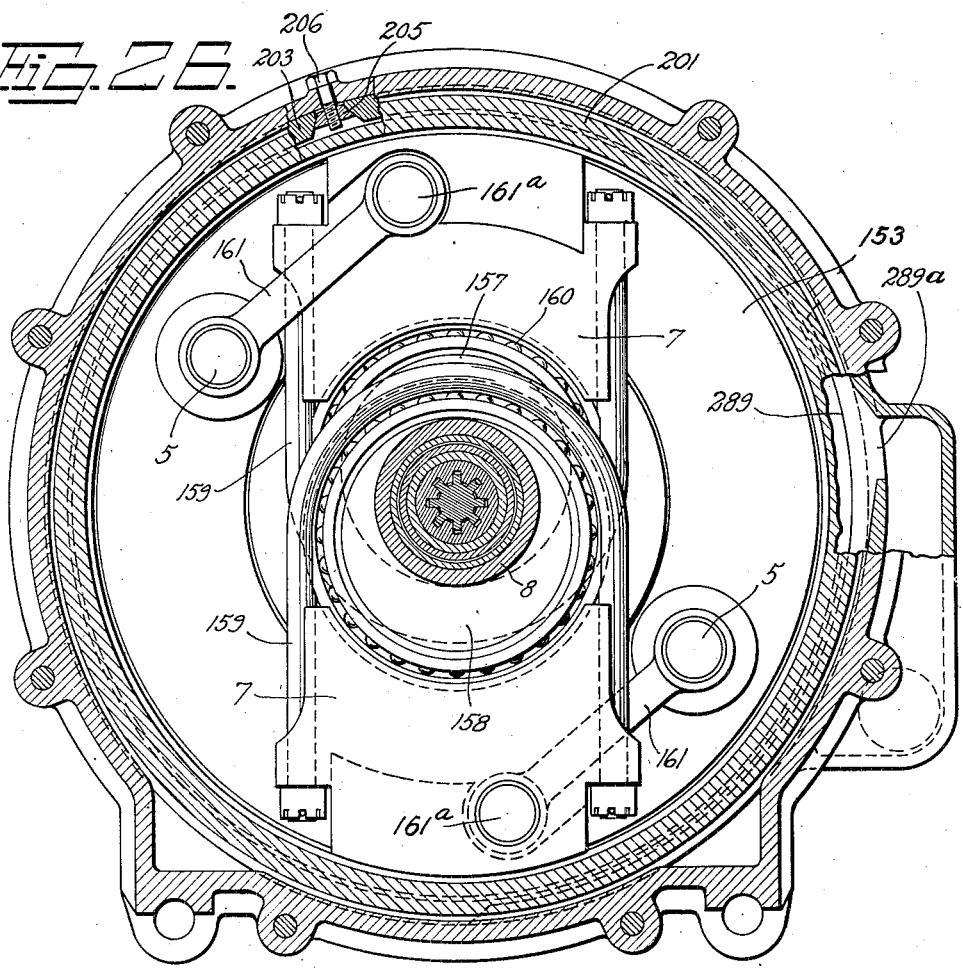
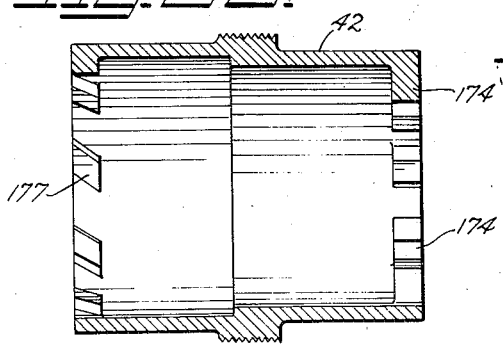
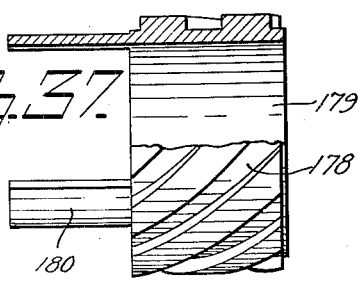
INVENTOR
Fredrik Ljungström
BY
Wm T Hedlund
his ATTORNEY June 16, 1931.    F. LJUNGSTRÖM    1,810,282
POWER TRANSMISSION
Original Filed Oct. 4, 1926    18 Sheets-Sheet 10
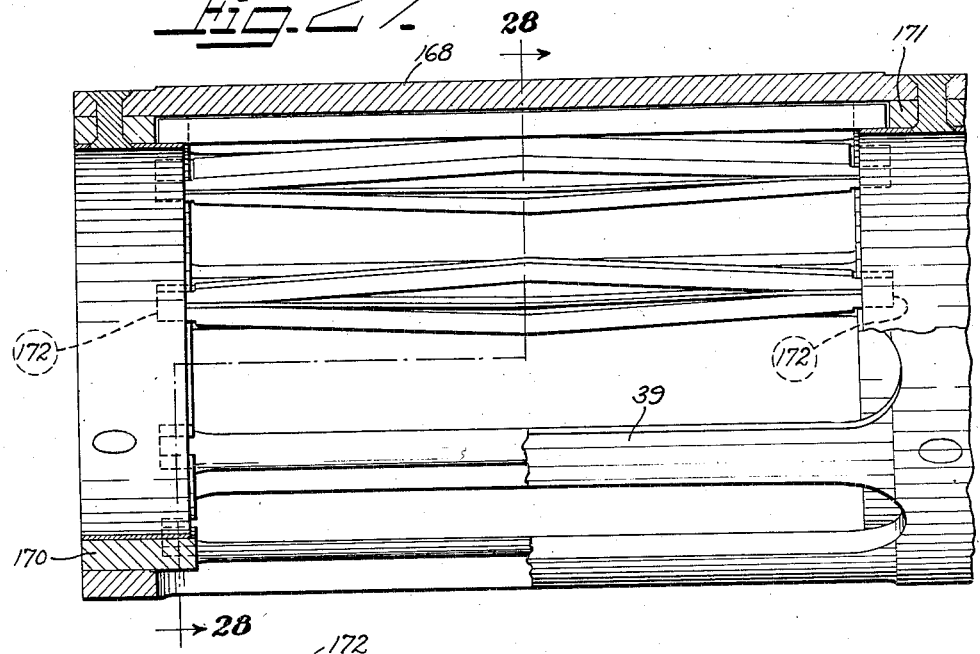
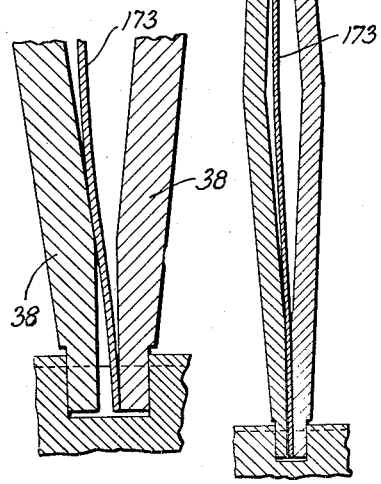
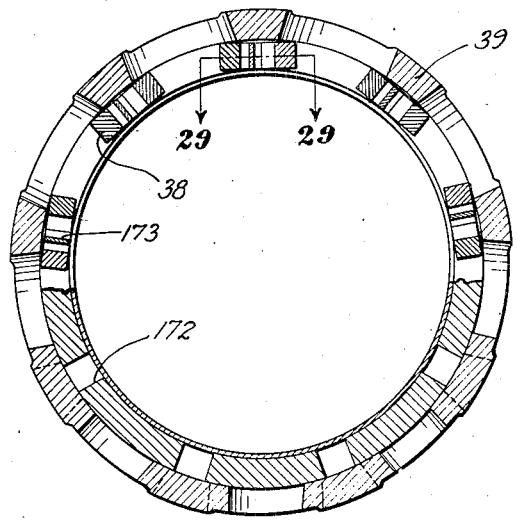
INVENTOR
Fredrik Ljungström
BY
his ATTORNEY June 16, 1931.  F. LJUNGSTRÖM  1,810,282
POWER TRANSMISSION
Original Filed Oct. 4, 1926   18 Sheets-Sheet 11
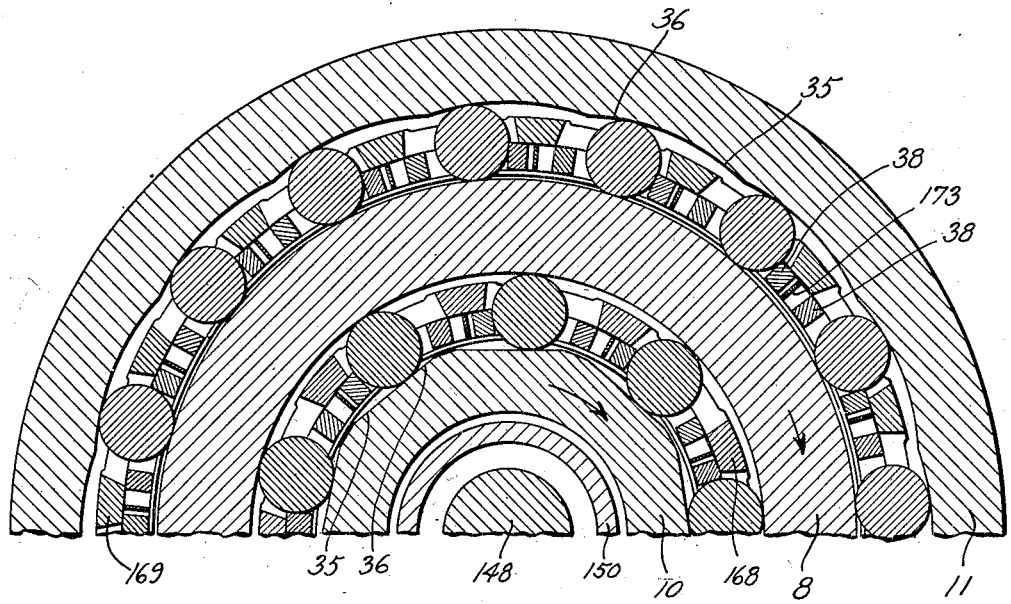
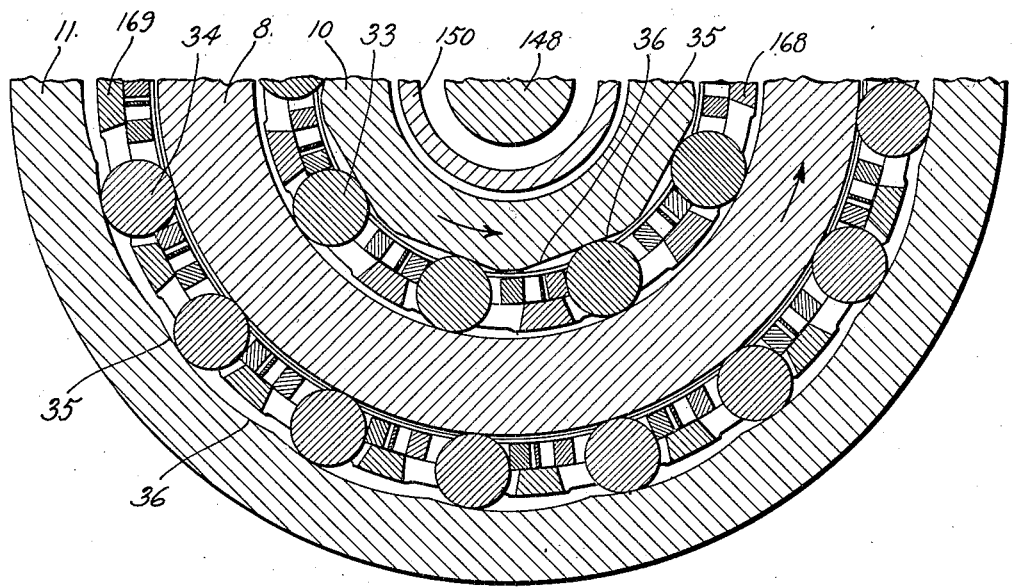

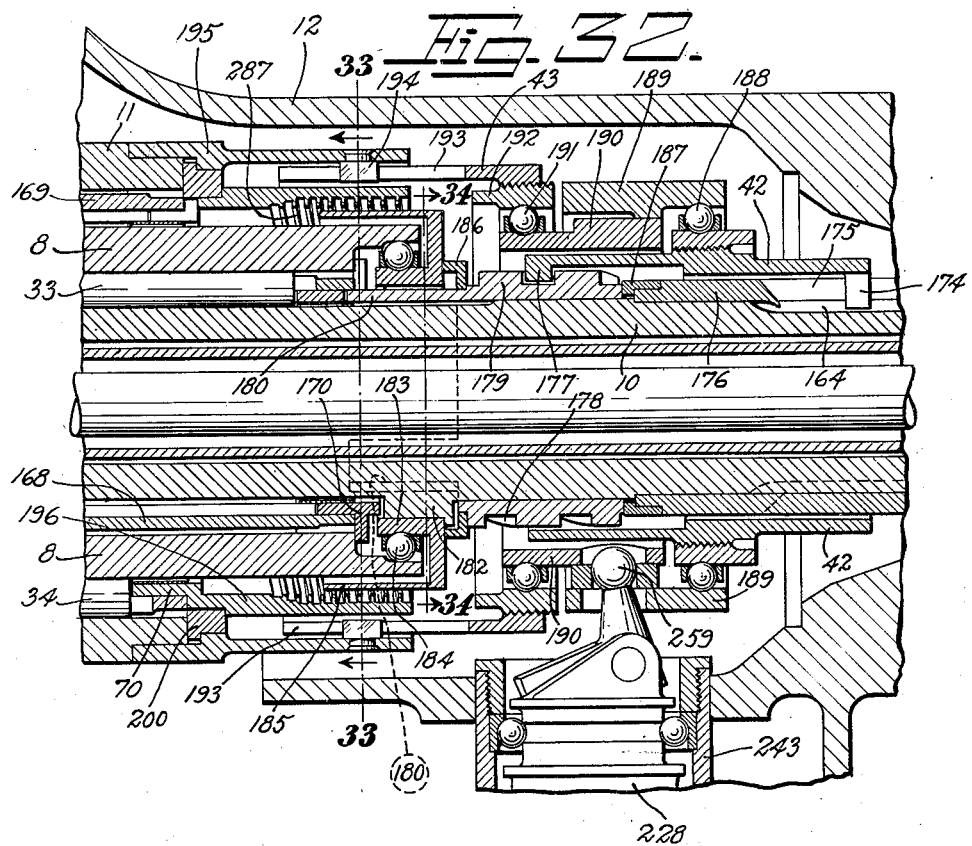
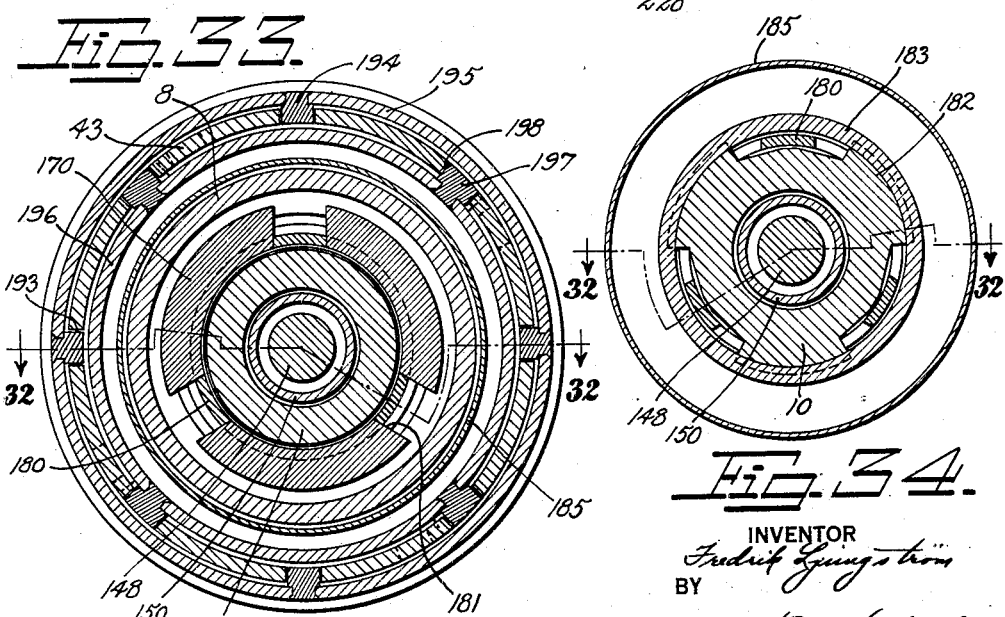

June 16, 1931.  F. LJUNGSTRÖM  1,810,282
POWER TRANSMISSION
Original Filed Oct. 4, 1926   18 Sheets-Sheet 13

INVENTOR
Fredrik Ljungström
BY
Wm T Hedlund
his ATTORNEY

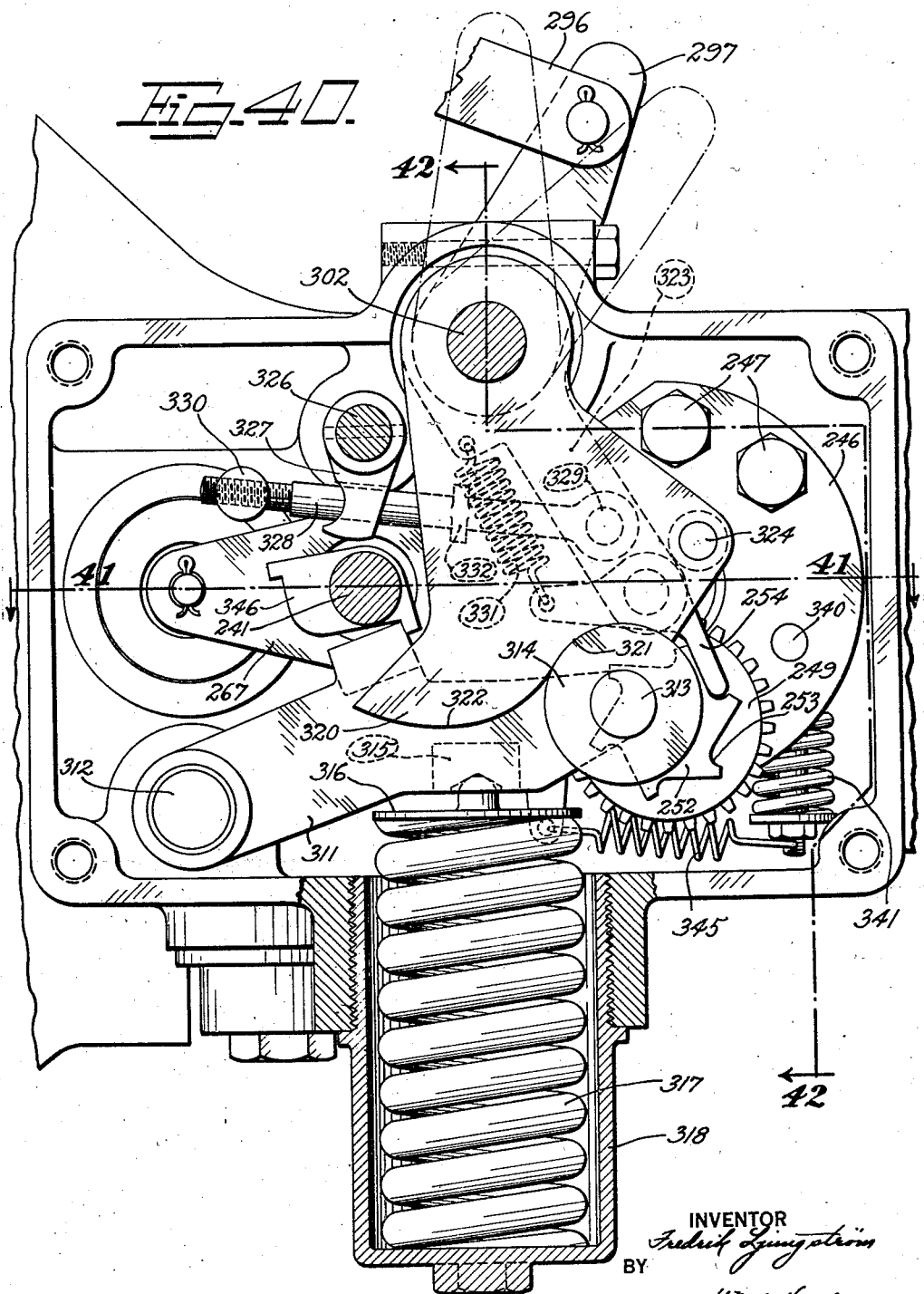

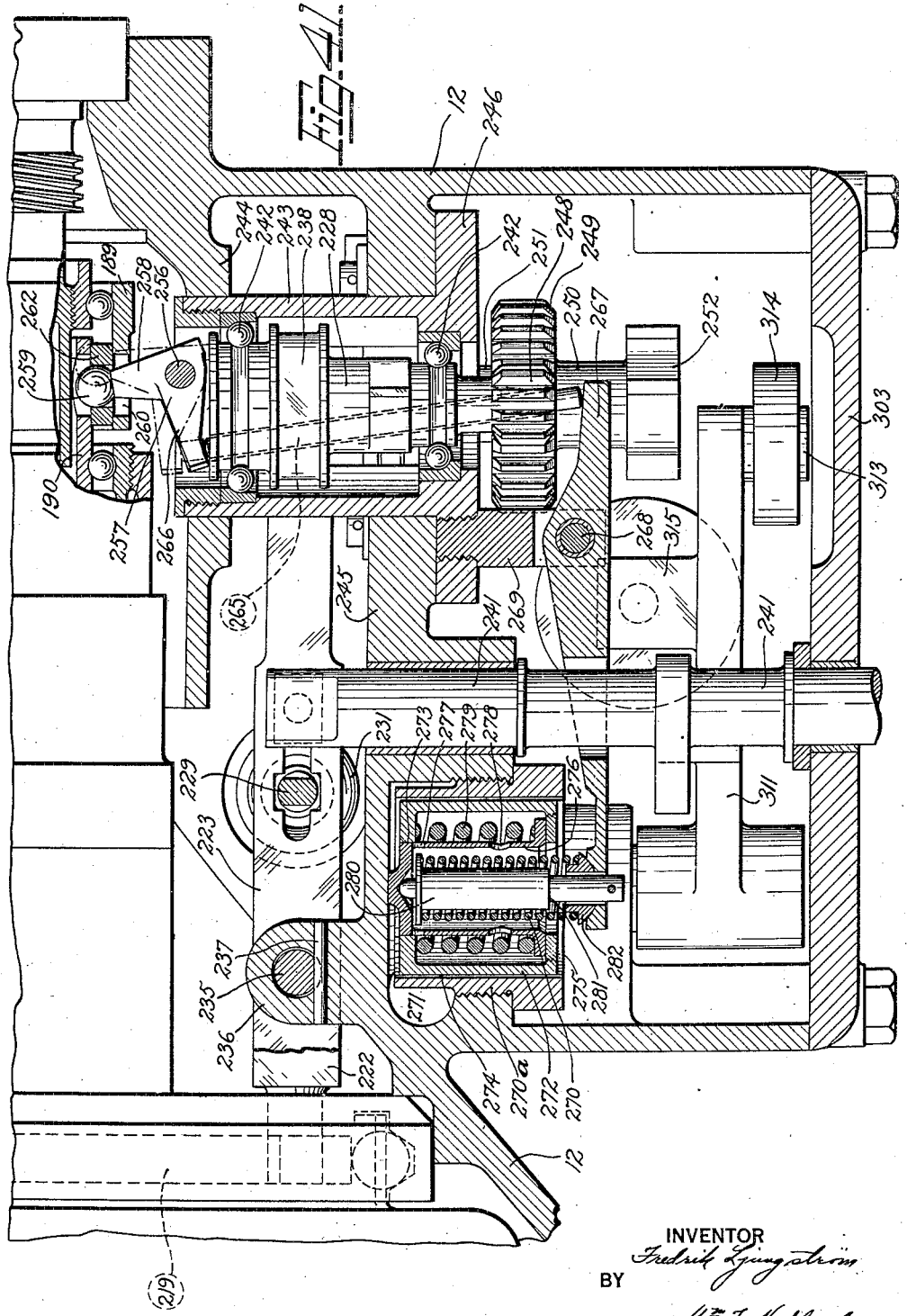

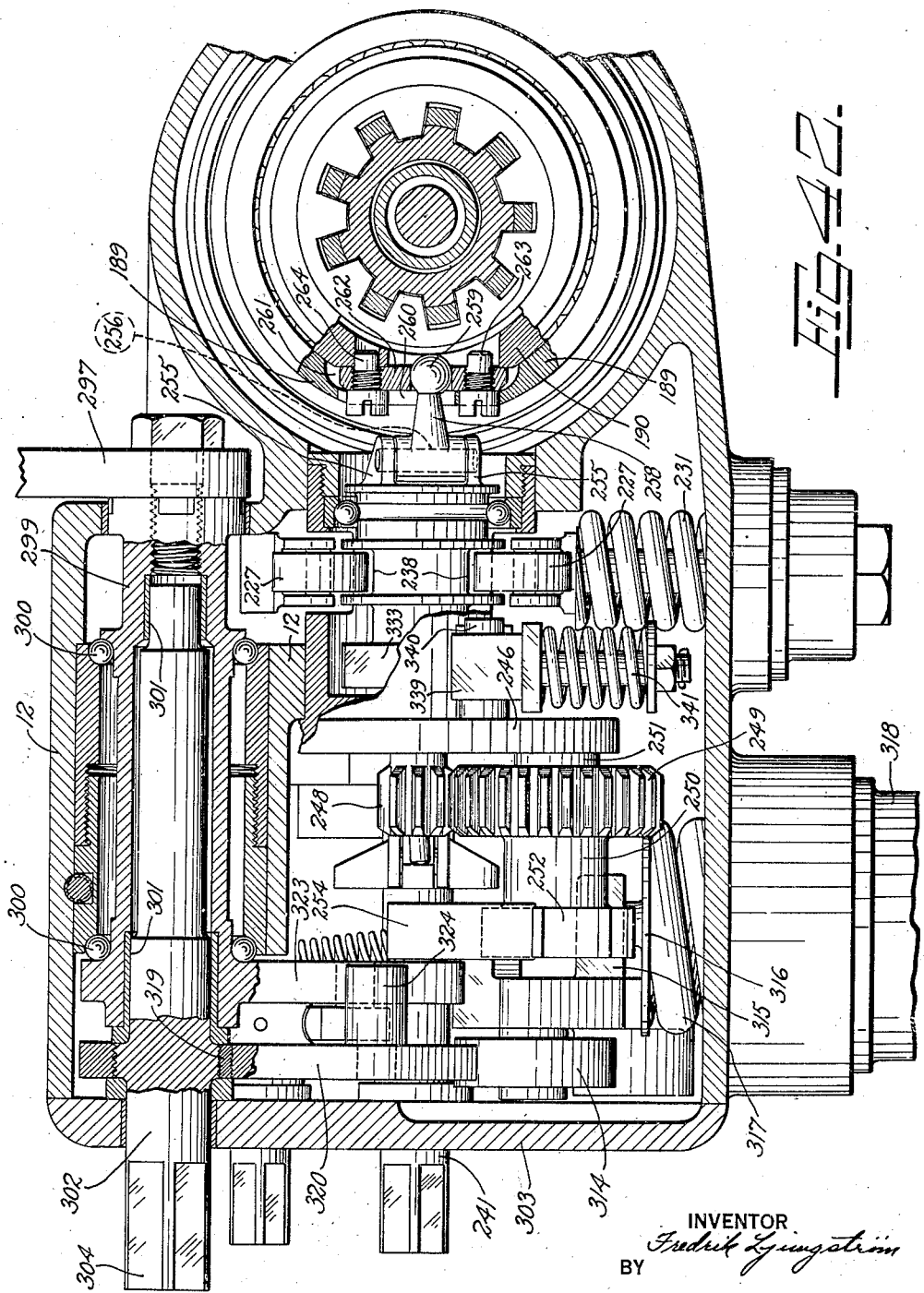

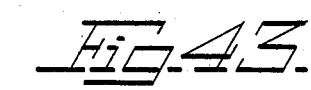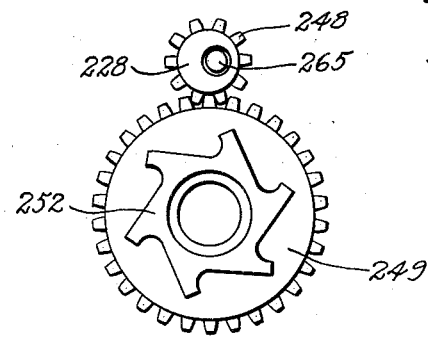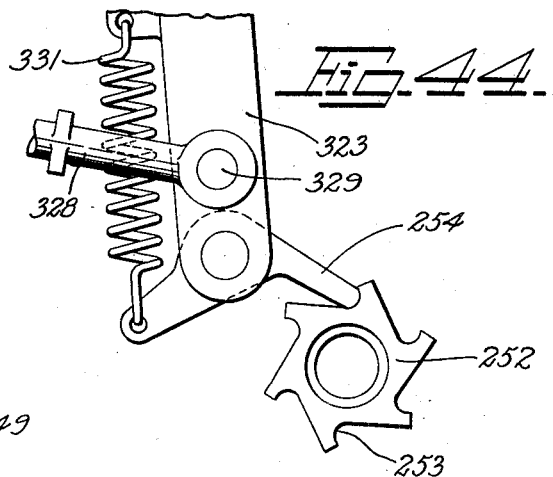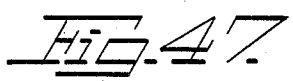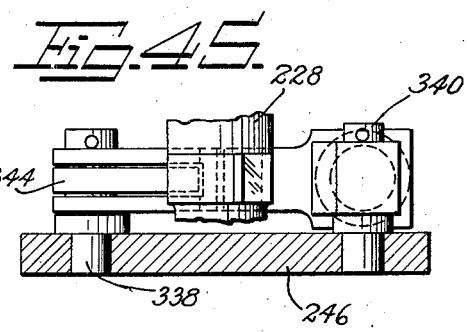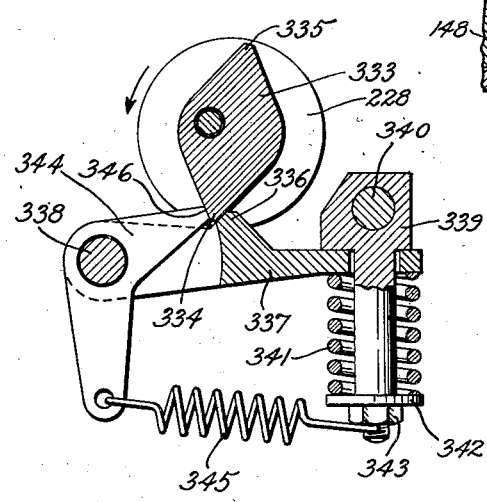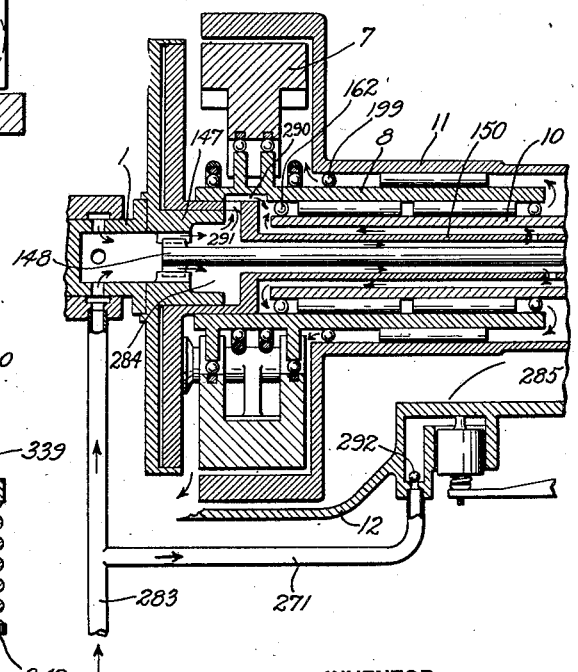

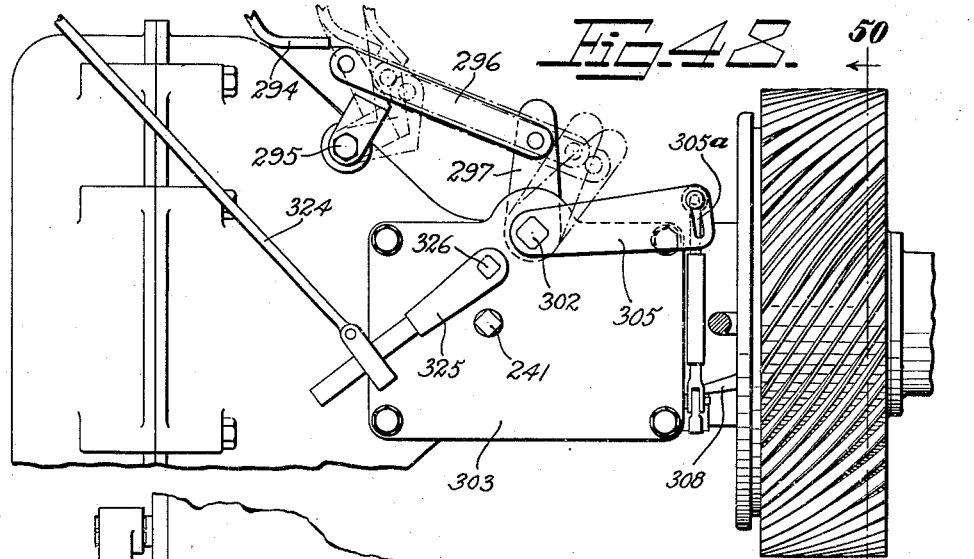
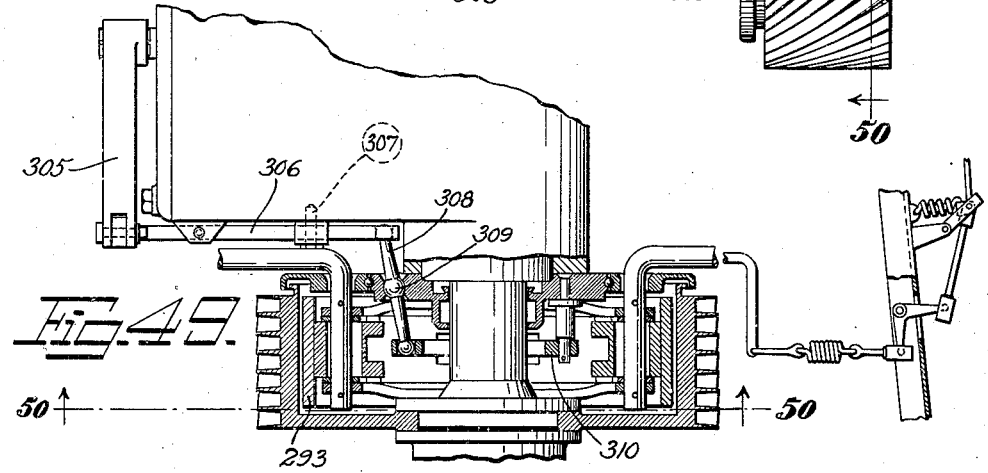
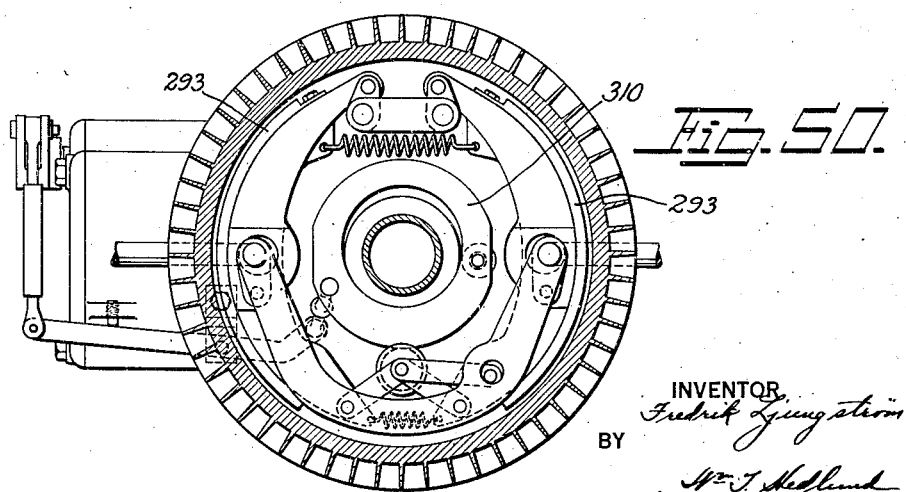

Patented June 16, 1931

1,810,282

UNITED STATES PATENT OFFICE

FREDRIK LJUNGSTRÖM, OF LIDINGO, SWEDEN, ASSIGNOR, BY MESNE ASSIGNMENTS, TO PED, INCORPORATED, A CORPORATION OF DELAWARE

POWER TRANSMISSION

Continuation of application Serial No. 139,420, filed October 4, 1926, and in Sweden October 14, 1925. This application filed November 14, 1929. Serial No. 407,236.

This application replaces and is a continuation of my copending application Serial No. 139,420, filed October 4th, 1926, and is to be considered as relating back thereto for common subject matter and to have all rights accruing as a result of the filing on October 4th, 1926, of said application Serial No. 139,420, and all rights incident to the filing of applications in foreign countries corresponding to said application Serial No. 139,420.

The present invention relates to power transmissions. More particularly, the invention relates to power transmissions employing one-way clutches, and still more particularly the invention relates to variable-speed transmissions having infinitely variable ratio.

The invention is particularly applicable to automobiles, though it will become obvious that it is not limited to such application.

One object of the invention is to improve that type of transmission in which a mechanism actuated by a uni-directional rotary member produces turning moments of opposite sense or direction. In one phase of the invention, I improve this type of transmission by segregating the turning moments of different sense before transmission to the driven element and transmitting moments of one sense to the driven element by improved clutch mechanism capable of transmitting forces efficiently and without lost motion or play between parts. I further improve the general construction of such transmissions.

A further object is to provide means for efficiently and readily reversing a transmission of the type in which turning moments of opposite sense are produced. A still further object is to relieve stresses in the transmission before and during reversal.

Other objects include: providing transmission mechanism which automatically checks backward movement of an automobile if it is brought to a stop on an up grade, without requiring the application of brakes, yet which permits ready reversal of the transmission at times when the transmission is holding the automobile against backward movement down grade; to provide means for relieving stresses during reversal in a transmission permitting overrunning or freewheeling of parts; to provide a transmission of the opposite turning moment type in which the turning moments are segregated by a plurality of reversible one-way clutches; to provide a transmission of this type in which reversal is effected by the concurrent reversal of the one-way clutches through the medium of a single control mechanism; to provide a single releasable coupling means through which the non-driving turning moments are directed to a relatively fixed abutment in either adjusted position of the clutch mechanism; to provide means for relieving stresses on the clutch mechanism before alteration of the position thereof by releasing said coupling means; to provide efficient lubrication of devices of the character set forth; to provide means, in devices of the character set forth, for preventing reversal unless parts thereof are at rest or substantially at rest; to provide a variable speed transmission of infinite ratio and ratio variable in any degree which is practical, sturdy, flexible and efficient; and to provide a transmission of the opposite turning moment type in which the coordination of the several functions of the transmission and its inherent overrunning or freewheeling characteristic makes it particularly adaptable for use in a simplified system of control enabling an automobile to be operated through the medium of a single control member under any driving conditions which may be encountered.

Further objects and the nature and advantages of the invention will become apparent on consideration of the following description taken in conjunction with the accompanying drawings forming part of this specification, which drawings show several embodiments of the invention, of which:

Fig. 1 is a view of one form of transmission embodying the invention, taken on the line 1—1 of Fig. 2;

Fig. 2 is a central longitudinal section of the transmission taken on the line 2—2 of Fig. 1;

Fig. 3 is a section of a part of the device taken on the line 3—3 of Fig. 2;

Fig. 4 shows diagrammatically the path of the center of gravity of an inertia mass employed in the transmission shown in Fig. 1 when the driven shaft is stationary;

Fig. 5 shows such path when the driven shaft rotates at half drive shaft speed and in the same direction;

Fig. 6 shows such path for a condition of reverse drive;

Fig. 7 is a central longitudinal section of another form of transmission embodying the invention;

Figs. 8 to 11 are sections taken on the respectively numbered section lines of Fig. 7;

Fig. 12 (a) is a quarter section on an enlarged scale taken transversely through the clutch mechanism and illustrating the mechanism in one position of adjustment;

Fig. 12 (b) is a view similar to Fig. 12 (a) showing the clutch mechanism in another position of adjustment;

Fig 13 is a central longitudinal section showing a third embodiment of the invention;

Fig. 14 is a section taken on the line 14—14 of Fig. 13;

Fig. 15 is a longitudinal section, on an enlarged scale, of the clutch mechanism shown in Fig. 13;

Figs. 16 and 17 are sections taken on the respectively numbered section lines of Fig. 15;

Figs. 18 and 19 are transverse section and side elevation views of the roller cages employed in the clutch mechanism;

Figs. 20 and 21 are respectively side elevation and transverse sections of a roller cage adjusting sleeve;

Fig. 22 is a fragmentary longitudinal section of a part of the mechanism shown in Fig. 13;

Fig. 23 is taken partly on the line 23' of Fig. 22 and partly on the line 23" of Fig. 22;

Figure 38:
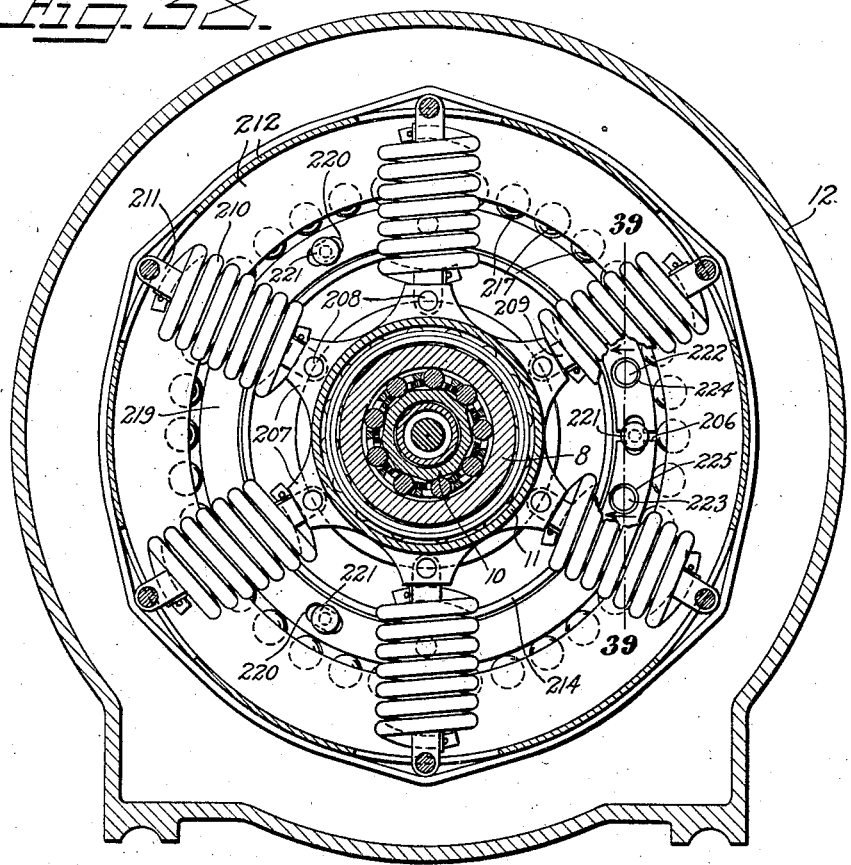
Figure 39:
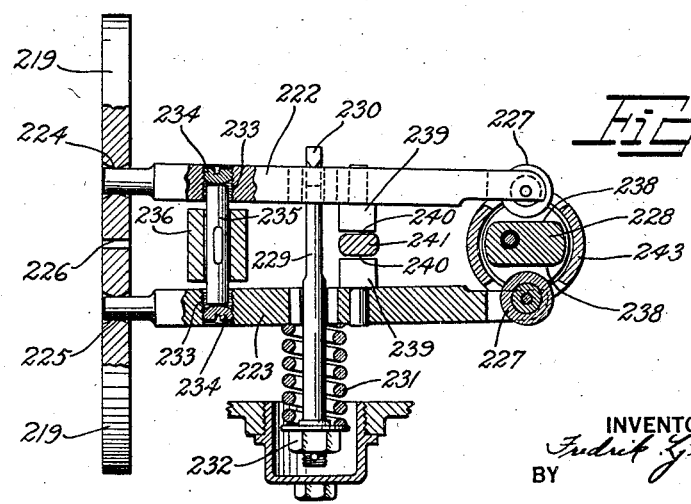

Fig. 23ª is a fragmentary section taken on the line 23ª—23ª of Fig. 23;

Fig. 24 is a diagram illustrating the path of flow of lubricant through the forms of transmission shown in Figs. 7 and 13;

Fig. 25 is a central longitudinal section drawn to scale of still another form of transmission which has been used on an automobile with a motor capable of developing about 50 h. p.;

Fig. 26 is a transverse section taken on the line 26—26 of Fig. 25;

Fig. 27 is a fragmentary side elevation partly in section and on an enlarged scale of a roller cage;

Fig. 28 is a section taken on the line 28—28 of Fig. 27;

Fig. 29 is a section taken on the line 29—29 of Fig. 28;

Fig. 30 is a fragmentary section similar to Fig. 29 and on an enlarged scale illustrating in exaggerated form the clearances obtaining in parts of the structure;

Fig. 31 (a) is a transverse quarter section on an enlarged scale taken on the line 31—31 of Fig. 25 and showing the roller clutches in one position of adjustment;

Fig. 31 (b) is a view similar to Fig. 31 (a), showing the roller clutches in the opposite position of adjustment;

Fig. 32 is a fragmentary longitudianl section on an enlarged scale showing a part of the clutch shifting mechanism, this section being taken generally normal to the plane of Fig. 25 along the lines 32—32 of Figs. 33, 34 and 35;

Figs. 33 and 34 are transverse sections taken along the respectively numbered section lines of Figs. 25 and 32;

Fig. 35 is a fragmentary elevation of the clutch shifting mechanism shown in Fig. 32, parts being broken away for the sake of clarity;

Fig. 36 is a longitudinal section of one of the clutch shifting elements;

Fig. 37 is a side elevation partly in section of another clutch shifting element;

Fig. 38 is a transverse section taken on the line 38—38 of Fig. 25;

Fig 39 is a section taken on the line 39—39 of Fig. 38;

Fig. 40 is an elevation on an enlarged scale of the transmission control mechanism as seen in Fig. 48, with the housing cover plate removed;

Fig. 41 is a section on an enlarged scale on the line 41—41 of Fig. 40, certain parts being omitted for clearness;

Fig. 42 is a section on an enlarged scale taken on the line 42—42 of Fig. 40, and with certain parts broken away;

Figs. 43 to 46 are enlarged fragmentary views illustrating parts of the mechanism shown in Figs. 40 to 42;

Fig. 47 is a diagrammatic sectional representation of the transmission illustrating the lubricating system thereof;

Fig. 48 is a side elevation of the transmission shown in Fig. 25, showing the external control members;

Fig. 49 is a plan view partly in section of the structure shown in Fig. 48; and

Fig. 50 is a section taken on the lines 50—50 of Figs. 25, 48 and 49.

Referring more particularly to Figs. 1–3, the power transmission shown comprises a driving shaft 1. Shaft 1 may, for instance, be the crank shaft of an automobile engine. A hollow fly-wheel 2 is secured to shaft 1. Mounted within the fly-wheel are three planetary pinions 3 supported by means of ball bearings 4 on three parallel axially-extending studs 5. Studs 5 are mounted in the fly-wheel so as to move therewith and are spaced equi-distant from the fly-wheel axis. A central gear-wheel 6 is mounted co-axially with fly-wheel 2 in a manner presently to be explained.

Integral with pinions 3 and axially to one side thereof are eccentric weights or masses 7 which I will herein term inertia masses. The inertia masses 7 rotate with pinions 3 about studs 5. The inertia masses comprise projecting members, as shown, which are axially displaced relative to each other so that the inertia masses on different studs can move past each other at the center axis of the transmission, that is, the axis of shaft 1.

If driving shaft 1 is rotated and gear-wheel 6 is held stationary, studs 5 move with the fly-wheel and the inertia masses 7 rotate around the studs 5, alternately being positioned at the periphery and at the center of the planetary system. The speed of rotation of the inertia masses for a given speed of rotation of driving shaft 1 depends on the relative diameters of gear-wheel 6 and pinions 3. With equal diameters, as shown, and with gear-wheel 6 stationary and driving shaft 1 rotating, each inertia mass will travel in a path represented by the heavy line L in Fig. 4. If, under these conditions, central gear-wheel 6 is rotated in one direction or the other, the speed of rotation of the inertia masses will be increased or decreased and the path of travel will be altered accordingly.

When the central gear-wheel 6 is held stationary and driving shaft 1 is rotated, each inertia mass travels through a cycle, passing through the successive positions O, OI, OII, OIII, OIV, OV, OVI and OVII and then returning to position O, as shown in Fig. 4. The positions of the center of gravity of the inertia mass determine a curve and the mass exerts a centrifugal force which, in any given position, is directed outwardly at right angles to the tangent to the curve at the point represented by such position. Consequently, and as is evident from consideration of Fig. 4, when the inertia masses move from their outermost positions toward the center, they exert a turning moment on the central gear-wheel 6 in the direction of rotation of the driving shaft; and, when they move from the center outwardly and back to their outermost positions, they exert an opposite turning moment on the central gear-wheel 6 tending to move it in the direction of rotation opposite to that of the driving shaft. Thus the rotation of the driving shaft causes the planetary mechanism including the inertia masses to alternately produce turning moments of opposite sense which are applied to gear-wheel 6.

The opposite turning moments applied to gear-wheel 6 are segregated as will be presently explained by what I term clutch mechanism, turning moments of one sense or direction being transmitted to the driven shaft and turning moments of the opposite sense or direction being transmitted to a fixed portion of the transmission and absorbed or neutralized.

Assume, now, that the driven shaft has a rotational speed in the same direction as and half as fast as the speed of driving shaft 1, and that the speed of gear 6 is the same as the speed of the driven shaft. Under such conditions, the inertia masses each have a path of travel represented by the heavy line $L_1$ in Fig. 5.

It will be seen that the form of the curve of travel of the inertia masses varies with different relative speeds of the driving shaft and gear-wheel 6, the curve being more gradual and requiring more revolutions of the driving shaft for completion from outer to inner positions with increase of speed of gear-wheel 6 up to the condition of equalized speed. With the apparatus illustrated, this curve is formed in one-half a revolution of the driving shaft when gear-wheel 6 is stationary. It is formed in one revolution when the speed of gear-wheel 6 is one-half the speed of the driving shaft. When the gear-wheel speed has increased to equal the speed of the driving shaft, the curve has become a circle concentric with the axis of the planetary system. When the speeds are equalized, each inertia mass assumes a position between the limit positions which depends on the value of the turning moment required to revolve the driven shaft. Such position may be, for example, that represented at OI or OII in Fig. 4. In this position, the centrifugal force of the inertia mass exerts a turning moment on the planetary pinion acting in the direction of the arrow $p$, which is transmitted to the central gear-wheel 6 in the direction of the arrow $P^I$.

When the centrifugal force of the inertia masses balances the load torque on the driven shaft, the rotary motion of the inertia masses about studs 5 ceases and the transmission acts to provide direct drive between the driving and driven shafts.

The clutch mechanism comprises a plurality of reversible one-way clutches having a common clutch sleeve 8 which carries or is attached to central gear-wheel 6. Disposed within clutch sleeve 8 are two inner clutch sleeves 10 and 11. Within clutch sleeves 10 and 11 is the driven shaft 9. Clutch sleeve 10 is rigidly secured to driven shaft 9. Clutch sleeve 11 is secured to the frame or casing 12 of the transmission.

Interposed between the outer clutch sleeve 8 and inner clutch sleeves 10 and 11 are four sets of conical rollers or roller detents 13, 14, 15 and 16. The rollers are located in pockets or recesses in the inner sleeves (Fig. 3) having inner surfaces of varying radial distance from the axis of the concentric members 8, 9, 10 and 11 forming inclined wedging or gripping surfaces for wedging the rollers between the sleeves. Springs 17 in the pockets act against the rollers tending to move them to the shallow parts of the pockets into gripping position.

The sets of rollers 13 and 14 are intended for one direction of rotation, which we may assume to be forward and the sets of rollers 15 and 16 are intended for rotation in the opposite direction which we may assume to be reverse.

Sleeve 8 is axially shiftable and constructed with internal conical surfaces so as to permit simultaneous engagement of rollers 13 between clutch sleeves 8 and 11 and rollers 14 between clutch sleeves 8 and 10 or, in the alternative, engagement of rollers 15 between clutch sleeves 8 and 11 and rollers 16 between clutch sleeves 8 and 10. The inclined inner surfaces of the pockets in which are placed rollers 13 are oppositely inclined to the inner surfaces of pockets containing rollers 14. Likewise the inclined inner surfaces of the pockets containing rollers 15 are oppositely inclined to the inner surfaces of the pockets containing rollers 16. Furthermore, the inclination of the inner pocket surfaces is in opposed sense in that the inner surfaces of the pockets containing rollers 13 are oppositely inclined to the inner surfaces of the pockets containing rollers 15 and the inner surfaces of the pockets containing rollers 14 are oppositely inclined to the inner surfaces of the pockets containing rollers 16.

Assume now that clutch sleeve 8 is moved to the left so that rollers 13 and 14 are in contact therewith. In this position, rollers 15 and 16 are inactive. Now assume that gear-wheel 6 is rotated clockwise, looking at Fig. 2 endwise from the left. This will rotate clutch sleeve 8 clockwise in Fig. 3. This will move the rollers 14 clockwise or tend to do so and jam them between the inner surface of sleeve 8 and the inner surfaces of the roller pockets causing sleeve 10 and consequently driven shaft 9 to rotate with sleeve 8. In this motion rollers 13 have no effect because the inner surfaces of the pockets containing rollers 13 are oppositely inclined and sleeve 8 would tend to move rollers 13 to deeper parts of the pockets and thus away from gripping contact. The clutch formed by parts 8, 11 and 13 is, during this action, disengaged or declutched, and overruns or free-wheels, that is to say, permits sleeve 8 to rotate freely in clockwise direction with respect to the stationary sleeve 11.

Now assume that an opposite turning moment is applied to gear-wheel 6 tending to reverse the rotation. As soon as sleeve 8 starts to reverse, it moves rollers 13 to shallower parts of their pockets thus jamming rollers 13 between sleeves 8 and 11. This takes place quickly on reversal, the action being practically instantaneous since rollers 13, in their non-gripping position, are held by springs 17 in such position that substantially no appreciable movement of the rollers is required before they grip upon reversal.

Since sleeve 11 is rigidly secured to the fixed framework 12, the jamming or gripping of rollers 13 prevents movement of sleeve 8. Thus gear-wheel 6 can rotate clockwise but not counter-clockwise. Sleeve 11 is a fixed clutch sleeve in contrast to sleeve 10 which may be termed a rotatable clutch sleeve.

The clutch formed by members 8, 11 and 13 is, in effect, a brake for preventing reverse movement.

While these members might herein be termed a brake, I prefer to call all the gripping devices clutches since they are of similar structure and have similar clutching actions.

While the gripping of parts 8, 11 and 13 is in effect, sleeve 10 and driven shaft 9 can, nevertheless, continue in clockwise rotation since the clutch formed by members 8, 10 and 14 will free-wheel or overrun under these conditions. That is, when sleeve 10 moves faster than sleeve 8 in clockwise direction, rollers 14 are unloosened and tend to move to deeper parts of the roller pockets.

Consequently, the alternate opposite turning moments received by gear-wheel 6 are segregated, clockwise or positive moments being transmitted to the driven shaft and counter-clockwise or negative moments being transmitted to the fixed frame. Thus, rotation of driving shaft 1 in the direction of the arrow P in Fig. 1 will result in rotation of the driven shaft only in the same direction P.

If sleeve 8 is moved to the right so as to engage rollers 15 and 16 and release rollers 13 and 14, the reverse effect takes place due to the aforementioned inclination of the gripping surfaces in opposed sense. Since rollers 16 cooperate with surfaces oppositely inclined to those shown in Fig. 3, counter-clockwise turning moments will be transmitted to sleeve 10 and shaft 9. Since rollers 15 cooperate with surfaces inclined similarly to those shown in Fig. 3, sleeve 8 cannot turn in clockwise direction.

Sleeve 8 is moved to the right or left to effect forward or reverse movement of the driven shaft by means of a hand lever 19. Hand lever 19 is pivotally mounted in the frame on the axis of rotation of wheel 20 which carries teeth meshing with teeth in a ring 21. Ring 21 is arranged so that sleeve 8 can rotate with respect thereto but so that axial movement of ring 21 causes axial movement of sleeve 8.

Connected to the driven shaft 9 is a flywheel 18 which equalizes the periodically acting impulses given to the driven shaft into practically uniform rotation. After a turning moment of one direction is applied to the driven shaft, the inertia of the fly-wheel 18 maintains rotation of the driven shaft in such direction while the opposite turning moment is being transmitted to the fixed casing members. This is advantageously effected because moments of only one sense or direction are transmitted to the driven shaft and the clutches including sleeve 10 can free-wheel or overrun when the opposite turning moments are being absorbed.

Clutch sleeve 10 may be said to be an action clutch sleeve and clutch sleeve 11 a reaction clutch sleeve. Looking at it from this point of view, it will be seen that none of the reactions are transmitted to the driven shaft. The reactions pass through members which are independent of and not united rigidly or flexibly with the driven shaft. Furthermore, the application of power to the driven shaft, either in forward or reverse direction, through the medium of an overrunning clutch, permits the driven shaft to overrun or free-wheel automatically in the direction of drive for which the transmission is adjusted.

It will be seen that the clutch mechanism comprises a plurality of one-way clutches, grouped in a plurality of clutch assemblies. One clutch assembly comprises sleeve 10, rollers 14 and 16 and the left-hand half (as shown) of sleeve 8. The other clutch assembly comprises sleeve 11, rollers 13 and 15 and the right-hand half (as shown) of sleeve 8. Treating each clutch assembly as an individual clutch, it may be said to constitute a reversible one-way clutch alternately capable of gripping in either direction and releasing in opposite directions; that is, when it grips on clockwise rotation, it releases on counter-clockwise rotation and, when it grips on counter-clockwise rotation, it releases on clockwise rotation. The direction of gripping of the individual clutches is selectively determined by movement of sleeve 8. The movement of sleeve 8 alters the clutches but the alteration is such that in either position (right or left hand position of sleeve 8 as shown) the clutch assemblies grip and release in opposed relation. The stationary or fixed elements forming the mass which receives the non-driving turning moments may be termed an abutment since it takes up the reactions. It will be seen that the sleeve 8 is an intermediate member separate from the driven shaft. The positive and negative turning moments are transmitted to this intermediate member and they are here divided, moments of one sense or direction being transmitted through a reversible one-way clutch to the driven shaft and moments of the other sense being transmitted through a second reversible one-way clutch to the abutment.

Since the centrifugal force exerted by a body moving in a curved path is directly proportional to the square of the speed of movement in the path, the turning moment exerted by the inertia masses due to centrifugal force is also directly proportional to the square of the speed of the weights. Consequently, if a transmission of this type is applied to an automobile, the driving power for the automobile is determined only by the speed of the inertia masses.

Fig. 6 shows a curve produced for reverse or counter-clockwise movement of gear-wheel 6 with clockwise movement of the driving shaft. It will be seen that the turning moment applied to the driven shaft decreases rapidly on increase of speed in reverse. This is due to the fact that increase of speed of the gear-wheel 6 in a direction opposite to the direction of drive of the planetary pinions 3 decreases the speed of the latter about their individual axes of rotation, thereby rapidly diminishing the value of the centrifugal forces developed by the inertia masses 7. This results in smooth backing of an automobile and tends to prevent the development of too rapid an acceleration or excessive speed in reverse.

An alteration of the clutch mechanism from forward to reverse position while the driven shaft is running in forward direction or a shift, during reverse movement, in the opposite direction, would result in a great strain on the parts tending to bring the driven shaft to a sudden stop which might result in a complete break down of the transmission. I have therefore provided means for preventing alteration of clutch mechanism to change the direction of rotation when the clutches are in motion. This means comprises a rack 22 having teeth meshing with teeth on wheel 20 and having teeth 23 at an end projecting within fly-wheel 18 which are adapted to pass between corresponding teeth 24 on the inner periphery of fly-wheel 18 when the fly-wheel is stationary. In the position shown in Fig. 2, clutch sleeve 8 does not engage either set of roller detents. When sleeve 8 contacts rollers 13 and 14 for forward rotation, teeth 23 must be at the right of teeth 24. When sleeve 8 contacts rollers 15 and 16 for reverse rotation, teeth 23 must be at the left of teeth 24. Since teeth 23 must pass between teeth 24 to reverse the clutch mechanism, reversal can only take place when the fly-wheel is stopped. Likewise teeth 25 on clutch sleeve 8 must pass between corresponding teeth on a stationary annular element 26 for reversal, which cannot take place unless clutch sleeve 8 is at rest.

In bringing the parts to rest it is not unlikely that teeth 23 and 25 stop opposite teeth 24 and corresponding teeth on element 26 rather than opposite the spaces between the teeth. This would prevent axial shifting of the parts. To take care of this, member 26 is mounted on threads 27 in frame 12 so that it can rotate. By moving lever 19 a slight amount rotationally, member 26 can be swung so that the teeth can pass each other when at rest. Threads 27 are of comparatively great pitch so that in case the teeth strike against each other while rotating, member 26 is moved on threads 27, thus causing an axial movement and preventing injury to the teeth. A resilient joint 28 is provided in lever 29 to prevent shock to the hand of the driver.

The form of transmission shown in Figs. 7-12 operates in the same general way as that shown in Fig. 2, like reference characters designating like parts. Reference character 1 again designates the driving shaft to which is secured the fly-wheel 2. The planetary pinions 3 and inertia masses 7 are carried on ball bearings 4 in turn carried on studs 5 mounted in the fly-wheel as in the previously described embodiment. Reference character 6 designates the central gear-wheel which meshes with planetary pinions 3 and which is secured to the common clutch sleeve 8. The clutch sleeve 8 is positioned around driven shaft 9. Between clutch sleeve 8 and driven shaft 9 are the rotatable clutch sleeve 10 and the fixed clutch sleeve 11 forming, together with roller detents, the one-way clutches. Reference character 12 again designates the fixed frame or casing, constituting part of the abutment, and in which is positioned the various parts of the transmission. A fly-wheel 18 is secured to the driven shaft 9.

In the present embodiment, the gear-wheel 6 is secured to the common clutch sleeve 8 by means of a flanged and threaded sleeve 29 which holds the gear-wheel 6 against another threaded sleeve 30, in turn secured to clutch sleeve 8. Also, clutch sleeve 8 is supported on the outer race ring of a ball bearing 31, the inner race of which is secured to the fly-wheel 2. Clutch sleeve 8 is journalled on ball bearings 32, the inner race rings of which are secured to the rotatable clutch sleeve 10 and to the fixed clutch sleeve 11 respectively.

In the present embodiment, each of the two clutch assemblies comprises but one set of cylindrical roller detents, one set being designated by reference character 33 and the other set by reference character 34. Each of sleeves 10 and 11 are provided with oppositely inclined gripping or wedging surfaces 35 and 36 as shown in Fig. 12 which is a transverse cross-sectional view through either the rotatable clutch sleeve 10 or the fixed clutch sleeve 11. Rollers 33 and 34 are placed in cages 37 which are turnable with relation to sleeves 8, 10 and 11. Movement of the rollers is constrained by leaf springs 38 situated adjacent to intermediate ribs or partitions 39 of the roller cages. Springs 38 correspond to springs 17 of the previously described embodiment. Inasmuch as centrifugal force tends to displace springs 38 radially, flanges 40 are provided on partitions 39 in order to prevent such radial displacement. Springs 38 are wide at the middle and taper toward each end as indicated by dotted lines in Fig. 7 at the position of the right-hand roller 34. The ends of springs 38 are situated in apertures 41 in the annular end portions or walls of the cages as shown in Fig. 12. The apertures are so situated and formed as to restrict the movement of the springs so that they only bear against the rollers, in the middle position thereof, with sufficient force to hold the rollers in position so that assembly of the clutches may be effected.

When using the transmission in an automobile or in other power combinations where the transmission runs in direct drive most of the time, in which condition of drive no negative or reactionary turning moments are produced and the reaction clutch does not grip but free-wheels continuously, friction losses may be reduced by making the springs 38 of the reaction clutch relatively weak.

As above stated, roller cages 37 carrying the rollers 33 and 34 and springs 38 are turnable with relation to clutch sleeves 10 and 11, thus making each clutch grip in one direction or the other depending on the position of its roller cage. To illustrate, assume that cage 37 associated with roller detents 33 is turned in clockwise direction to the position shown in Fig. 12 (b). If, now, sleeve 8 rotates in clockwise direction, roller detents 33 are forced against wedge surfaces 36 and sleeve 10 will be carried along with sleeve 8. The roller cage 37 is carried along with sleeve 10 so that, if sleeve 8 is reversed without changing the position of cage 37 relative to sleeve 10, the roller detents are moved out of gripping engagement with surfaces 36 toward the part of the space between surfaces 35 and 36 and the inner surface of sleeve 8 which is of greater width than the diameter of the rollers but are held next to the gripping surfaces due to springs 38. Thus they cannot reach the oppositely inclined surfaces 35 and, under these conditions, this clutch free-wheels. Thus, since the springs hold the roller detents in contact with the wedge surfaces for free-wheeling (except for an oil film), the movement of any roller detent from gripping to free-wheeling position and vice versa is a very minute movement.

Now if the same cage 37 is turned counter-clockwise relative to sleeve 10 to a position such that the roller detents can engage surfaces 35 but are constrained from contact with surfaces 36, the clutch will grip and release in respectively opposite directions; that is, it will grip in counter-clockwise direction and release in clockwise direction. Since, as explained in connection with the embodiment shown in Fig. 2, the clutch assemblies must grip and release in opposed relations in order to act in opposite directions, the two roller cages must be turned in opposite directions when reversing the transmission. When rollers 33 engage surfaces 36 and not 35 of sleeve 10 rollers 34 engage surfaces 35 and not 36 of sleeve 11. When rollers 33 engage surfaces 35 and not 36 of sleeve 10, rollers 34 engage rollers 36 and not 35 of sleeve 11.

In order to provide the opposite turning of the cages, mechanism is provided comprising axially displaceable adjusting sleeves 42 and 43 situated around shaft 9 and within sleeves 10 and 11 respectively. Each of sleeves 42 and 43 has two diametrically opposed slots 44. Pins 45 are secured to and project inwardly from the roller cages 37 and extend into slots 44, the purpose being to cause pins 45 and consequently the roller cages to be moved on turning sleeves 42 and 43. Pins 45 pass through suitable circumferentially extended apertures in sleeves 10 and 11 for this purpose.

There are also diametrically opposed slots 46 in each of sleeves 42 and 43, only one of the slots in each sleeve being shown in Fig. 7. Slots 46 are oppositely curved, as shown. Pins 47 are secured to the rotatable clutch sleeve 10 and to the fixed clutch sleeve 11 and project into slots 46.

By this means, when sleeves 42 and 43 are moved axially in the same direction, they will be caused to move rotationally in opposite directions and will consequently move the pins 45 and roller cages 37 in opposite rotational directions.

Since pins 47 of the left-hand clutch assembly of Fig. 7 are secured to sleeve 10, sleeve 42 travels with sleeve 10 and consequently with the driven shaft. Since pins 47 of the right-hand clutch assembly of Fig. 7 are secured to sleeve 11 which is fixed, sleeve 43 does not move rotationally except when axially displaced relative to sleeve 11.

Although sleeves 42 and 43 are separate and have relative rotational motion, movement of these sleeves to effect reversal is effected by a single member. The mechanism for accomplishing this comprises a ring member 48 having two grooves or races for bearing balls. Balls in one race of member 48 also run in a race formed in sleeve 42. The other row of balls runs in a race formed in sleeve 43. By using races in which the balls run, axial movement can be transmitted through the ball bearings while permitting relative rotational movement of members 42, 43 and 48.

Diametrically opposed pins 49 are secured in race ring 48 (see Fig. 9). Pins 49 pass through longitudinal apertures in sleeve 8 and are secured at their outer ends to an annular member 51. Member 51 constitutes the inner race ring of another ball bearing, the outer race ring 52 of which is part of a shift sleeve 53 which is mounted in the frame so as to be axially movable. The ball bearing, including parts 51 and 52, is also such as to transmit axial movement. By moving shift sleeve 53 axially in one direction or the other, the inner sleeves 42 and 43 will be moved in the same direction while being simultaneously turned in opposite directions relative to rotatable sleeve 10 and fixed sleeve 11 due to the curved slots 46, the opposite turning movements being transmitted to the roller cages 37 as described.

In order that the common clutch sleeve 8 shall be and remain stationary during reversal it is provided with an annular set of teeth 54 between which corresponding teeth 55 on the inside of shift sleeve 53 must pass in the axial movement of reversal. Thus the shift sleeve 53 meshes with the common clutch sleeve 8 during a portion of the axial travel during reversal and the clutch sleeve 8 is disengaged from shift sleeve 53 only after the reversal movement is completed. It will be obvious that teeth 54 of Fig. 7 correspond in function to teeth 25 of Fig. 2.

In order to prevent reversal when the driven parts of the transmission, including the shaft 9 and fly-wheel 18, are turning, shift sleeve 53 is provided at its right-hand end, as shown, with an extension 56 having teeth on the same. Teeth 56 must pass oppositely directed teeth 57 projecting inwardly from the fly-wheel 18 in order to effect reversal. The teeth may have oblique edges so that, if brought together during rotational movement, contact of the teeth will cause them to separate. When the transmission is used on an automobile, the driven parts are brought to rest by the brake which stops the automobile.

The arrangement above described would consequently prevent reversal except when the automobile is stopped.

Shift sleeve 53 is moved axially by mechanism including an arm 58. Arm 58 has a ball and socket connection 59 with sleeve 53 and is pivoted at 64 to an arm 65. Arm 58 also has a ball and socket connection with a lever 60. Lever 60 has a ball and socket connection with a fixed casing member 63. In order to effect reversal, the operator moves lever 60. If the upper part of lever 60 is moved to the left, as shown, the parts of joints 61 move to the right and the lower end of arm 58 and sleeve 53 move to the left.

Arm 65 is pivotally connected to a rocking member 66. Rocking member 66 seats in a fixed member 67 and is normally held in fixed position in member 67 due to upward pressure of a wedge shaped member 68. Members 65, 66, 67 and 68 are parts of mechanism for disconnecting or freeing the clutch assemblies from the abutment or fixed parts of the transmission. This mechanism may be called a coupling. It normally engages sleeve 11 of the reaction clutch with the abutment but can be released as will presently be described to free sleeve 11 from the abutment. The coupling comprises a heavy spring 69 which surrounds shaft 9, sleeve 11 and a fixed sleeve 71. Spring 69 has two ends which are separated. These ends are positioned at the top (see Fig. 11) and to each side of wedge-shaped member 68.

The right-hand end of sleeve 11 is slotted and extends between the inner sleeve 71 which is fixed to the frame and spring 69. Friction or brake blocks 70 are inserted in the slots of sleeve 11. These blocks are arranged in pairs as shown in Fig. 11 and are normally squeezed by spring 69 against each other and against member 71 so as to prevent sleeve 11 from turning.

A roller 72 is located at each side of the lower end of wedge-shaped member 68. Each roller 72 bears against a member 73 at each end of spring 69. A spring 74 bears upwardly against the rollers. Due to the spring action of spring 69, rollers 72 are forced against the lower inclined sides of wedge-shaped member 68, thus tending to force member 68 upwards against rocking member 66 and, in turn, seating member 66 in its uppermost position in member 67. If wedge-shaped member 68 is forced downwardly, rollers 72 and the ends of spring 69 are spread apart. This opens the spring 69 and relieves the force on friction blocks 70 so that sleeve 11 is no longer rigidly held but can rotate. It will thus be seen that the above described device constitutes a releasable friction coupling normally connecting sleeve 11 to the abutment formed by the frame.

Assume now that an automobile equipped with the transmission described runs uphill and is brought to rest on the upgrade. Assume that the brake, that is, a wheel brake or a shaft brake, is not used for this purpose, but that the automobile simply is not supplied with enough power to continue up the hill. The automobile cannot roll back down the hill with the mechanism adjusted for forward drive because both clutch assemblies will jam when shaft 9 starts to reverse. To illustrate, referring to Fig. 12 (b), if clockwise motion corresponds to forward direction, the figure shows the adjustment for the rotatable or action clutch comprising sleeve 10 and the adjustment would be the opposite for the fixed or reaction clutch. Therefore, when shaft 9 tends to rotate sleeve 10 in counter-clockwise direction, roller detents 33 will be wedged against surfaces 36. This will tend to move the common clutch sleeve 8 in counter-clockwise direction. Since the reaction clutch operates in opposite sense, this will wedge roller detents 34 against the surfaces 35 of sleeve 11. Since sleeve 11 is rigidly tied to the abutment, it cannot move.

Thus the clutch mechanism acts as a brake which prevents reverse movement of the automobile independently of and regardless of other brakes. Now, in order to reverse the clutch mechanism, it is necessary for the roller detents to move somewhat and, with the parts thus jammed on coming to rest on an up-grade, it may be impossible to overcome the frictional resistance of the parts by movement of lever 60.

This problem is taken care of by the releasable coupling including spring 69, as follows:

When the resistance of shift sleeve 53 to axial movement exceeds a certain amount, arm 58, instead of pivoting about joint 64, pivots about joint 59. This moves arm 65 and tilts rocking member 66. Tilting of member 66 moves wedge-shaped member 68 downwardly which spreads rollers 72 and the ends of spring 69, thus releasing sleeve 11 and completely relieving the clutches from all stresses thereon, due to their jammed condition, by permitting sleeve 11 to rotate with respect to the fixed abutment. This permits the alteration of the clutches to grip and release in opposed relation and thus reverse the direction of movement of the automobile. At the moment when resistance to reversal is relieved, shift sleeve 53 is free to move. This movement takes place in the right direction for reversal in view of the manual force applied to lever 60 and, at the same time, arm 65 is returned to normal position and the friction coupling including spring 69 engages, thus again connecting sleeve 11 to the abutment. It will be noted that the action of rocking member 66 in moving wedge-shaped member 68 downwardly is independent of whether lever 60 is moved to effect reversal from forward to reverse or from reverse to forward.

As shown in Figs. 7 and 8, inertia masses 7 are carried by flat springs 76 connected to hollow hubs 75, the object being to avoid or diminish noise of the transmission due to backlash between gear 6 and pinions 3.

In the structure shown in Figs. 7-12, the action of the inertia masses in producing opposite turning moments and applying them to clutch sleeve 8 is the same as in the previous embodiment. The opposite turning moments are segregated by clutch sleeve 8 and applied in alternation to the driven shaft 9 and the abutment respectively.

Another embodiment of the invention is shown in Figs. 13-23. This embodiment differs from the one shown in Figs. 7-12 in details of construction but not in mode of operation. Like reference characters again designate corresponding parts. The embodiment shown in Figs. 13-23 constitutes a simplification of the construction of Figs. 7-12.

In the embodiment shown in Fig. 13, the inertia masses 7 carried by hollow hubs 75 are all located in the same radial plane. The inertia masses have a radial extent such that no part of them moves inwardly as far as the central axis of the planetary system. Central gear-wheel 6 is integral with common clutch sleeve 8 and is positioned around part of the rotatable clutch including roller detents 33, thus providing a more compact structure of less axial extent. That is, teeth projecting outwardly from clutch sleeve 8 form the central gear-wheel 6. The teeth of gear-wheel 6 and pinions 3 are oblique.

Clutch sleeve 8 is formed to provide an inner race of a ball bearing 77. The outer race of ball bearing 77 is secured to a plate 80 by means of a clamping ring 78 and screws 79. Plate 80 forms part of fly-wheel 2. Ball bearing 77 takes up axial thrust caused by the oblique teeth of pinions 3 and gear-wheel 6.

The roller cages 37 of this embodiment are each provided with an inwardly directed flange 81 having inwardly directed teeth 82 as shown in Figs. 15 and 18. Teeth 82 mesh with oblique teeth 83 formed on the outer circumferences of adjusting sleeves 42 and 43. Sleeves 42 and 43 are also provided with axially directed teeth 84 forming continuations of oblique teeth 83. Teeth 84 mesh with inwardly projecting teeth on sleeves 10 and 11. Mechanism is provided comprising lever 60 and shift sleeve 53 which moves adjusting sleeves 42 and 43 axially. The oblique teeth 83 are oppositely directed on the adjusting sleeves 42 and 43.

Assume now that clutch sleeves 10 and 11 are stationary and that shift sleeve 53 is moved axially. The axial teeth 84 and corresponding axial teeth on sleeves 10 and 11 prevent rotational movement of adjusting sleeves 42 and 43 while permitting axial movement. Consequently, since teeth 83 are oblique in opposite sense, teeth 82 will be moved rotationally in opposite directions. This moves the roller cages in like manner, thus altering the clutches to grip and release in opposed relations, to effect reversal of either direction.

Sleeves 10 and 11 and roller cages 37 are provided with races for small balls 85 preventing axial displacement of the roller cages 37 when sleeves 42 and 43 are adjusted axially.

When in middle position springs 38 bear against projections 86 on the insides of the end walls of the cages, as shown in Fig. 19. Projections 86 serve the same purpose as do the apertures 41 in Fig. 12.

In the present embodiment, the friction coupling for freeing the reaction sleeve 11 from the abutment comprises a multiple disk or lamination coupling. Every other one of a plurality of very thin annular sheet metal plates 87 is clamped to frame 12 and alternate plates are secured to the reaction clutch sleeve 11. An annular pressure member 89 (see Figs. 13, 22, 23, and 23ª) is normally pushed to the right, as shown, by two diametrically opposed helical springs 90, one being shown in Figs. 22, 23 and 23ª. Springs 90 are located in recesses 91 in frame 12. Member 89 is guided by oblique ribs 92 fitting into corresponding grooves. One of the ribs 92 is shown in Figs. 22 and 23. Ribs 92 are formed on the inner sides of blocks 93 secured in frame 12 by plates and stud bolts 94. Thus member 89 can be moved to the left to release the coupling by pushing down on the same.

Downward movement and resultant left-hand movement of member 89 is accomplished in the same manner as the corresponding coupling is released in the embodiment shown in Figs. 7–12. The mechanism for doing this comprises rocking member 66 which is tilted by lever 60. The downward force is transmitted through a pin 95 loosely seated in members 66 and 89.

The clutch sleeves are held against rotation during reversal by the meshing of teeth 54 and 56 on the shift sleeve with teeth 55 and 57 in the manner previously described. In this form of the device teeth 56 are carried on the end of an extension of sleeve 53 which passes through suitable apertures in the coupling plates 87.

The manner in which the transmission is lubricated may be seen by reference to Figs. 7, 15 and 24, the latter figure illustrating diagrammatically the path of oil-flow through the clutch mechanisms shown in Figs. 7 and 15.

In each case oil is supplied to channels 96 (shown in Fig. 15) and 97 in the frame, whence it passes into the clutches by passing into the right-hand end of the cylindrical clutch sleeve 8. Due to centrifugal force produced when clutch sleeve 8 is rotated, the oil flows along the inside wall of sleeve 8 as indicated by the heavy line in Fig. 24. This causes a lubrication of all the moving parts of the clutch mechanism.

In order to confine the oil to the inner wall of sleeve 8, this sleeve is provided with an annular cover plate 98 at the oil entrance end and with inwardly projecting edge ribs 99 around apertures 50. Some of the oil, thus flowing through the clutch mechanism, is discharged through apertures 100 in proximity to the left-hand end of sleeve 8.

In the form of transmission shown in Fig. 7 the oil passes through apertures 100, flows under the influence of centrifugal force through channels 100a in driving pins 5 to the interior of the hollow planetary pinions 3 to oil bearings 4. Some of the oil passes from the pinions through end bearings 4 and part flows through apertures 100b in the pinions to lubricate the teeth thereof and the teeth of gear 6.

In the form of transmission shown in Fig. 15 the oil flows directly through apertures 100 over the teeth of pinions 3 and gear 6; it also flows along the inside walls of the hollow fly-wheel 2 to the bearings 4. It will thus be seen that in both forms thorough lubrication is provided for the gears and bearings of the planetary system.

After serving to lubricate the parts of the planetary system the oil is thrown toward the inner periphery of the hollow fly-wheel 2 and passes out through apertures 101 in the fly-wheel rim. A layer of oil as shown at 0 in Fig. 15 is trapped in the fly-wheel and when the fly-wheel stops flows down over the gears, and in the form shown in Fig. 15 over the forward pinion bearings 4, which, unlike the remaining bearings, are outside of the hollow pinions. As is apparent from Fig. 15 and also from Figs. 7 and 13, the hollow planetary pinions 3 form pockets 102, serving as receivers for the oil.

When discharged through apertures 101 in the hollow fly-wheel 2, the oil enters into the annular space 103 between the fly-wheel and the outer stationary housing 12, Figs. 8 and 14. Some of the oil is caught in a pocket 104 having an outlet 105 leading, for instance, to the engine. The engine may, in turn, be connected by suitable conduits to channel 96, Fig. 15. Thus a continuous circulation will be obtained, the moving parts of the transmission acting as a pump for distributing oil through the transmission. Some of the oil discharged through apertures 101 remains in housing 12 and lubricates gear teeth 106 formed in the fly-wheel and used for starting the engine. Teeth 106 also act to carry oil from the bottom of space 103 to the catch pocket 104.

In the arrangements above described, in order to have high efficiency, the mass action, determined by weight and distance from the center of rotation, of the intermittently rotating parts of the transmission should be less than one-half the mass action of the inertia masses. For the same purpose, the diameter of the planetary pinions should be greater than the radius of the central gear-wheel.

A still further embodiment of the invention is shown in Figs. 25 to 50, which embodiment, while operating in accordance with the same general principles and in the same general manner as the forms already described, incorporates numerous improvements and refinements in its construction, designed to produce an apparatus of highly efficient commercial form. In describing this form, like reference characters will again be used to designate corresponding parts.

Turning now to Fig. 25, reference character 1 designates the motor driving shaft and 2 the fly-wheel, which is secured to the flanged end of shaft 1 by screws 146. Fly-wheel 2 is formed with a central annular hub 147 in driving engagement with the splined end of shaft 148, the opposite end of which is also splined as at 149. The splined end 149 of the shaft is rigidly secured in driving engagement with one end of a tubular member 150 which surrounds shaft 148 for the major portion of its length. An annular clearance space is provided between shaft 148 and the surrounding member 150, and the latter member is provided with a number of holes 151 distributed along its length for a purpose to be set forth later. Member 150, at the end adjacent to the fly-wheel 2, is rigidly secured to the annular hub 152 of a secondary fly-wheel 153 which is journalled on a bearing sleeve 154 fitted over the hub 147 of fly-wheel 2.

The secondary fly-wheel 153 has mounted thereon the driving pins 5 (see Fig. 26), and it will be seen that shaft 148 and tubular member 150 provide a relatively long and torsionally resilient driving connection between the motor shaft 1 and the fly-wheel carrying the driving pins. This resilient drive is provided because of the fact that in transmissions of this character torque reactions from the transmission are carried back to the driving shaft of the motor and as such reactions are not uniform in character, there is a tendency to produce variation in the angular velocity of the motor drive shaft. Such variation in the angular velocity of the main shaft of the usual form of motor used in automobiles will tend to produce noise in the motor because of the backlash present in the several auxiliary drives in the motor, such for example as the cam shaft timing gear or chain drive and the fan and water pump drives. The resilient drive formed by shaft 148 and member 150 insures quiet motor operation by ironing out the unevenness of the torque reactions through torsional displacement of these parts. Where torsional displacement of this character occurs, periodic vibrations may be generated, and to prevent the possibility of this occurrence, I provide a frictional damping means acting between fly-wheels 2 and 153. Fly-wheel 2 is provided with a circumferential flange 155 encircling fly-wheel 153, the rim of the latter being in the form of a shallow V groove. A pair of friction rings 156 of triangular section engage the inner face of flange 155 and the sides of the groove, under the influence of a number of small springs interposed between the rings. These rings provide only sufficient resistance to relative rotational movement of the fly-wheels to dampen periodic vibrations, without in any way interfering with their relative displacement due to torsional resiliency in the driving members connecting them.

In this form of the transmission the inertia masses 7, of which there are two, are carried on the clutch sleeve 8, which is provided with two pairs of eccentrics 157 and 158, the pairs being diametrically offset with respect to each other to provide in effect a pair of cranks 180° apart. The pair of eccentrics 157 is placed between the oppositely positioned pair 158 and each pair has rotatably secured thereto, by means of straps 159 and ball bearings 160, one of the masses 7. This arrangement of the eccentrics is made to secure axial symmetry and it will be observed from Fig. 25 that the centers of gravity of the masses lie in the same transverse plane, one mass being of T section while the other is forked to provide clearance enabling the two masses to approach each other in telescoping relation when the position of the eccentrics is opposite that shown in Fig. 25.

Masses 7 are rotated at fly-wheel speed through the medium of links 161 pivotally secured to pins 161a and to the driving pins 5, the latter being placed diametrically opposite each other on the secondary fly-wheel 153 and at equal distances from the center of rotation thereof.

The action of the masses 7 with respect to the application of turning moments to the sleeve 8 is substantially the same as is the case when they are mounted on planetating pinions. Thus if sleeve 8 and the eccentrics thereon are held stationary and the driving shaft is rotated, each mass will travel through a cycle of movements in general similar to that indicated in Fig. 4; that is, if the mass starts from the extreme outward position shown in Fig. 26, it will be drawn inwardly to its extreme inner position in one-half a revolution of the driving shaft, by the eccentric about which it rotates, and during the succeeding half revolution will return from its innermost position to its original outer position. During the first half of the cycle, the centrifugal force generated will apply a turning moment to sleeve 8 tending to turn it in the direction of rotation of the driving shaft, while during the latter half of the cycle an opposite turning moment will be applied. Under the conditions assumed the cycle will be completed in one revolution of the driving shaft.

If, now, the eccentrics move in the direction of rotation of the driving shaft at half driving shaft speed, the masses will require a full revolution to move from their outermost to their innermost positions. Under these conditions the path of travel of each mass is similar to the path of travel shown in Fig. 5, differing in that the centers of gravity of the eccentrically mounted masses do not travel inwardly to the center of rotation of the system.

With the increasing speed of sleeve 8, the number of revolutions of the driving shaft required to complete the cycle increases until finally direct drive is obtained, with the masses traveling in a circular path and causing the sleeve 8 to travel at driving shaft speed.

Mounting of the inertia masses 7 on cranks or eccentrics forming part of the clutch sleeve assembly, as shown in Fig. 26, is to be preferred to the form of construction in which the masses are mounted on pinions meshing with a gear forming part of the clutch sleeve assembly. In the form of construction shown in Fig. 26, the masses may be said to be mounted centrifugally on the clutch sleeve 8, so that the forces due to the masses and acting through bearings 160 on sleeve 8 are always of the same character, i. e., forces acting radially outwardly from the center of rotation of the sleeve and mass assembly. This eliminates any possibility of backlash, either in direct or indirect drive, and the noise such backlash would produce. When the transmission is operating in indirect drive, that is, with the masses 7 rotating about their respective eccentric centers, the links 161 are subjected to alternate tension and compression stresses, which might be expected to produce noisy operation due to backlash between the links and the pins 5 and 161a. Such action is, however, avoided by positioning links 161 (see Fig. 26) so that when in operation centrifugal force tends to throw the links outwardly in radial direction, causing them to exert continuous side pressure directed toward the inner semi-circumferences of pins 5 and 161a. Therefore, if any play exists between the pins and the link bearings the radially acting force developed by centrifugal force acting on the links prevents the pins from taking up such play, when the sense of the stress in the links changes from compression to tension or vice versa, by direct movement across the bores in the links forming the pin bearings. Instead, the pins will take up any existing play by, in effect, rolling on the radially inner portions of the link bearings, with which they are maintained in contact by the tendency of the links to move outwardly in radial direction.

It will thus be seen that in the present embodiment of the invention, continuous torque derived from the driving member is converted into turning moments of opposite sense by mechanism free from backlash even when such mechanism, due to wear or other cause, permits play between the parts thereof.

The opposite turning moments applied to sleeve 8 are segregated by a plurality of one-way clutches in the manner previously described, the positive moments being transmitted to the driven shaft and the negative moments being absorbed or neutralized. In this form of the apparatus, compactness is secured by arranging the clutches concentrically, with the action clutch inside sleeve 8 and the reaction clutch outside thereof.

Sleeve 10, which with sleeve 8 and roller detents 33 forms the action clutch, is supported at its forward end by a ball bearing 162 located inside sleeve 8, and at its rearward end is supported by the annular member 163 to which it is secured in driving engagement by splines 164. Member 163 is in turn supported by ball bearing 165, the outer race of which is secured in the frame or casing 12. The speedometer worm gear 145 is conveniently driven from threads at the forward end of member 163.

Drive is transmitted from the splined end of sleeve 10 to the hub 166 of the drive shaft fly-wheel 18 and from this member to the driven shaft. A cap 167, screwed on the end of sleeve 10, secures hub 166 against axial movement.

Two sets of action clutch roller detents 33 are provided, these rollers being held in an inner roller cage 168 in engagement with the inner cylindrical surface of sleeve 8 and either the inclined wedging surfaces 35 or the oppositely inclined wedging surfaces 36 on sleeve 10 (Figs 31 (a) and 31 (b) ) depending on the position of the cage, which is rotatable with respect to sleeve 10. Two sets of detents are employed in this clutch instead of one in order to obtain the desired area of gripping contact without having to resort to the use of detents of undue length. The action of each set of detents is identical with that of the other.

The reaction clutch sleeve 11 encircles the portion of the common clutch sleeve 8 within which is located the action clutch, sleeve 11 being provided with internal longitudinal grooves forming oppositely inclined wedging surfaces 35 and 36. A single set of reaction roller detents 34, held in the outer cage 169, is arranged to engage the cylindrical outer surface of sleeve 8 and either of the series of wedging surfaces on sleeve 11. As in the case of the action clutch, rotational movement of the roller cage with respect to the clutch sleeve determines which series of surfaces are engaged by the rollers. Due to the greater diameter of the reaction clutch, a larger number of roller detents can be employed in a single set than in the action clutch, and I have found that a single set of detents of moderate length is sufficient to transmit the reaction forces. In the present embodiment the ration of clutch diameters is such that while each set of action detents comprises but nine, giving a total of eighteen in the action clutch, sixteen detents of the same diameter can be placed in a single set in the reaction clutch.

The inner or action clutch cage 168, the left-hand half of which is shown in Fig. 27, comprises a slotted cage member formed with ribs or partitions 39. End rings 170 and an intermediate ring 171 are riveted inside the cage member, and are notched as at 172 to receive the shouldered ends of leaf springs 38 adapted to engage rollers 33 midway of their length and, if not otherwise biased, to center the rollers in their slots. In this embodiment the springs 38 receive no backing intermediate their end supports by a non-yielding member, since ribs 39 are radially outside springs 38 and notches 172 and serve merely to form the cage. It is important for the springs to be held against play in the cages and this is accomplished by interposing between each pair of springs located in the ring notches 172 a very light, normally curved, auxiliary spring 173 which acts to take up all play and tends to keep the outer faces of the spring ends in light contact with the faces of the ring notches. The action of spring 173 is clearly shown in Fig. 30, in which the clearance or play between the ends of springs 38 is shown greatly exaggerated. Spring 173 also serves the important purpose of providing a very light starting pressure on the roller detents.

The construction of the roller cage and spring assembly of the reaction clutch is essentially the same as that just described, except that in the reaction clutch cage the intermediate ring 171 is omitted.

In Fig. 31 (a) the relative positions of the roller detents and cages with respect to the several clutch sleeves is shown, with the mechanism adjusted for drive in clockwise direction. It will be remembered that both cages 168 and 169 are rotatable with respect to their respective clutch sleeves, and in this figure, the inner cage 168 is shown rotated to its extreme clockwise position while the outer cage 169 is shown as rotated to its extreme counter-clockwise position. With the cages in these positions it will be seen that the clutch detents 33 and 34 are held in contact with the surfaces 36 of sleeves 10 and 11 respectively by the action of springs 38. However, when viewed from the standpoint of clockwise movement, the inner surface of sleeve 8 and the surfaces 36 of sleeve 10, engaged by the action clutch detents 33, are converging surfaces, while the outer surface of sleeve 8 and the surfaces 36 of sleeve 11, engaged by the reaction clutch detents 34, are diverging surfaces. Thus a clockwise rotation of sleeve 8 will move detents 33 inwardly between the converging surfaces and cause them to grip or jam, thereby transmitting the clockwise rotation to sleeve 10 and the driven shaft. When this action occurs the detents 33 and cage 168 rotate with sleeves 8 and 10.

At the same time that the clockwise rotation of sleeve 8 causes the action clutch detents to grip, it tends to move the reaction clutch detents 34 in clockwise direction from between its outer surface and the diverging surfaces 36 of sleeve 11. The movement of detents 34 away from surfaces 36 is resisted by springs 38, which, however, exert so slight a pressure on the detents when they are in this position that no gripping action takes place in the reaction clutch, the detents 34 being substantially free and permitting the reaction clutch to overrun or free-wheel.

If, with the clutch cages adjusted for clockwise drive, the sleeve 8 tends to rotate in counter-clockwise direction, the action clutch detents 33 are immediately freed from the surfaces 36 of sleeve 10, which surfaces, when viewed from the standpoint of counter-clockwise rotation, diverge from the inner surface of sleeve 8. This action permits the sleeve 10 to continue to rotate in clockwise direction under the influence of inertia forces, or in other words, to free-wheel. At the same time, the tendency of sleeve 8 to rotate counter-clockwise forces the reaction detents 34 into wedging contact with the surfaces 36 of sleeve 11, which surfaces, from the present point of view, converge with respect to the outer surface of sleeve 8. Since the reaction sleeve is held in relatively stationary position, sleeve 8 is not permitted to rotate in counter-clockwise direction when the clutches are adjusted for clockwise drive.

In Fig. 31 (b), the clutches are shown adjusted for counter-clockwise drive, the inner cage 168 being shifted to its extreme counter-clockwise position with respect to sleeve 10, and the outer cage being shifted to its extreme clockwise position with respect to sleeve 11. With the cages in this position, it will be seen that counter-clockwise rotation of sleeve 8 will force the action clutch detents 33 between the inner surface of the sleeve and the converging surfaces 35 of sleeve 10 to effect counter-clockwise rotation of the latter sleeve. At the same time the counter-clockwise rotation of sleeve 8 will move the reaction clutch detents 34 sufficiently against the action of springs 38 to free them from the surfaces 35 of sleeve 11, which in this direction diverge from the outer surface of sleeve 8. This action permits the reaction clutch to overrun or free-wheel. If sleeve 8 tends to move in clockwise direction, detents 33 will be freed from surfaces 35 of sleeve 10, thereby permitting this sleeve to continue counter-clockwise rotation due to inertia forces, while detents 34 will be forced between the outer surface of sleeve 8 and surfaces 35 of sleeve 11, which surfaces converge toward sleeve 8 when viewed in this direction. Thus reaction sleeve 11 grips sleeve 8 and prevents its rotation in clockwise direction in this adjusted position of the cages.

It will be seen that the contours of the gripping surfaces 35 and 36 on sleeve 10 in Figs. 31 (a) and 31 (b) differ in form from the contours of the corresponding surfaces shown in Fig. 12. In both forms the surfaces converge with respect to the inner surface of sleeve 8, but in the form shown in Figs. 12 (a) and 12 (b), the angle between the tangents to the surfaces at the points where they are contracted by the detents does not increase as the detents move toward engaging position. On the other hand, the contour of the surfaces in Fig. 31 is such that the angle between the two corresponding tangents, which angle may be conveniently termed the angle of approach of the surfaces, does increase as the detents are moved toward engaging position. The latter arrangement of the surfaces is in the nature of an improvement over the former, since it automatically tends to keep the roller detents centered in their cage slots and prevents their being forced so far from their proper positions in the cages as to strike the ribs or partitions thereof and deform them. A comparison of these figures will further make is evident that the contours employed in the form shown in Figs. 31 (a) and 31 (b) may be readily secured by a single grinding operation not feasible for producing the contours shown in Figs. 12 (a) and 12 (b). For a more detailed description of the improved form of this part of the clutch mechanism, reference may be had to my copending application Serial No. 472,531, filed August 2, 1930, in which this specific improvement is claimed per se.

In order to minimize wear on the clutch parts and to insure continued efficient action thereof, the pressure exerted on the detents through springs 38 should be as light as possible. On the other hand, a relatively heavy pressure on the detents is required under some operating conditions. I therefore vary the pressure exerted on the detents in accordance with variations in operating requirements, by means of mechanism presently to be described.

In order to effect reversal of the positions of the cages holding the roller detentes, I employ mechanism shown in Figs. 32 to 37. This mechanism comprises axially displaceable sleeves 42 and 43. Sleeve 42 surrounds the sleeve 10 to the right (Fig. 32) of the action clutch and the right-hand end of the sleeve 42 is provided with a number of internal teeth 174 passing through slots 175 in a spacing sleeve 176 and engaging the splines 164 in the inner clutch sleeve 10. The left end of sleeve 42 is formed with a number of oblique internal teeth 177 engaging corresponding oblique external grooves 178 in a rotatable shift sleeve 179. Sleeve 179 is mounted on sleeve 10. It can rotate with and also relatively to sleeve 10. It does not have axial movement. Three fingers 180 (Figs. 32, 33, 34 and particularly 37) project from the left end of sleeve 179 to engage suitable slots 181 in the flanged right-hand ring 170 of the inner cage 168. Splines 164 on sleeve 10 prevent rotation of sleeve 42 with respect to sleeve 10, but permit axial movement thereof. Axial movement of sleeve 42 causes rotation of sleeve 179 through the action of teeth 177 in grooves 178. This rotation will be transferred by means of fingers 180 to the cage 168 to shift the latter with respect to sleeve 10. The angle of grooves 178 in sleeve 179 is such that movement of sleeve 42 to the right in Fig. 32 will cause clockwise rotation of the cage 168 as viewed from the left of Fig. 32, or as seen in Fig. 31 (a). This is the adjustment for clockwise drive, and it is apparent that in so far as this part of the clutch mechanism is concerned counter-clockwise drive will be secured if sleeve 42 is moved to the left in Fig. 32.

Sleeve 10 is formed with arcuate shoulders 182 (Figs. 32, 34) between which fingers 180 extend and upon which is mounted the inner race ring 183 of ball bearing 184 forming the support for the rearward end of sleeve 8. Ring 183 has an annular cup-shaped extension 185 enclosing the end of sleeve 8 for a purpose which will be explained later. Bearing rings 186 and 187 (Fig. 32) act as spacers to prevent axial movement of shift sleeve 179 due to end thrust caused by axial movement of sleeve 42.

Near its center, sleeve 42 is exteriorly threaded to receive the inner race ring of ball bearing 188, the outer race of which is formed by ring 189. Bearing 188 permits sleeve 42, which rotates with sleeve 10, to be shifted axially by thrust from the rotationally stationary ring 189. A second ring 190 is mounted in sliding engagement within ring 189, the left end of ring 190 projecting to form the inner race of ball bearing 191, the outer race ring 192 of which is secured, as by threads, to the right-hand end of shift sleeve 43. Bearing 191 acts to transmit axial thrust from ring 190 to sleeve 43 while permitting relative rotation of these parts.

Shift sleeve 43 acts, by axial movement, to rotate the outer or reaction clutch cage with respect to sleeve 11, and to this end is provided with a plurality of longitudinal slots 193, in which are situated square pins 194 extending inwardly from an extension member 195 rigidly secured to the end of sleeve 11. This slotted sleeve and pin arrangement permits axial movement, and prevents rotational movement, of sleeve 43 with respect to sleeve 11.

The right-hand cage ring of cage 169 is extended as at 196 and carries a plurality of external pins 197 (see Fig. 35). Pins 197 are in sliding engagement with oblique slots 198 in sleeve 43. Slots 182 and 198 are preferably arranged alternately around the circumference of sleeve 43 and it will be seen from a consideration of Fig. 35 that movement of sleeve 43 to the right will cause the extension 196 and cage 169 to rotate in counter-clockwise direction with respect to sleeve 11, as viewed from the left of Fig. 35, while movement of sleeve 43 to the left will effect relative clockwise rotation of the cage with respect to the sleeve.

The above action is just the opposite of that which takes place upon like axial movement of sleeve 42, and it will thus be evident that if rings 189 and 190 are shifted axially as a unit, in the same direction, cages 168 and 169 will be rotated in opposite directions with respect to sleeves 10 and 11. If rings 189 and 190 are moved to the right, as seen in Fig. 32, the cages and detents will be moved to the position shown in Fig. 31 (a) to provide clockwise drive, while movement of the rings to the left will cause its detents to assume the positions shown in Fig. 31 (b) to effect counter-clockwise drive. The manner in which axial movement of rings 189 and 190 is effected will be described later.

It will be remembered that in accordance with my invention the reaction turning moments, that is, the moments opposite in sense from those utilized for driving, are neutralized or absorbed, and in the present embodiment of the invention I provide an important improvement in the manner in which these reaction or negative moments are treated. Referring again to Fig. 25, it will be seen that the reaction clutch sleeve 11 is mounted at its forward or left end by a ball bearing 199 fixed to clutch sleeve 8. At its right end, sleeve 11 carries a bearing ring 200 which engages the extension 196 forming part of the roller cage 169.

The left end of sleeve 11 is flanged and has riveted thereto a relatively heavy inertia weight or mass in the form of a cup-shaped wheel 201 encompassing the rotating masses 7. The rim of this wheel is grooved at 202 to receive a split guide ring 203 extending into a groove 204 in the frame or casing 12. Ring 203 normally contracts into groove 202 to permit easy assembly, and after assembly of wheel 201 with the casing, is expanded into groove 204 by means of the threaded wedge 205 (Fig. 26) which is moved by screwing stud 206 thereinto from the exterior of the casing. The split guide ring 203 acts to take up end thrust imposed on sleeve 11 and, together with bearing 199, serves to keep sleeve 11 concentrically centered with respect to clutch sleeve 8.

Adjacent to its left end sleeve 11 is provided with a plurality of pairs of ears 207 (see also Fig. 38), each pair of ears 207 serving to secure, through anchor pins 208 and straps 209, the inner end of a coil spring 210. The number of springs employed may vary, but I have found that six, as shown, is a suitable number. The outer ends of springs 210 are secured, through anchor members 211, to a dished retaining member 212 which is in turn releasably secured to the frame or casing 12 in a manner to be described. For reasons which will become clear later, the springs 210 are preferably arranged radially with respect to the axis of the transmission, and in diametrically opposed pairs.

Casing 12 is recessed at 213 to receive an annular member 214 of cup-like section, which is rigidly secured to the casing 12 by bolts 215. The inner surface of the outer web of member 214 is grooved to provide angularly disposed surfaces 216 adapted to be engaged by a series of balls 217 passing through suitably spaced holes in the flange 218 of the retaining member 212. Balls 217 are held in position by a split ring 219 lying within the annular recess formed by member 214. Ring 219 is provided with a series of arcuate slots 220 (Fig. 38) through which pins 221 pass, these pins being riveted to member 214 and slidably engaging the slots to center the ring while permitting a limited rotational movement thereof.

Means which will hereinafter be described in detail are provided for expanding or collapsing ring 219.

It will be seen that if ring 219 is expanded sufficiently, the force exerted thereby on balls 217 will act to frictionally lock them between the ring and the surfaces 216, thereby holding the retaining member 212 stationary. If, now, ring 219 is collapsed sufficiently to relieve the stress on balls 217, the assembly comprising member 214, balls 217 and ring 219 will become, in effect, a ball bearing permitting retaining member 212 to rotate freely under the influence of any rotational forces which may be transmitted to it through springs 210. From the above it is evident that the assembly described constitutes a releasable friction locking device or coupling forming a part of the connection between the reaction clutch sleeve 11 and the abutment formed by frame or casing 12. Functionally, the coupling comprising balls 217 and ring 219 corresponds to the coupling comprising the spring 69 and friction blocks 70 shown in Fig. 7, but the ball form of coupling is an improvement over the earlier type, as it substitutes contact between spherical and substantially plane surfaces for contact between plane surfaces. The improvement is due to the fact that in apparatus running in oil, as this does, the coefficient of friction between plane surfaces will vary with wear of the surfaces and changes in the physical qualities of the oil, while in the case of contact between spherical and plane surfaces, the friction coefficient can be accurately determined and remains constant or substantially constant, regardless of variations in the quality of the lubricating medium. As a result, the form of coupling shown in Fig. 25 can be depended upon to function properly, that is, without any slippage, for long periods of time and even under improper operating conditions, such for example as would occur if the wrong grade of oil were used.

We now come to the improved manner in which the reaction moments are treated. In the hereinbefore described forms of the apparatus, the reaction moments are transmitted from the relatively light reaction sleeve to the frame, either through a connection comprising continuously contacting parts, as in the form shown in Fig. 2, or through releasable stress removing couplings as in the forms shown in Figs. 7 and 13. In the present embodiment the reaction sleeve is rigidly connected to the heavy wheel 201, the inertia of which resists to a marked degree sudden movement due to impact. Furthermore this relatively heavy mass is capable of delivering a considerable force, due to momentum, if stopped suddenly after having been set in motion. These characteristics I make use of to efficiently neutralize the reaction moments transmitted to sleeve 11.

The manner in which the desired object, i. e., the neutralization of the reaction moments, is accomplished, may best be understood by reference to Fig. 38. It will be seen that springs 210, arranged radially, will offer but slight resistance to initial rotational movement of the reaction sleeve 11 and wheel 201 in either direction from the position shown in the figure, since the reaction sleeve can rotate through an appreciable angle to either side of this position without appreciably stretching the springs. However, as the springs are carried further from their radial positions by rotation of sleeve 11 from its position of rest, given increments of angular displacement of the reaction sleeve result in progressively greater increments of linear stretch of the springs, which consequently resist such movement with rapidly increasing force. The net result is that the radially arranged springs act as light springs when the displacement of sleeve 11 from its position of rest is relatively small, and as springs of progressively increasing strength as the displacement of sleeve 11 from its position of rest increases.

Now let us assume that the transmission is adjusted for clockwise drive (as viewed in Fig. 38) and that alternate opposite turning moments are applied to sleeve 8, the counter-clockwise moments being transmitted to sleeve 11 by the reaction clutch rollers. The first turning moment so transmitted will be largely absorbed in overcoming the inertia of the mass of the heavy wheel 201, which I will term the reaction mass. The energy so absorbed by wheel 201 will act to rotate it also in counter-clockwise direction against the progressively increasing resistance of the anchored radial springs which quickly stop rotation of the wheel in this direction. The radial springs absorb the energy in the wheel by stopping it, and immediately return it in the form of force tending to move the wheel in clockwise direction toward its position of rest. If the wheel were permitted to rotate, in clockwise direction, under the influence of the springs, from its displaced position to its position of rest, all of the energy imparted to it (disregarding friction losses) would again be present in the wheel in the form of kinetic energy of momentum.

It must be borne in mind that the turning moments applied to sleeve 8 cause it to tend to oscillate with considerable rapidity. However, rotation of sleeve 8 in counter-clockwise direction is practically instantly stopped by the engagement of the reaction clutch, which connects sleeve 8 to the reaction mass. This instant engagement of the reaction clutch prevents an impact connection between sleeve 8 and the inertia mass, and while the forces transmitted through the clutch are of a high value and act only for very short periods of time, the action of the clutch is smooth due to the fact that it engages at the instant when there is no differential rotational speed between clutch sleeves 8 and 11.

The prevention of rotation of sleeve 8 in counter-clockwise direction must be accomplished by the inertia of the reaction mass, since at the instant of engagement of the reaction clutch, the springs holding the reaction mass will offer but slight resistance to movement of the mass. As the reaction mass begins to move in counter-clockwise direction due to the force transmitted thereto from sleeve 8 by the reaction clutch, the sleeve 8 will begin to move in the opposite or clockwise direction under the influence of the clockwise turning moment now being applied to it by the inertia masses 7. It will thus be seen that immediately after engagement of the reaction clutch, sleeves 8 and 11 will rotate in opposite directions and the reaction clutch will overrun.

The reaction clutch will continue to overrun as long as sleeve 11 moves in counter-clockwise direction with respect to sleeve 8, regardless of the absolute direction of rotation of either sleeve.

Springs 210 will stop the counter-clockwise rotation of the reaction mass and sleeve 11 and tend to reverse their direction of movement from counter-clockwise to clockwise. Since this action takes place when sleeve 8 is moving in clockwise direction under the influence of masses 7, it is not resisted at its inception and the reaction mass gathers momentum in clockwise direction. The speed of sleeve 8 in clockwise direction quickly decreases, due to the action of the masses 7 imparting to it the next counter-clockwise moment, and the instant that sleeves 8 and 11 reach the same relative speed, with sleeve 11 tending to continue in clockwise direction and sleeve 8 tending to reverse its direction of rotation, the reaction clutch engages. Thus the counter-clockwise moment applied to sleeve 8 is largely neutralized in overcoming the momentum of the reaction mass and again reversing the direction of rotation of the mass.

In this connection it is most important to note that even though the reaction mass may be moving in a direction opposite to that in which the clutch sleeve 8 is tending to rotate, the engagement of the reaction clutch produces no impact, due to the fact that the clutch always engages at an instant when there is no relative rotational speed between the clutch sleeve 8 and the reaction mass.

The magnitude of the forces due to the counter-clockwise moments applied to sleeve 8 will vary in magnitude with variations in conditions of drive and the amount of average displacement of the reaction mass from its position of rest will vary accordingly, but under all conditions this mass will act, once it is set in motion, to largely neutralize the forces of the reaction moments by forces of opposite sense derived from the kinetic energy of momentum contained in the moving mass.

The above described action is not to be confused with the action taking place in transmissions of the same general type in which cushioning of the action of the reaction clutch or its functional equivalent is attempted to be effected by the interposition of springs alone between the reaction clutch and the abutment.

The difference between the above two forms of construction may be illustrated by the following example. Assume first that the transfer of a given reaction force directly to a fixed abutment results in the imposition of an engagement stress X on the clutch parts. Now suppose a spring is placed between the clutch parts and the abutment, and the same reaction force is transmitted. The stress on the parts as the clutch is engaged will be less than X, due to the fact that one of the clutch parts can give because of the resiliency of the spring. If, now, the action described in connection with the present form of my invention is recalled, it will be plain that the stresses imposed on the reaction clutch parts at the time of engagement of the clutch will, assuming again that the same reaction force is transmitted, be greater instead of less than X, due to the fact that the reaction force is met by an opposite and nearly equal force derived from the moving reaction mass.

At first glance it would seem that the present construction, involving higher clutch stresses, is a step backward, but I have found that by the means I employ I eliminate undesirable vibration of the fixed abutment, which tends to occur when the reaction clutch is rigidly connected thereto, and which can not be eliminated by the use of a direct spring connection between these parts.

The springs 210 must, of course, exert a variable force on the abutment as they alternately stretch and contract, but the force so transmitted by them is in the nature of a relatively even force which varies as the average displacement of the springs varies. Furthermore, the opposed radial position of the springs causes the radial component of the force transmitted to the abutment by each spring to be balanced by the radial component of the force transmitted by the opposite spring. The net result is that the only unbalanced force transmitted to the abutment is the sum of the tangential components of the forces transmitted by the springs when they are drawn from their radial positions by movement of the reaction mass, and this force reaches its greatest magnitude when the reaction clutch is out of engagement.

The use of the reaction mass enables me to secure another important practical advantage, since by interposing the reaction mass between the reaction clutch and the releasable coupling, the latter is called upon to transmit a force to the abutment of only a third the force which it would have to transmit if the reaction mass were omitted. The releasable reaction coupling can therefore be made much lighter than would otherwise be the case.

As stated above, the reaction clutch always engages at the instant when there is no relative motion between the clutch sleeve 8 and the reaction sleeve 11. The same holds true of the action clutch with respect to sleeve 8 and the driven sleeve 10. From this it will be seen that no impact jars or shocks are produced by the clutch assembly, since the clutch sleeve 8 is alternately connected to sleeve 10 or sleeve 11 without the slightest lost motion. This elimination of any lost motion in the clutch assembly is a feature of importance, common to all of the embodiments of the invention herein shown, as it produces an inherently smooth and quietly operating mechanism.

Quiteness of operation is further assured in the several forms of the transmission by supporting the entire rotating mechanism as a unit which is supported from but two points, only one of which is supported from the casing. An examination of Fig. 25, for example, will show that the rotating unit is supported at the forward end from the main engine bearing supporting shaft 1, while the ball bearing 165 supports the other end of the unit from the frame. This construction involving two point support is also a feature of the forms of transmission shown in Figs. 7 and 13.

Considering now the matter of reversal, it will be remembered that before reversal can be effected under conditions imposing stress on the clutch members, as when an automobile is being held by the clutches against backward motion down a grade, the stress on the clutch members must be relieved to enable the roller detents to be moved from between the gripping surfaces. In the present embodiment of the invention I relieve this stress by collapsing ring 219 to free the reaction mass and sleeve from the abutment.

The mechanism for collapsing (and also expanding) ring 219 is shown in Figs. 39 and 41. This mechanism closely resembles a pair of scissors and will hereinafter be referred to as scissor mechanism or scissors. It comprises a pair of floating levers 222 and 223 lying in a plane at right angles to the plane of ring 219. The forward ends of these levers engage holes 224 and 225 passing through ring 219 adjacent to the point 226 where the ring is parted. The opposite ends of the levers are forked and have mounted thereon rollers 227, between which is situated the reversing shaft 228. About midway of their ends the levers are pierced to permit the passage therethrough of the rod 229, the upper end of the rod being formed with a head 230 having a knife edge bearing on the upper face of lever 222. The lower end of rod 229 extends below lever 223 and is surrounded by the coil spring 231 which is compressed between the lower face of lever 223 and the retaining nut 232 screwed on the lower end of the rod. Between the holes through which rod 229 passes and the ends of the levers engaging ring 219, the levers are provided with threaded holes 233 into which are screwed adjusting nuts 234, the latter engaging the ends of a distance pin 235. Distance pin 235 passes loosely through an annular boss 236 forming part of frame 12 and is held in position by the retaining pin 237. With the scissors as shown in Fig. 39 it will be seen that the spring 231 tends to move the right-hand ends of levers 222 and 223 together about the distance pin 235 as a fulcrum, thus spreading the left ends of the levers and expanding ring 219 to lock balls 217 in position. It is to be noted that the adjusting nuts 234 are set so that with ring 219 fully expanded, a substantial clearance is left between rollers 227 and the parallel cam faces 238 formed on shaft 228 where it passes between the rollers.

Ring 219 is collapsed to break the coupling between the frame and the reaction mass by rotating the reverse shaft so that the cam surfaces 238 spread the right-hand ends of the levers 222 and 223, which are held against the ends of pin 235 as fulcrum points by the force of spring 231. The position of the scissors shown in Fig. 39, that is, with the ring 219 expanded, is the normal position of the device, which is altered only when reversing.

It will be seen that the acts of collapsing and again expanding ring 219 are accomplished during a half revolution of shaft 228, and also that an appreciable initial movement of shaft 228 from the position shown in the figure can take place before spreading contact is made between surfaces 238 and rollers 227. The reasons for this arrangement will presently be pointed out. Levers 222 and 223 are provided with inwardly extending bosses 239 adapted to be engaged by flat cam faces 240 upon rotation of the release shaft 241, the function of which will also be explained later. It is plain that rotation of shaft 241 will act to collapse the ring 219 in the same way that this result is attained by rotation of shaft 228.

Turning now to Figs. 40 to 42 it will be seen that the reversing shaft 228 is rotatably mounted on ball bearings 242 within a removable cylindrical housing 243 supported by webs 244 and 245 of the frame 12 and passing through said webs. The outer end of housing 243 is flanged at 246 and is secured to web 245 by studs 247. The outer end of shaft 228 is provided with a spur gear 248 meshing with a second gear 249. The latter gear is formed as part of a reversing member 250 rotatably mounted on stud 251 extending outwardly from flange 246 at a point below shaft 228. The outer end of member 250 is in the form of a ratchet wheel 252 provided with six notches 253 adapted to be progressively engaged by a pivoted pawl 254 to advance the ratchet wheel one sixth of a revolution in clockwise direction (as viewed in Fig. 40) each time the pawl is actuated. Gear 249 has three times the number of teeth possessed by gear 248, so that a sixth revolution in clockwise direction of member 250 will cause a half revolution of reverse shaft 228 in the opposite direction. Thus, each actuation of pawl 254 to advance the ratchet wheel effects a half revolution of shaft 228.

The inner end of the reversing shaft is provided with a pair of spaced axially extending ears 255 through which a transverse, axially offset pin 256 passes. Pin 256 serves as a pivot for a bell crank 257, one arm 258 of which extends inwardly from the end of shaft 228 in generally axial direction. The end of arm 258 is in the form of a ball 259.

As will be seen most clearly in Fig. 42, the outer reversing ring 189 is apertured (see also Fig. 35) at 260 and the inside of the ring adjacent to the aperture is milled to a plane surface. The outer surface of the inner ring 190 is also milled to a plane surface spaced from the plane inner surface of ring 189 to form a recess 261 in which is located an equalizing lever 262. One end of lever 262 is pivoted to ring 189 by stud 263 and the other end is secured to ring 190 by stud 264.

Lever 262 is moved by ball 259 which engages the periphery of a hole passing through the lever at a point somewhat nearer stud 263 than stud 264.

It is important that the same engaging pressure be exerted on the roller detents of both clutches, and as there is a slightly greater member of detents in the inner or action clutch than in the outer or reaction clutch, a greater turning force should be applied to the cage of the former than to the cage of the latter in order to secure the same unit engaging pressure on all of the roller detents. The difference in the diameters of the clutches and their respective shifting sleeves and rings must also be taken into consideration in order to effect equalized engaging pressure on the detents.

With ball 259 offset as shown, it will be seen that the shifting force applied thereby will be divided by lever 262 into two unequal forces, the greater force being applied through stud 263 to the shift ring 189 actuating the inner cage, and the lesser force being applied through stud 264 to the shift ring 190 actuating the outer cage.

In Figs. 32 and 41 the reversing shaft is shown in one of its two positions of rest, the position shown being that for clockwise drive as viewed from the left of Fig. 32. In this position of shaft 228, shift rings 189 and 190 are near their extreme right-hand position. Considering now for a moment the entire shifting and clutch assembly mechanism, it will be seen that the amount of engaging force transmitted to the clutch detents depends on two factors, the first being the strength of springs 38 and the second being the amount of rotational displacement of the clutch cages with respect to the clutch sleeves. The latter factor is a function of the amount of axial displacement of shift rings 189 and 190 from their center positions, and this displacement is in turn a function of the amount of eccentricity of ball 259 with respect to the axis of shaft 228. A force tending to increase the eccentricity of ball 259, and therefore increasing the engaging force applied to the clutch detents by tending to increase the rotational displacement of the cages, is exerted by rod 265 passing loosely through a hole drilled obliquely through shaft 228 so that the inner end of rod 265 engages arm 266 of the bell crank lever 257. The outer end of rod 265 projects beyond the end of shaft 228 and it is evident from Fig. 41 that if this end of the rod is pressed inwardly it will, through the action of the bell crank 257 and ball 259, tend to move the shift rings further to the right and increase the pressure exerted on the clutch detents. Inwardly directed pressure is applied to rod 265 by means of the lever 267, pivoted intermediate its ends about pin 268, the latter being mounted in the forked stud 269 screwed into the flange 246 of the reversing shaft housing. One end of lever 267 engages pin 265 while the opposite end is forced outwardly under the influence of a coil spring 270.

It is thus evident that the engaging force applied to the clutch detents is the result of the forces exerted thereon by spring 38 and spring 270. The necessary force could be applied without the use of spring 270 if springs 38 could be made to operate through a relatively large range of movement. I have found, however, that due to certain inertia forces set up in the roller detents themselves during operation, the diameters of the detents and also of the clutch sleeves must be kept below a certain maximum if the most efficient design of clutch is to be obtained. In order to do this and at the same time to provide a sufficient number of detents to transmit the required forces, the detents should be spaced so closely that there is not room enough to insert springs of greater range movement between them than are provided. I therefore provide spring 270 to supply the desired enlarged range of action, the spring 270 acting to move the roller cages to supplement the action of the springs 38 per se.

Reversal of the position of the clutches to effect reversal of drive is effected, as previously noted, by turning shaft 228 through a half revolution, the movement of shaft 223 being in counter-clockwise direction as viewed from the outer end of the shaft (Fig. 41). It is to be noted that when shaft 228 is in its position of rest, the pivot pin 256 is not quite normal to the plane passing through the axes of shafts 228 and 148, but is instead inclined about 15° in a direction such that the first 15° of rotation of shaft 228 in effecting reversal is required to move the pin 256 to a position normal to the plane. During this initial movement of shaft 228 the movement of ball 259 is extremely slight, but such movement as does occur is to the right (Figs. 32 and 41), which tends to tighten rather than to free the clutch rollers from engagement with the clutch sleeves. The next 15° of rotation of shaft 228 serves to move ball 259 to the left just sufficiently to return it to the same position it occupied before the reversing shaft was moved. This permits shaft 228 to be rotated 30° before any reversing action on the shifting rings 189 and 190 takes place. During this 30° of rotation of shaft 228 before actual reversal is commenced, the clearance between the rollers 227 in the scissor mechanism (Fig. 39) and cam faces 238 is taken up. The next 120° of rotation of shaft 228 operates to shift rings 189 and 190 to their left-hand positions (Fig. 32) to effect reversal of the roller cages. At the beginning of this 120° rotation, cam faces 238 spread rollers 227 to operate the scissor mechanism and free the coupling between the clutch mechanism and the abutment. Only slight movement is necessary to collapse ring 219 to free the clutch mechanism. While rings 189 and 190 are moved in the direction for reversal during this freeing operation, this movement is very slight and has no effect, the net result being that release of the clutch mechanism is effected before reversal takes place. As will be presently explained, it is highly desirable that the freeing of the clutch mechanism from the abutment take place so that, when the clutches are gripped, as little time as possible intervenes between the release and the subsequent movement of the roller detents out of gripping position. It will be seen that the reversal begins when the roller detents leave gripping position although some of the reversing mechanism may have had prior movement.

The scissor mechanism maintains the coupling in freed position during the actual reversing period. During the last 30° of the half revolution of the reversing shaft the cam faces 238 on shaft 228 move to permit the scissor mechanism to expand ring 219 to reengage the releasable coupling just as reversal of the clutches is being completed.

It will be evident that the movement of shaft 228 through another half revolution will act to again reverse the clutches and return the entire shifting mechanism to the position shown in the figures, in the same manner and sequence as above described.

In order to provide clutches of the gripping type which will continue to function over long periods of service without undue wear it is highly important that frictional wear on the clutch detents and sleeves be reduced to a minimum. I have discovered that the necessary forces can be transmitted through the clutches without breaking the oil film between the rollers and the sleeves, thus avoiding destructive metal-to-metal contact, provided the engaging force exerted on the detents is not too great or applied for too long a period of time. On the other hand, an insufficient engaging force will allow an oil film of sufficient thickness to remain between the sleeves and detents to cause slippage. Moreover, the value of the force required to effect reduction of the oil film to the proper thickness without actually breaking it varies widely under different operating conditions. For example, at one time the oil may be heavy and viscous, as when starting in cold weather, while at other times it may be very light and fluid. Under the first condition a greater engaging force is required to bring the detents into proper engaging position than in the latter case. Again, if the transmission is operating at high speed in indirect drive the alternate grip and release of the roller detents is very rapid, so that the oil accumulating between them and the sleeves during release periods must be squeezed out to the proper film thickness in an extremely small time interval. In order to do this a relatively heavy engaging force is necessary, but it will also be seen that as the time intervals of engagement increase the engaging force must be decreased or there is likelihood of breaking the oil film. A relatively light engaging force on the clutch rollers is particularly desirable under conditions of direct or synchronous drive when the action clutch detents are in unrelieved engagement for long periods of time and the reaction clutch detents are continuously overrunning. Under these conditions the action clutch detents are not in motion with respect to their cooperating gripping surfaces, but the reaction clutch detents are continuously overrunning, and if a heavy engaging pressure were applied thereto, there would not only be an unnecessary loss due to friction, but eventually wear on these detents would be accelerated. Furthermore, when the transmission is operating under direct drive conditions, it may frequently overrun or freewheel due to the fact that the vehicle in which the transmission is placed is coasting down an incline. Under these conditions the action clutch detents overrun and a relatively light engaging pressure thereon is desirable in order to minimize friction and possible wear.

In order to meet these varying conditions and to provide at all times, as nearly as possible, just the required amount of engaging force and no more, I make use of special means, coacting with the lubricating system, for varying the engaging force applied. This means, which will now be described, is shown in Figs. 41 and 47. An open ended sleeve 270a is threaded into a circular recess in web 245, being spaced from the walls thereof to provide communication between the interior of the sleeve and a conduit 271 through which oil under pressure is supplied. Within sleeve 270 is located the piston 272, the head of which is apertured at at 273. An annular clearance 274 is provided between piston 272 and sleeve 270a. The skirt of piston 272 is threaded to receive the annular retaining ring 275 upon which rests the flanged skirt of an inner piston 276, the head of this piston slidably engaging the wall of aperture 273 in the head of the outer piston. The skirt of piston 276 is pierced by two sets of holes, one set of holes 277 being located just below the piston head while the second set of holes 278 is located adjacent to the lower flanged end of the skirt. A heavy coil spring 279 around piston 276, compressed between the head of piston 272 and the skirt flange of piston 276, normally keeps the flange in contact with the retaining ring 275 so that the heads of the two pistons form in effect a single piston head exposed to the pressure of oil supplied through conduit 271. A pin 280, shouldered at 281, is located inside piston 276, one end of the pin engaging the under side of the piston head and the other and smaller end projecting through a hole in the end of lever 267. Spring 270, above referred to as exerting a force on lever 267, is held in compression between a flange on the pin 280 and an annular shouldered retainer 282 seated in a spherical recess in lever 267.

When the parts are in the position shown in Fig. 41, spring 270 exerts a fixed force on lever 267, which with the forces exerted by the cage springs 38 constitutes the minimum engaging force applied to the detents. By reference to Figs. 25 and 47 it will be seen how the above described mechanism coacts with the lubricating system to vary the engaging force applied to the clutch detents. As in the forms of apparatus previously described, an oil circulating lubricating system is employed, but in the present instance pressure feed is used, the oil pump (not shown) preferably varying its rate of feed in accordance with variations in the speed of the driving shaft. Oil from the pressure source is supplied through the inlet conduit 283, of which conduit 271 is a branch. Oil is fed to the transmission from conduit 283 through the hollow drive shaft 1 and the clearance spaces between the splines on the front end of shaft 148 and the fly-wheel hub 147. From the pocket 284 the oil flows rearwardly through the annular space between shaft 148 and member 150, through the small oil holes 151 in the latter and thence forwardly in the annular space between member 150 and the action clutch sleeve 10 to the bearing 162. It is to be noted that the path of flow from pocket 284 to this point is relatively long and of restricted area, so that considerable resistance to flow is encountered. Oil reaching bearing 162 flows rearwardly therethrough and through the action clutch, the clutch cage rings being suitably ported, as at 286, to permit relatively free flow. After passing through bearing 184 the direction of the oil flow is reversed by the extension 185 (see Fig. 32) on the bearing race 183. The extension 196 of the reaction clutch cage is provided with a number of internal screw-thread like ribs 287 which serve to keep the major portion of the oil from flowing rearwardly at this point. The oil is thus forced forwardly through the reaction clutch and bearing 199 from which point it flows into the space within the reaction wheel in which the masses 7 are located, and by splash lubricates bearings 160. Thrown by centrifugal force to the casing rim, it flows to the bottom thereof, where it is picked up by the starter gear teeth 106 and carried thereby, in the channel 288 formed by ribs 289, to outlet passages 289a (Fig. 26), from whence it is returned to the pump supply.

A certain amount of oil passes the ribs 287 and finds its way to the shift sleeves and rear main bearings. It will readily be seen that the introduction of the oil along the central axis of the transmission permits the distribution of oil to be largely effected by centrifugal force, which in effect acts as a distributing pump within the transmission.

In addition to the general path of flow just described, I provide a by-pass within the transmission through which the oil may pass directly from pocket 284 to the sleeve bearing 162. This by-pass is formed by the channel 290 cut in clutch sleeve 8, which channel registers at certain times with a port 291 drilled through the fly-wheel hub 152. Both the general path of flow and the by-pass are shown by the arrows in Fig. 47.

Now let us assume that drive is commenced under cold weather conditions, with chilled oil. This calls for maximum engaging pressure on the rollers. As long as indirect drive is in effect the by-pass through port 291 is virtually closed, since the hub 152 is rotating at high speed in one direction while sleeve 8 is moving (in either the same or the opposite direction, in accordance with the direction of drive for which the transmission is adjusted) at a much lower speed. Port 291 is thus passing the entrance to channel 290 with great rapidity due to the differential speed existing between hub 152 and sleeve 8. With this by-pass closed, the oil is forced to travel through the long restricted path between elements 148, 150, and 10, which causes a high pressure to be built up in supply conduit 283 due to resistance, particularly as under the assumed conditions the oil is heavy and viscous. This high pressure is reflected in the pressure of the oil reaching pistons 272 and 276 through branch 271, and the high pressure is maintained on the pistons because of the fact that the flow of the viscous oil past piston 272 through the clearance space 274 is relatively slow. In other words, both the pressure relief by-pass through port 291 and the by-pass through space 274 are in effect closed, to maintain the maximum oil pressure on the oil pistons.

Due to the fact that spring 279 is proportionately heavier than spring 270, the pistons 272 and 276 move outwardly under the influence of the oil pressure, compressing the spring 270 and thereby increasing the engaging force applied through lever 267 to the clutch detents. The double piston structure is provided to prevent excessive force being applied by the pistons in case an abnormally high oil pressure is built up. If such condition occurs, spring 270 will first be compressed until the shoulder 281 on pin 280 strikes the retainer 282, to stop further movement of piston 276. Piston 272, however, can still continue to move outwardly by compressing spring 279, and under abnormal pressure conditions will do so. A small amount of movement of this piston with respect to the now relatively stationary piston 276 will cause the ports 277 to be uncovered, thus providing a large relief channel through the interior of piston 276. Ports 278 are provided in order to avoid any possibility of the space between the two pistons forming a closed pocket which might become oil filled by leakage and prevent differential movement of the two pistons.

As the temperature of the oil increases, due to continued running, the viscosity of the oil will decrease and consequently a lower engaging pressure on the roller detents will be desirable. This pressure is automatically lowered in proportion to the lowering of the viscosity of the oil, due to the fact that as the oil becomes more fluid it will flow more freely through the clearance space 274, thereby reducing the pressure on the oil pistons if the oil is supplied thereto through conduit 271 at constant pressure.

If it is now assumed that the transmission changes over from indirect drive to direct drive, the by-pass through port 291 will be opened, since in direct drive sleeve 8 and hub 152 rotate at the same speed and in the same relative rotational positions, thus bringing port 291 into registry with passage 290. The opening of this by-pass acts to reduce the pressure in conduits 283 and 271, and consequently lowers the pressure acting on the oil pistons. This effects a further reduction in the engaging pressure on the clutch detents, as is desired in the case of direct drive.

When the transmission is operating at a speed approaching direct drive, the differential speed between sleeve 8 and hub 152 is relatively low, and port 191 is consequently in registry for longer periods of time than when the differential speed is higher, and under these conditions this by-pass may cause pressure fluctuations in the inlet conduit 283. To prevent these fluctuations from adversely affecting the oil pistons, a check valve 292 is placed in conduit 271 to hold the pressure on the pistons during such periods. Of course, if the pressure in conduit 271 drops for any considerable period of time, as in direct drive, the check is ineffective to hold pressure on the oil pistons, as pressure thereon is soon relieved by flow through the clearance space 274.

From the above it will be seen that the engaging pressure on the clutch detents is automatically increased and decreased in accordance with variations in drive and lubricating conditions, in a manner insuring sufficient pressure to effect proper drive, without slippage, while at the same time relieving the detents of excess pressure so as to minimize wear and insure long life.

Returning now to the mechanism for effecting reversal, it will be observed that the meshing teeth employed to prevent relative rotation of the clutch parts during reversal have been omitted in the present form of construction. I have found that reversal can be accomplished satisfactorily, without damage to the clutches, if, prior to reversal, the action clutch sleeve is stopped and the reaction clutch sleeve is freed, provided reversal is effected with sufficient rapidity so that during the reversing period the freed reaction sleeve is not given sufficient time to begin rotation under the influence of any forces acting on it.

Therefore, in the present embodiment of the invention I hold only the action clutch sleeve, and provide mechanism for insuring substantially instantaneous reversal of the clutch parts. To hold the action clutch sleeve stationary, I employ the driven shaft flywheel as a brake drum, engaged by internally expanding brake shoes 293, and insure the application of the brake to stop the driven shaft and action clutch sleeve before reversal is effected, by providing means for controlling both the action of the brake and the reversing mechanism through the medium of a single operating member. This operating member is so arranged that it must pass through a position insuring full application of the brakes, before reversal of the direction of drive through the transmission can be effected.

In the present embodiment, which is designed for use in an automobile, the operating member is in the form of a foot pedal 294 (Fig. 48), although it will readily be seen that this member might equally well take some other form, as for example, a hand operated or even remote controlled lever. Pedal 24 is pivoted to frame 12 at 295, and is connected by means of the pivoted link 296 to the end of an arm 297 rigidly secured to a sleeve member 299 (Fig. 42) rotatably mounted in the main frame 12 by means of ball bearings 300. Sleeve member 299 is internally bushed at 301 to provide journals for the support of a brake shaft 302, the outer end of which is journalled in the frame or casing cover plate 303 and projects therethrough. The projecting end of shaft 302 is squared as at 304 to receive the brake operating lever 305 (Fig. 48). Lever 305 is in turn pivotally connected by means of an adjustable link to an intermediate lever 306 pivoting about pin 307 fixed to frame 12. Lever 306 transmits motion from lever 305, through the pivot connection 307, to lever 308, the latter operating about a fixed center pivot 309 to actuate the brake applying ring 310.

As the details of the specific brake shoe applying mechanism are not per se germane to the invention herein claimed they will not be described in detail. For a more complete description of the brake mechanism per se, reference may be had to my copending application Serial No. 392,083, filed September 12, 1929.

In contrast with usual practice I apply the brakes through the medium of means other than manual, such for example, as a spring, said means having sufficient strength to insure application of the brake with enough force to lock the brake drum. Release of the brake is manually effected through mechanism operated by the single control member, which member also controls the means for reversing the transmission.

This brake applying and releasing mechanism, as shown in Figs. 40 to 42, comprises a lever 311 pivoted at one end about a pin 312 secured to frame 12. The free end of lever 311 carries a pin 313 on which is journalled a roller 314. About midway of the length of lever 311 is a laterally extending boss 315, the lower face of which is recessed to receive a spring retainer 316 holding the upper end of the main brake spring 317. Spring 317 is seated at its lower end in the cylindrical cap 318 screwed into the main frame 12. The brake shaft 302 has rigidly secured thereto, as by threads and pin 319, a cam plate 320 engaging the roller 314. The right end of the cam surface of plate 320 (as viewed in Fig. 40) is in the form of an arcuate recess 321 into which the roller 314 is forced under the influence of spring 317. The lefthand portion 322 of the cam surface follows a curve such that the perpendicular to a tangent at any point thereof passes slightly to the left of the axis of brake shaft 302. The position of the parts in Fig. 40 represents full brake-on position.

Depending from the actuating sleeve member 299, and integral therewith, is the arm 323 (Figs. 40, 42 and 44) adapted to laterally engage pin 324 on the cam plate 320. It will be seen from Fig. 40 that counter-clockwise movement of arm 323, from the position shown in the figure, which is effected by depression of the operating pedal, will operate to cause a like movement of cam 320. The initial movement of cam 320 will cause depression of lever 311 to compress the brake spring and, through movement of brake shaft 302 and lever 305, effect release of the brakes. As the pedal is depressed further, cam plate 320 is rotated further in the same direction, but substantially no further motion is transmitted to the brake actuating mechanism, which by this time is in fully released position, because of the lost motion connection provided by slot 305a in lever 305. It is to be noted that when the roller is in contact with surface 322 the force of spring 317 exerts substantially no rotational force on the cam plate, and therefore the brake spring offers substantially no resistance to depression of the operating pedal as long as the latter is held in a position in which the brake is released. It is also to be noted that when in brake-on position, that is, with the roller 314 in the recess 321, no rotational force is exerted on the cam plate by brake spring 317.

In order to properly control the engine during reversal and to provide a completely unified control in the case of an automobile I connect the engine throttle rod 324 (Fig. 48) to a lever 325 fixed on the end of throttle shaft 326 carried in frame 12. Shaft 326 has pinned thereto a second lever 327 (Fig. 40) through which the rod 328 loosely passes. One end of rod 328 is pivotally connected by means of pin 329 to arm 323 (Fig. 44) and the other end is threaded to take a cylindrical adjusting nut 330 adapted to engage a recess in lever 327 as rod 328 is moved to the right. The throttle connection through rod 324 is such that movement of rod 328 to the right opens the throttle, and it will be seen that a lost motion connection is provided between rod 328 and shaft 326 which permits rod 328 to be moved to the right, by movement of arm 323, sufficiently to release the brakes before the throttle is moved.

At the lower end of arm 323 is pivoted the reversing pawl 254, which is held in engagement with the ratchet wheel 252 by means of spring 331. In order to prepare the mechanism for reversal, the operating pedal 294 is lifted (as by means of a light stirrup thereon, not shown).

This action rotates arm 323 in clockwise direction to move the pawl to the position shown in Fig. 44, in engagement with the next notch of the ratchet wheel 252. Clockwise motion of arm 323 from the position shown in Fig. 40 to that shown in Fig. 44 will not affect either brake or throttle, as the arm will move away from pin 324 on the brake cam plate, and the rod 328 will move without affecting lever 326. As a safety measure, a collar 332 is provided on rod 328 which will strike lever 326 and move the throttle to idling position in case it is held open by a hand throttle connection at the time reversal is prepared for. This arrangement automatically prevents undesirable high engine speeds from occurring during the reversal period.

Actual reversal of the clutch mechanism is accomplished by moving the control pedal from its lifted position back to the mid position shown in Fig. 48. This movement causes the arm 323 to move in counter-clockwise direction from the position shown in Fig. 44 to the position shown in Fig. 40, which results in a one-sixth revolution in the opposite direction of rotation of ratchet wheel 252. This one-sixth revolution is translated by means of gears 249 and 248 into a half revolution in counter-clockwise direction of the reversing shaft 228 which releases the coupling between the clutch mechanism and the abutment and effects reversal of the clutches in a manner already described.

It will be recalled that during the reversal period the scissor mechanism operates to free the reaction sleeve and mass from the frame abutment. It must further be borne in mind that reversal is effected in the majority of instances with the motor running and sleeve 8 receiving impulses from the motor driven inertia masses 7. If reversal of the clutches were effected slowly, impulses from sleeve 8 might be transmitted by the reaction clutch to the reaction sleeve and mass after the latter were freed and before the clutch was fully disengaged. Such action would cause the reaction mass to rotate and the shock incident to stopping it by full reversal of the clutches would be highly undesirable. In order to prevent such action taking place, I provide means to insure the practically instantaneous reversal of the clutches and relocking of the reaction mass after the mass is freed.

This means comprises a spring arranged to resist movement of the reversing shaft 228 until a predetermined and relatively heavy force is applied thereto by the operator. As soon as this predetermined amount of force is applied, the spring resistance suddenly fails, leaving the shaft free to rotate a half revolution to effect the complete reversing operation. It will readily be appreciated that with the operator exerting the amount of force on the operating pedal necessary to overcome the resistance imposed, sudden failure of the resistance will cause an involuntary, quick motion on the part of the operator which will operate to literally snap the mechanism to its reversed position. I have found that if reversal is effected in from one twenty-fifth to one-fiftieth of a second, it may be safely done with the reaction mass free and I have further found, by experiment, that if a resistance to reversal is imposed necessitating an application on the part of the operator of a force of 20–50 kilograms to overcome it, the sudden release of this resistance will invariably cause the reversal to be effected by the operator within the desired length of time. Turning now to Figs. 42, 45 and 46, it will be seen that shaft 228 is provided with a generally diamond-shaped cam 333, the points 334 and 335 of which are arranged to be successively engaged by a boss or lug 336 projecting from the pivoted lever 337. One end of lever 337 is carried by the pivot pin 338 secured to the housing flange 246, while the opposite end has an opening through which stud 339 passes, the latter being secured to pin 340 which is also mounted on flange 246. Spring 341, around stud 339, is held in compression between a retaining washer 342 on the lower end of the stud and the end of lever 337. The force with which spring 341 holds the lever 337 against the head of stud 339 may be varied by means of the adjusting nut 343. From Fig. 46 it will be seen that spring 341 normally holds the lug 336 in a position preventing the counter-clockwise rotation of shaft 228 necessary to effect reversal, and that this lug can be forced out of the way by the application of sufficient turning force to shaft 228 to cause compression of spring 341. Due to the mechanical advantage enjoyed by spring 341, it may be relatively light and yet furnish the requisite resistance. As soon as sufficient turning force is applied to the reversing shaft to force the lug 336 out of the way of the cam point 334, the resistance to further turning is suddenly released until the shaft has been turned a half revolution and reversal effected. At the end of a half revolution of shaft 228 cam point 335 is brought into contact with lug 336, which, after being forced downward by the passage of cam point 334 is returned to its original position by spring 341. Due to the fact that the operating pedal cannot turn shaft 228 more than a half revolution without being again lifted to latch pawl 254 into the next notch of ratchet wheel 252, there is no danger of cam point 335 passing lug 336 unless such action is intended by the operator. In order to hold the cam points firmly against the face of the lug, so that the reversing shaft 228 will be in the correct normal operating position between reversals, the snap latch 344 is provided, this latch being pivoted about pin 338. A light spring 345 tends to rotate the latch in counter-clockwise direction, but this movement is prevented by contact of the latch face 346 with the trailing face of the cam point 334 or 335, as the case may be, so that spring 345 operates to keep the cam points in contact with the face of lug 336. The latch face 346 will be lifted by spring 345 when cam point 334 is moved out of engagement therewith, but will again be depressed by the passing cam point 334 or 335 as the position of the cam points is reversed.

By reference to Fig. 46, it will be seen that about 30° of rotation of the reversing shaft 228 is required before the cam point 334 can freely pass the depressed lug 336. This action takes place during the initial 30° of movement of shaft 228 previously described, prior to both release of the coupling and actual reversal of the clutch mechanism.

In cases where the transmission is applied to automobiles, it frequently happens that the automobile must be moved at times when the doors thereof are locked. Inasmuch as the normal position of rest of the operating pedal is such that the brakes are on, it is desirable to provide means for releasing the brakes from the exterior of the automobile. I provide such means in the form of the auxiliary brake release shaft 241 (see Fig. 41) journalled in the frame web 245 and cover plate 303 and projecting through the latter. Any suitable form of linkage (not shown) may be provided for actuating this shaft from the exterior of the automobile, or it may be actuated by a removable crank similar to a hand starting crank. Shaft 241 is provided with a cam 346, adapted, upon counter-clockwise rotation of the shaft from the position shown in Fig. 40, to depress the lever 311 and effect release of the brakes. The inner end of shaft 241 is provided with the cam faces 240, which, as before explained, act to operate the scissor mechanism when the shaft is rotated and free the reaction sleeve from the frame abutment so that the automobile can be moved in either direction regardless of the position of adjustment of the transmission.

I wish to point out that in applying transmissions built in accordance with my invention to automobiles, it is desirable to have a driving connection between the transmission and the driving wheels which has a limited amount of torsional resilience, since such torsional resilience improves to some degree the smoothness of operation of the automobile. I have found that the live axles in an automobile rear axle of the known full-floating type provide the desired torsional resilience when such live axles are made in accordance with usual practice. On the other hand, I have found that where a semi-floating rear axle is used, the live axles, due to the fact that they are subjected to bending as well as torsional stress, are usually made so stiff that the desired amount of torsional resilience in the driving connection is not present.

In cases where axles having substantially no torsional resilience are employed, as for example, in the type of automobile to which I have applied the transmission shown in Fig. 25, the requisite resilience in the driving connection from the transmission to the rear wheels may be provided in numerous different ways. For example, I have in such cases supplied the limited amount of torsional resilience desired by substituting for the usual torsionally stiff tubular propeller shaft a propeller shaft made up of a plurality of rods of relatively small diameter, arranged parallel to each other and concentrically about the axis of the propeller shaft assembly. This form of propeller shaft construction is disclosed in my copending application Serial No. 218,293, filed September 8, 1927.

In the above specification it will be understood that the clutch parts are considered as being in contact or in engagement when force is transmitted through them, though there is an oil film between the parts.

It will be understood that the invention is not limited to any particular construction, but may be embodied in a variety of forms of apparatus, as shown by the several embodiments herein before described. It will be understood that a great variety of changes may be made in the construction and arrangement of parts and in the carrying out of the method of the invention without departing from the spirit or scope thereof.

In connection with the form of transmission illustrated in Figs. 25 to 50, I have described numerous features not present in the earlier described forms, amongst which are, for example, the reaction inertia mass, the combination with such mass of means for freeing the same during reversal, the means for effecting quick reversal, the brake mechanism arranged to stop the driven shaft before reversal can be effected, the automatic means for varying the engaging force applied to the roller detents, the unitary pedal, and others. Many of these features are shown and claimed in my copending applications Serial Nos. 197,430; 218,293; 330,740; 374,830; 375,174; 375,506; and 392,083. The present application includes claims to the broad features of the transmission generic to all forms of the transmission herein shown and, with respect to species, I elect to include in this application specific claims to the embodiments shown in Figs. 2, 7 and 13 and related figures, reserving the right to claim all other novel features specific to the embodiment shown in Fig. 25 and related figures in other applications now pending or to be filed. Furthermore, it will be noted that the claims of this application are to the transmission features, including reversal means therefor. The combination of the transmission with braking mechanism and fuel control and other features forming novel operating and control mechanism for self-propelled vehicles which I have devised are claimed in one or more separate applications.

What I claim is:

1. In a variable-speed power transmission, a driving shaft, a driven shaft, an abutment, means actuated by the driving shaft for alternately producing opposite turning moments, and a plurality of reversible one-way clutches for transmitting the produced opposite turning moments to the driven shaft and the abutment respectively.

2. In a variable-speed power transmission, a driving shaft, a driven shaft, an abutment, mechanism actuated by the driving shaft for alternately producing opposite turning moments, a plurality of clutch assemblies for transmitting the produced opposite turning moments to said driven shaft and said abutment respectively, each clutch assembly being alternatively capable of gripping in either direction and releasing in opposite directions and means for selectively altering the clutch assemblies to grip and release in opposed relations.

3. In a variable-speed power transmission, a driving shaft, a driven shaft, an abutment, means actuated by the driving shaft for alternately producing opposite turning moments, a plurality of reversible one-way clutches for transmitting the produced opposite turning moments to the driven shaft and the abutment respectively and means to concurrently reverse the clutches to grip and release in opposed relations.

4. In a variable-speed power transmission, a driving shaft, a driven shaft, an abutment, means actuated by the driving shaft for alternately producing opposite turning moments, a plurality of reversible one-way clutches for transmitting the produced opposite turning moments to the driven shaft and to the abutment respectively comprising rotatable detent retaining cages and detents adapted to grip and release in opposed relations and means to concurrently rotate cages of clutches of opposed relations in opposite directions to reverse the clutches.

5. In a variable-speed power transmission, a driving shaft, a driven shaft, an intermediate power transmitting member separate from the driven shaft, an abutment, mechanism actuated by said driving shaft and alternately applying opposite turning moments to said intermediate member, members forming a reversible one-way clutch acting between said intermediate member and said driven shaft, members forming a reversible one-way clutch acting between said intermediate member and said abutment, and means for reversing said clutches to grip and release in opposed relations.

6. A variable-speed power transmission comprising a driving member, a driven member, a reversible one-way clutch for transmitting force from the driving member to the driven member, and means for relieving the clutch from stress before effecting reversal thereof.

7. A variable-speed power transmission comprising a driving member, a driven member, an abutment, means actuated by the driving member for alternately producing opposite turning moments, means including reversible one-way clutch mechanism for transmitting the produced opposite moments in alternation to the driven member and to the abutment, and means for relieving the clutch mechanism from stress before effecting reversal thereof.

8. A variable-speed power transmission comprising driving mechanism for alternately producing forces of opposite sense, force-receiving members comprising a driven member and an abutment, clutch mechanism for transmitting forces of one sense to the driven member and of the opposite sense to the abutment, said clutch mechanism comprising means for maintaining a continuous path for the transfer of the produced forces from the driving mechanism to either the driven member or to the abutment, and means for breaking the path of force transmission to one of said members at will.

9. A variable-speed power transmission comprising driving mechanism for alternately producing forces of opposite sense, a driven member, an abutment, clutch mechanism for transmitting forces of one sense to the driven member and of the opposite sense to the abutment, said clutch mechanism comprising means for maintaining a continuous path for the transfer of the produced forces from the driving mechanism to either the driven member or to the abutment, and means for breaking the path of force transmission at will between said clutch mechanism and said abutment.

10. A variable-speed power transmission comprising driving mechanism, a driven member, an abutment, a plurality of reversible one-way clutches gripping in opposite sense and transmitting forces from the driving mechanism to the driven member and to the abutment, and means for concurrently relieving said clutches from stress before effecting reversal thereof.

11. A variable-speed power transmission comprising a driving member, a driven member, an abutment, means actuated by the driving member for alternately producing opposite turning moments, means including a plurality of reversible one-way clutches gripping in opposite sense for transmitting the produced opposite turning moments in alternation to the driven member and the abutment, and means for concurrently relieving said clutches from stress before effecting reversal thereof.

12. A variable-speed power transmission comprising driving mechanism, a driven member, an abutment, a plurality of reversible one-way clutches gripping in opposite sense and transmitting forces from the driving mechanism to the driven member and to the abutment, means for concurrently reversing the clutches, and means for relieving the clutches from stress before effecting reversal thereof.

13. A variable-speed power transmission comprising a driving member, a driven member, an abutment, means actuated by the driving member for alternately producing opposite turning moments, means including a plurality of reversible one-way clutches for transmitting the produced opposite turning moments in alternation to the driven member and to the abutment and means for relieving the clutches from stress and reversing the clutches in immediate sequence.

14. A variable-speed power transmission comprising a driving member, a driven member, an abutment, means actuated by the driving member for alternately producing opposite turning moments, means including a plurality of reversible one-way clutches for transmitting the produced opposite turning moments in alternation to the driven member and to the abutment, means for concurrently relieving the clutches from stress and means for concurrently reversing the clutches after the stress thereon is relieved.

15. A variable-speed power transmission comprising a driving member, a driven member, an abutment, means actuated by the driving member for alternately producing opposite turning moments, means including a plurality of reversible one-way clutches for transmitting the produced opposite turning moments in alternation to the driven member and to the abutment, a common control member, and means actuated by said common control member for concurrently relieving the clutches from stress and thereafter concurrently reversing the clutches.

16. A variable-speed power transmission comprising a driving member, a driven member, an abutment, means actuated by the driving member for alternately producing opposite turning moments, means including a plurality of reversible one-way clutches for transmitting the produced opposite turning moments in alternation to the driven member and to the abutment, a common control member, and means actuated by said common control member for concurrently relieving the clutches from stress and immediately thereafter concurrently reversing the clutches.

17. A variable-speed power transmission comprising driving mechanism, a driven member, an abutment, a plurality of reversible one-way clutches including a common clutch member, one of said clutches constituting an action clutch for transmitting forces from the common member to the driven member and another of said clutches constituting a reaction clutch for transmitting forces from the common member to the abutment, a releasable coupling between the reaction clutch and the abutment, means for reversing the clutches, and means for releasing the coupling before the reversing means effects reversal.

18. A variable-speed power transmission comprising driving mechanism, a driven member, a reversible one-way clutch for transmitting forces to the driven member, means for reversing the clutch, means for relieving the clutch from stress, and common operating means for actuating the reversing means and the stress relieving means.

19. A variable-speed power transmission comprising a driving mechanism producing oppositely directed forces, a driven member, a clutch assembly comprising elements adapted to transmit forces from the driving mechanism to the driven member to effect drive in one direction, and means for arresting movement of the clutch assembly in the opposite direction comprising an abutment and a releasable coupling between the clutch assembly and the abutment.

20. A variable-speed power transmission comprising a driving mechanism producing oppositely directed forces, a driven member, a clutch assembly comprising reversible elements adapted to transmit forces in selected direction from the driving mechanism to the driven member, means for reversing said clutch elements, and means for arresting movement of the clutch assembly in the direction opposite the selected direction comprising an abutment and a releasable coupling between the clutch assembly and the abutment.

21. A variable-speed power transmission comprising a driving member, a driven member, an intermediate power transmitting member separate from the driven member, an abutment, mechanism actuated by said driving member for producing opposite turning moments and alternately applying the same to said intermediate member, a clutch assembly comprising reversible elements adapted to transmit turning moments from the intermediate member to move the driven member in selected direction, means for reversing said clutch elements and means for arresting movement of the clutch assembly in the direction opposite the selected direction comprising an abutment and a releasable coupling between the clutch assembly and the abutment.

22. A variable-speed power transmission comprising driving mechanism for producing oppositely directed forces, a driven member, a clutch assembly comprising reversible elements adapted to transmit forces in selected direction from the driving mechanism to the driven member, means for reversing said clutch elements, means for arresting movement of the clutch assembly in the direction opposite the selected direction comprising an abutment and a releasable coupling between the clutch assembly and the abutment, and means actuated by the reversing means for releasing said coupling.

23. A variable-speed power transmission comprising driving mechanism for producing oppositely directed forces, a driven member, a clutch assembly comprising reversible elements adapted to transmit forces in selected direction from the driving mechanism to the driven member, means for reversing said clutch elements, means for arresting movement of the clutch assembly in the direction opposite the selected direction comprising an abutment and a releasable coupling between the clutch assembly and the abutment, said coupling comprising a friction-locked members normally held in resilient locked engagement, and means for releasing said friction-locked members from engagement.

24. A variable-speed power transmission comprising a driving member, a driven member, an intermediate power transmitting member separate from the driven member, an abutment, mechanism actuated by said driving member and alternately applying opposite turning moments to said intermediate member, a clutch assembly comprising reversible elements adapted to transmit turning moments in selected direction from the intermediate member to the driven member, means for reversing said clutch elements, means for arresting movement of the clutch assembly in the direction opposite the selected direction comprising an abutment and a releasable coupling between the clutch assembly and the abutment, said coupling comprising friction-locked members normally held in resilient locked engagement, and means for releasing said friction locked members from engagement.

25. A variable-speed power transmission comprising a driving member, a driven member, an intermediate power transmitting member separate from the driven member, an abutment, mechanism actuated by said driving member and alternately applying opposite turning moments to said intermediate member, a clutch assembly comprising reversible elements adapted to transmit turning moments in selected direction from the intermediate member to the driven member, means for reversing said clutch elements, means for arresting movement of the clutch assembly in the direction opposite the selected direction comprising an abutment and a releasable coupling between the clutch assembly and the abutment, said coupling comprising friction-locked members normally held in resilient locked engagement and means actuated by the clutch reversing means for releasing said friction locked members from engagement.

26. A variable-speed power transmission comprising a driving member, a driven member, an intermediate power transmitting member separate from the driving member, an abutment, mechanism actuated by said driving member for producing opposite turning moments and alternately applying the same to said intermediate member, clutch mechanism comprising members forming a reversible one-way clutch acting between said intermediate member and said driven member and members forming a reversible one-way clutch acting between said intermediate member and said abutment, means for adjusting said clutches to cause the driven member to be rotated in selected direction, means for arresting movement of the clutch assembly and the driven member in a direction opposite the selected direction comprising a releasable coupling between the clutch assembly and the abutment, said coupling comprising friction-locked members normally held in resilient locked engagement, means for reversing said clutch mechanism to cause said clutches to grip and release in opposed relations, and means actuated by the clutch reversing means for releasing said friction-locked members from engagement.

27. A variable-speed power transmission comprising driving mechanism for producing oppositely directed forces, a driven member, a clutch assembly comprising reversible elements adapted to transmit forces in selected direction from the driving mechanism to the driven member, means for reversing said clutch elements, means for arresting movement of the clutch assembly in the direction opposite the selected direction comprising an abutment and a releasable coupling between the clutch assembly and the abutment, said coupling comprising a resilient split ring normally maintaining the coupling in engagement, and means for altering the spread of said ring to release the coupling.

28. A variable-speed power transmission comprising driving mechanism for producing oppositely directed forces, a driven member, a clutch assembly comprising reversible elements adapted to transmit forces in selected direction from the driving mechanism to the driven member, means for reversing said clutch elements, means for arresting movement of the clutch assembly in the direction opposite the selected direction comprising an abutment and a releasable coupling between the clutch assembly and the abutment, said coupling comprising a resilient split ring normally maintaining the coupling in engagement, and means actuated by movement of the reversing means for altering the spread of said ring to release the coupling.

29. A variable-speed power transmission comprising driving mechanism for producing oppositely directed forces, a driven member, a clutch assembly comprising reversible elements adapted to transmit forces in selected direction from the driving mechanism to the driven member, means for reversing said clutch elements, means for arresting movement of the clutch assembly in the direction opposite the selected direction comprising an abutment and a releasable coupling between the clutch assembly and the abutment, said coupling comprising a plurality of brake blocks, a split spring ring normally engaging the brake blocks and maintaining the coupling in engagement, and means for spreading the ring to release the coupling.

30. A variable-speed power transmission comprising driving mechanism for producing oppositely directed forces, a driven member, a clutch assembly comprising reversible elements adapted to transmit forces in selected direction from the driving mechanism to the driven member, means for reversing said clutch elements, means for arresting movement of the clutch assembly in the direction opposite the selected direction comprising an abutment and a releasable coupling between the clutch assembly and the abutment, and means operated by the reversing means to effect release of the coupling upon abnormal resistance to the actuation of the reversing means.

31. A variable-speed power transmission comprising driving mechanism, a driven member, an abutment, a clutch assembly for transmitting forces from the driving mechanism in alternation to the driven member and to the abutment, and a releasable coupling between the clutch assembly and the abutment.

32. A variable-speed power transmission comprising driving mechanism, a driven member, an abutment, a clutch assembly comprising a plurality of reversible one-way clutches for transmitting forces from the driving mechanism in alternation to the driven member and to the abutment, means for reversing the clutches, and a releasable coupling between the clutch assembly and the abutment.

33. A variable-speed power transmission comprising driving mechanism, a driven member, an abutment, a clutch assembly comprising a plurality of reversible one-way clutches for transmitting forces from the driving mechanism in alternation to the driven member and to the abutment, means for reversing the clutches, and a coupling between the clutch assembly and the abutment, means for releasing the coupling, and common operating means for actuating the reversing means and the releasing means.

34. A variable-speed power transmission comprising driving mechanism, a driven member, an abutment, a clutch assembly comprising a plurality of reversible one-way clutches for transmitting forces from the driving mechanism in alternation to the driven member and to the abutment to effect drive in selected direction, and a releasable coupling between the clutch assembly and the abutment, said clutch assembly, coupling and abutment constituting means for arresting movement of the driven shaft in a direction opposite to the selected direction of drive.

35. A variable-speed power transmission comprising driving mechanism for alternately producing forces of opposite sense, force receiving members comprising a driven member and an abutment, clutch mechanism for transmitting forces of one sense to the driven member and of the opposite sense to the abutment, said clutch mechanism comprising means for insuring an uninterrupted path for the transmission of the produced forces at all times including the time of shifting of force application from the one to the other of said force receiving members, and means for breaking the path of force transmission to one of said members at will.

36. A variable-speed power transmission comprising driving mechanism for alternately producing forces of opposite sense, an intermediate member for receiving the produced forces, force receiving members comprising a driven member and an abutment, parts forming a clutch for transmitting forces of one sense from the intermediate member to the driven member, parts forming a second clutch for transmitting forces of the opposite sense to the abutment, means for maintaining the parts of one clutch in contact for force transmission while the other clutch is transmitting force to one of the force receiving members, and a releasable coupling between the second clutch and the abutment.

37. A variable-speed power transmission comprising driving mechanism for alternately producing forces of opposite sense, force receiving members comprising a driven member and an abutment, clutch mechanism for transmitting the produced forces of one sense to the driven member and of the opposite sense to the abutment, said clutch mechanism comprising a plurality of reversible one-way clutches for transmitting the produced forces of selected sense to the driven member and of opposite sense to the abutment and means for reversing said clutches, and said clutch mechanism comprising means for insuring continuous transmission of the produced forces to the one or the other of the force receiving members.

38. A variable-speed power transmission comprising driving mechanism for alternately producing forces of opposite sense, a driven member, an abutment, an action clutch for transmitting forces of one sense from the driving mechanism to the driven member, a reaction clutch for transmitting forces of the opposite sense from the driving mechanism to the abutment, said clutches comprising parts having gripping surfaces, associated detents movable with relation to said parts and adapted to engage said surfaces resilient means for continuously forcing the detents of both clutches against their associated surfaces, and a releasable coupling between the reaction clutch and the abutment.

39. A variable-speed power transmission comprising a driving member, a driven member, an intermediate power transmitting member separate from the driven member, an abutment, mechanism actuated by said driving member for producing opposite turning moments and alternately applying the same to said intermediate member, a plurality of overrunning one-way clutches arranged to engage and release in opposed relations to transmit the turning moments applied to said intermediate member in alternation to the driven member and to the abutment, each clutch comprising parts having gripping surfaces, associated rollers movable with relation to said parts and springs arranged to force the rollers against their associated gripping surfaces whereby each clutch will release and engage without lost motion.

40. A variable-speed power transmission comprising driving mechanism for alternately producing forces of opposite sense, a driven member, an abutment, clutch mechanism for transmitting forces of one sense to the driven member and of the opposite sense to the abutment, said clutch mechanism comprising rollers for transmitting the produced forces of opposite sense from the driving member to the driven member and to the abutment respectively, and resilient means for maintaining said rollers in force-transmitting relation with the driving mechanism, the driven member and the abutment as the sense of the produced force alternates, whereby transmission of the forces is effected without back-lash in the clutch mechanism.

41. A variable-speed power transmission comprising driving mechanism for alternately producing forces of opposite sense, a driven member, an abutment, clutch mechanism for transmitting forces of one sense to the driven member and of the opposite sense to the abutment, said clutch mechanism comprising rollers for transmitting the produced forces of opposite sense from the driving member to the driven member and to the abutment respectively, and leaf springs contacting said rollers to maintain them in force-transmitting relation with the driving mechanism, the driven member and the abutment as the sense of the produced force alternates, whereby transmission of the forces is effected without back-lash in the clutch mechanism.

42. A variable-speed power transmission comprising driving mechanism for alternately producing forces of opposite sense, a driven member, an abutment, clutch mechanism for transmitting forces of one sense to the driven member and of the opposite sense to the abutment, said clutch mechanism comprising rollers for transmitting the produced forces of opposite sense from the driving member to the driven member and to the abutment respectively, cages for said rollers and leaf springs mounted in said cages for maintaining the rollers in force-transmitting relation with the driving mechanism, the driven member and the abutment as the sense of the produced forces alternates, whereby transmission of the forces is effected without back-lash in the clutch mechanism.

43. A variable-speed power transmission comprising driving mechanism for alternately producing forces of opposite sense, a driven member, an abutment, clutch mechanism for transmitting forces of one sense to the driven member and of the opposite sense to the abutment, said clutch mechanism comprising rollers for transmitting the produced forces of opposite sense from the driving member to the driven member and to the abutment respectively, cages for said rollers and curved leaf springs mounted in said cages to bear laterally against said rollers at the ends thereof for maintaining the rollers in force-transmitting relation with the driving mechanism, the driven member and the abutment as the sense of the produced forces alternates, whereby transmission of the forces is effected without back-lash in the clutch mechanism.

44. A variable-speed power transmission comprising driving means for producing a series of forces; a driven member; an abutment; mechanism including an intermediate power transmitting member actuated by the driving means and one-way clutch members for transmitting forces in alternation to the driven member and to the abutment, said mechanism forming a unit adapted to be rotatably supported at two points; and members forming two journals, one journal adjacent to each end of the unit, for providing the two point support.

45. A variable-speed power transmission comprising driving means for producing a series of forces; a driven member; an abutment; mechanism including an intermediate power transmitting member actuated by the driving means and one-way clutch members for transmitting forces in alternation to the driven member and to the abutment, said mechanism forming a unit adapted to be rotatably supported at two points; and members forming two journals for providing the two point support, one of said journals being carried by the driving member.

46. A variable-speed power transmission comprising driving means for producing a series of forces; a driven member; a frame forming an abutment; and mechanism including an intermediate power transmitting member actuated by the driving means and one-way clutch mechanism for transmitting forces in alternation to the driven member and to the abutment, said mechanism forming a unit rotatably supported at one end by the driving member, and at the other end by the frame.

47. A variable-speed power transmission comprising driving means for producing a series of forces; a driven member; a frame forming an abutment; mechanism including an intermediate power transmitting member actuated by the driving means, reversible one-way clutch members for transmitting forces in alternation to the driven member and to the abutment, and rotatably movable parts for effecting reversal of the one-way clutch members, said mechanism forming a unit adapted to be rotatably supported at two points; and members forming two journals, one journal at each end of the unit, for providing the two point support.

48. A variable-speed power transmission comprising a driving member, an intermediate power transmitting sleeve rotatably carried at one end by the driving member, mechanism actuated by the driving member for producing turning moments of opposite sense and alternately applying the same to the intermediate sleeve, a driven sleeve, a frame forming an abutment, a reaction sleeve secured to the abutment, members forming one-way clutches between the intermediate sleeve and the other sleeves for transmitting turning moments of one sense to the driven sleeve and of opposite sense to the reaction sleeve, and means for rotatably supporting said sleeves and clutch members as a unit at one end by the driving member and the other end by the frame.

49. A variable-speed power transmission comprising a driving member, an intermediate power transmitting sleeve, mechanism actuated by the driving member for producing turning moments of opposite sense and alternately applying said moments to said sleeve, a driven sleeve and a reaction sleeve both mounted in concentrically spaced relation with respect to the intermediate sleeve and rotationally with respect thereto, one-way clutch mechanism comprising elements cooperating with said sleeves to transmit moments of one sense to the driven sleeve and of the opposite sense to the reaction sleeve, said sleeves and clutch mechanism forming an axially extending unit, and members forming journals at the ends of said unit.

50. A variable-speed power transmission comprising a driving member, an intermediate power transmitting sleeve, mechanism actuated by the driving member for producing turning moments of opposite sense and alternately applying said moments to said sleeve, a driven sleeve and a reaction sleeve both mounted in concentrically spaced relation with respect to the intermediate sleeve and rotationally with respect thereto, reversible one-way clutch mechanism comprising elements rotatably movable with respect to the driven and reaction sleeves and co-operating therewith to transmit moments of selected sense to the driven sleeve and of opposite sense to the reaction sleeve, and means for rotating said elements with respect to the driven and reaction sleeves to effect reversal of the clutch mechanism, said sleeves and clutch mechanism forming an axially extending unit, and members forming journals at the ends of said unit.

51. A variable-speed power transmission comprising a driving member, an intermediate power transmitting sleeve, mechanism actuated by the driving member for producing opposite turning moments and alternately applying said moments to said sleeve, a driven sleeve and a reaction sleeve axially aligned and concentrically spaced with respect to the intermediate sleeve, journals between said sleeves, and one-way clutch mechanism comprising elements cooperating with said sleeves to transmit moments of one sense to the driven sleeve and moments of the opposite sense to the reaction sleeve.

52. A variable-speed power transmission comprising a driving member, an abutment, an intermediate power transmitting sleeve, mechanism actuated by the driving member for producing turning moments of opposite sense and alternately applying said moments to said sleeve, a driven sleeve concentrically spaced with respect to the intermediate sleeve, said sleeves being journalled one on the other, clutch mechanism comprising elements adapted to engage said sleeves to transmit moments of one sense from the intermediate sleeve to the driven sleeve, and clutch mechanism for transmitting moments of opposite sense to the abutment.

53. A variable-speed power transmission comprising a driving member, a driven member, an abutment, an intermediate power transmitting sleeve, mechanism actuated by the driving member for producing turning moments of opposite sense and alternately applying said moments to said sleeve, a reaction sleeve concentrically spaced with respect to the intermediate sleeve, said reaction sleeve and intermediate sleeve being journalled one on the other, clutch mechanism comprising elements adapted to engage said sleeves to transmit moments of one sense from the intermediate sleeve to the reaction sleeve, and clutch mechanism for transmitting moments of the opposite sense to the driven member.

54. A variable-speed power transmission comprising a driving member, an abutment, an intermediate power transmitting sleeve, mechanism actuated by the driving member for producing turning moments of opposite sense and alternately applying said moments to said sleeve, a driven sleeve concentrically spaced with respect to the intermediate sleeve, said sleeves being journalled one on the other and deriving their support at one end as a unit from said driving member, clutch mechanism comprising elements adapted to engage said sleeves to transmit moments of one sense from the intermediate sleeve to the driven sleeve, and means for transmitting moments of the opposite sense from the intermediate sleeve to the abutment.

55. A variable-speed power transmission comprising a driving member, a driven member, an intermediate power transmitting sleeve, mechanism actuated by the driving member for producing turning moments of opposite sense and alternately applying said moments to said sleeve, a reaction sleeve concentrically spaced with respect to the intermediate sleeve, said sleeves being journalled one on the other and deriving their support at one end as a unit from said driving member, clutch mechanism comprising elements adapted to engage said sleeves to transmit moments of one sense from the intermediate sleeve to the reaction sleeve and means for transmitting moments of the opposite sense from the intermediate member to the driven sleeve.

56. A variable-speed power transmission comprising a driving member, a driven member, an abutment, an intermediate power transmitting member, mechanism actuated by the driving member for producing turning moments of opposite sense and alternately applying the same to the intermediate member, reversible one-way clutch members for transmitting forces of selected sense to the driven member, a rotatably movable part for effecting reversal of said clutch members, an axially movable member for effecting rotational movement of said part, and means for transmitting turning moments of the sense opposite the selected sense from the intermediate member to the abutment.

57. A variable-speed power transmission comprising a driving member, a driven member, an abutment, an intermediate power transmitting member, mechanism actuated by the driving member for producing turning moments of opposite sense and alternately applying the same to the intermediate member, reversible one-way clutch members for transmitting forces of selected sense from the intermediate member to the abutment, a rotatably movable part for effecting reversal of said clutch members, an axially movable member for effecting rotational movement of said part, and means for transmitting turning moments of the sense opposite the selected sense from the intermediate member to the driven member.

58. A variable-speed power transmission comprising a driving member, a driven member, an abutment, an intermediate power transmitting member, mechanism actuated by the driving member for producing turning moments of opposite sense and alternately applying the same to the intermediate member, reversible one-way clutch members for transmitting forces from the intermediate member in alternation to the driven member and to the abutment, and rotatably movable parts for effecting reversal of the one-way clutch members.

59. A variable-speed power transmission comprising a driving member, a driven member, an abutment, an intermediate power transmitting member, mechanism actuated by the driving member for producing turning moments of opposite sense and alternately applying the same to the intermediate member, reversible one-way clutch members for transmitting forces from the intermediate member in alternation to the driven member and to the abutment, rotatably movable parts for effecting reversal of the one-way clutch members, and an axially movable member for effecting rotational movement of said parts.

60. In a variable-speed power transmission, a driving member, a driven member, an abutment, means actuated by the driving member for alternately producing opposite turning moments, rotatably mounted mechanism comprising a plurality of reversible one-way clutches for transmitting the produced opposite turning moments to the driven member and the abutment respectively, and axially displaceable rotationally fixed means for effecting reversal of said clutches.

61. In a variable-speed power transmission, a driving member, a driven member, an abutment, means actuated by the driving member for alternately producing opposite turning moments, clutch mechanism for transmitting the produced forces to the driven member and the abutment respectively comprising rollers rotationally movable to change the direction of rotation of the driven member, and an axially displaceable rotationally fixed member for effecting rotational movement of the rollers.

62. In a variable-speed power transmission, a driving member, a driven member, an abutment, means actuated by the driving member for alternately producing opposite turning moments, clutch mechanism for transmitting the produced opposite turning moments to the driven member and the abutment respectively comprising gripping rollers rotationally movable to change the direction of rotation of the driven member, cages for said rollers, and means including an axially displaceable rotationally fixed member for moving said cages rotationally to change the direction of rotation of the driven member.

63. A variable-speed power transmission comprising a driving member, an intermediate power transmitting sleeve, mechanism actuated by the driving member for producing opposite turning moments and alternately applying said moments to said sleeve, a driven sleeve, a reaction sleeve, one-way clutch elements arranged in groups between said intermediate sleeve and each of the other sleeves forming reversible clutches, each clutch being adapted to engage and release in opposite sense, said clutch elements being rotatably mounted with respect to the driven sleeve and the reaction sleeve to effect reversal of the clutches, an axially movable member, and means for translating axial movement of said last named member into rotational movement of the clutch elements to effect reversal.

64. A variable-speed power transmission comprising a driving member, an intermediate power transmitting sleeve, mechanism actuated by the driving member for producing opposite turning moments and alternately applying said moments to said sleeve, a driven sleeve, a reaction sleeve, reversible one-way clutch elements arranged in groups between said intermediate sleeve and each of the other sleeves, each group being adapted to engage and release in opposite sense, said elements being rotatably mounted with respect to the driven sleeve and the reaction sleeve to effect reversal of the clutches, an axially movable member, and means for translating axial movement of said last named member into opposite rotational movement of the groups of clutch elements to effect reversal.

65. A variable-speed power transmission comprising a driving member, an intermediate power transmitting sleeve, mechanism actuated by the driving member for producing opposite turning moments and alternately applying said moments to said sleeve, a driven sleeve, a reaction sleeve, reversible one-way clutch elements arranged in groups between said intermediate sleeve and each of the other sleeves, each group being adapted to engage and release in opposite sense, said elements being rotatably mounted with respect to the driven sleeve and the reaction sleeve to effect reversal of the clutches, an axially movable member, and means for translating axial movement of said last named member into simultaneous opposite rotational movement of the groups of clutch elements to effect reversal.

66. A variable-speed power transmission comprising a driving member, a driven member, an abutment, an intermediate power transmitting member separate from the driven member, mechanism actuated by the driving member for producing opposite turning moments and alternately applying said moments to the intermediate member, said intermediate member being rotatably supported by the driving member, and means including one-way clutch mechanism for transmitting forces of opposite sense in alternation from the intermediate member to the driven member and to the abutment.

67. A variable-speed power transmission comprising a driving member, a driven member, an abutment, an intermediate power transmitting member separate from the driven member, mechanism actuated by the driving member for producing opposite turning moments and alternately applying said moments to the intermediate member, said intermediate member being rotatably supported by the driving member, and means including one-way clutch mechanism for transmitting forces of opposite sense in alternation from the intermediate member to the driven member and to the abutment, parts of said clutch mechanism being in turn supported by said intermediate member.

68. A variable-speed power transmission comprising a driving shaft, a driven shaft, an abutment, mechanism actuated by the driving shaft for alternately producing opposite turning moments, and a plurality of clutches for transmitting the produced opposite turning moments to said driven shaft and said abutment respectively to produce rotation of the driven shaft in selected direction, said clutches comprising a common clutch sleeve and associated detents acting between the common sleeve and the driven shaft on the one hand and between the common sleeve and the abutment on the other hand.

69. A variable-speed power transmission comprising a driving shaft, a driven shaft, an abutment, mechanism actuated by the driving shaft for alternately producing opposite turning moments and a plurality of reversible one-way clutches for transmitting the produced opposite turning moments to said driven shaft and said abutment, said clutches comprising a common clutch sleeve and associated detents acting between the common sleeve and the driven shaft on the one hand and the common sleeve and the abutment on the other hand and means for altering the clutches to reverse the respective directions of grip and release.

70. A variable-speed power transmission comprising a driving shaft, an abutment, mechanism actuated by the driving shaft for alternately producing opposite turning moments, clutch mechanism for transmitting the produced opposite turning moments to said driven shaft and said abutment respectively comprising movable gripping parts, means for altering the clutch mechanism to change the direction of rotation of the driven shaft and means for preventing alteration of the clutch mechanism to change the direction of rotation when said gripping parts are in motion.

71. A variable-speed power transmission comprising a driving shaft, a driven shaft, an abutment, mechanism actuated by the driving shaft for alternately producing opposite turning moments, reversible clutch mechanism for transmitting the produced opposite turning moments to said driven shaft and said abutment respectively, said clutch mechanism comprising a common clutch sleeve and associated detents acting between the common sleeve and the driven shaft on the one hand and between the common sleeve and the abutment on the other hand, and axially displaceable, rotatable mechanism for altering said clutch mechanism to effect selected direction of rotation of said driven shaft.

72. A variable-speed power transmission comprising a driving shaft, a driven shaft, an abutment mechanism actuated by the driving shaft for alternately producing opposite turning moments, reversible clutch mechanism for transmitting the produced opposite turning moments to said driven shaft and said abutment respectively, said clutch mechanism comprising a common clutch sleeve and associated detents acting between the common sleeve and the driven shaft on the one hand and between the common sleeve and the abutment of the other hand, axially displaceable, rotatable mechanism for altering said clutch mechanism to effect selected direction of rotation of said driven shaft, and means for preventing change from one direction of rotation to the reverse direction when parts of the clutch are in motion.

73. A variable-speed power transmission comprising a driving shaft, a driven shaft, an abutment, mechanism actuated by the driving shaft for alternately producing opposite turning moments, a plurality of clutches for transmitting the produced opposite turning moments to said driven shaft and said abutment respectively to produce rotation of the driven shaft in selected direction, said clutches comprising a common clutch sleeve and associated detents, a fly-wheel on said driven shaft, axially displaceable means for altering the clutches to reverse the direction of rotation of the driven shaft, cooperating teeth on said fly-wheel and said displaceable means, and cooperating teeth on said common clutch sleeve and said displaceable means, said cooperating teeth preventing reversal unless said clutches and said fly-wheel have stopped rotating.

74. A variable-speed power transmission comprising a driving shaft, a driven shaft, an abutment, mechanism actuated by the driving shaft for alternately producing opposite turning moments, a plurality of clutches for transmitting the produced opposite turning moments to said driven shaft and said abutment respectively, said clutches comprising a common clutch sleeve and associated roller detents acting between the common sleeve and the driven shaft on the one hand and the common sleeve and the abutment on the other hand, and means for altering the clutches to change the direction of rotation of the driven shaft.

75. A variable-speed power transmission comprising a driving shaft, a driven shaft, an abutment, mechanism actuated by the driving shaft for alternately producing opposite turning moments, a plurality of clutches for transmitting the produced opposite turning moments to said driven shaft and said abutment respectively to produce rotation of the driven shaft in selected direction, said clutches comprising a common clutch sleeve, an action sleeve connected to said driven shaft, a reaction sleeve connected to said abutment, roller detents between said common sleeve and said action sleeve and roller detents between said common sleeve and said reaction sleeve, said action sleeve and said reaction sleeve having surfaces oppositely inclined with respect to the surface of said common sleeve, and means for altering the clutches to reverse the direction of rotation of the driven shaft.

76. A variable-speed power transmission comprising a driving shaft, a driven shaft, an abutment, mechanism actuated by the driving shaft for alternately producing opposite turning moments, a plurality of clutches for transmitting the produced opposite turning moments to said driven shaft and said abutment respectively to produce rotation of the driven shaft in selected direction, said clutches comprising a common clutch sleeve, an action sleeve connected to the driven shaft, a reaction sleeve connected to the abutment, a cage between said common sleeve and said action sleeve, roller detents positioned in said cage and acting between said common sleeve and said action sleeve, a cage between said common sleeve and said reaction sleeve and roller detents positioned in the last mentioned cage and acting between said common sleeve and said reaction sleeve, said action sleeve and reaction sleeve having surfaces oppositely inclined with respect to the surface of said common sleeve, and means for moving said cages rotationally in opposite directions to effect reversal of direction of rotation of the driven shaft.

77. A variable-speed power transmission comprising a driving shaft, a driven shaft, an abutment, mechanism actuated by the driving shaft for alternately producing opposite turning moments, a plurality of clutches for transmitting the produced opposite turning moments to said driven shaft and said abutment respectively to produce rotation of the driven shaft in selected direction, said clutches comprising a common clutch sleeve, an action sleeve connected to the driven shaft, a reaction sleeve connected to the abutment, a cage between said common sleeve and said action sleeve, roller detents positioned in said cage and acting between said common sleeve and said action sleeve, a cage between said common sleeve and said reaction sleeve and roller detents positioned in the last mentioned cage and acting between said common sleeve and said reaction sleeve, said action sleeve and reaction sleeve having surfaces oppositely inclined with respect to the surface of said common sleeve, axially displaceable adjusting sleeves for moving said cages, said adjusting sleeves having axially oblique curved slots therein, radial projections formed on said cages and positioned in said slots, and means for moving said adjusting sleeves axially to cause rotational movement of said cages to effect reversal of direction of rotation of the driven shaft.

78. A variable-speed power transmission comprising a driving shaft, a driven shaft, an abutment, mechanism actuated by the driving shaft for alternately producing opposite turning moments, a plurality of clutches for transmitting the produced opposite turning moments to said driven shaft and said abutment respectively to produce rotation of the driven shaft in selected direction, said clutches comprising a common clutch sleeve, an action sleeve connected to the driven shaft, a reaction sleeve connected to the abutment, a cage between said common sleeve and said action sleeve, roller detents positioned in said cage and acting between said common sleeve and said action sleeve, a cage between said common sleeve and said reaction sleeve and roller detents positioned in the last mentioned cage and acting between said common sleeve and said reaction sleeve, said action sleeve and reaction sleeve having surfaces oppositely inclined with respect to the surface of said common sleeve, axially displaceable adjusting sleeves for moving said cages, each of said adjusting sleeves having an axially oblique slot therein, said slots being oppositely oblique, a radial projection formed on one of said cages and positioned in one of said slots, a radial projection formed on the other of said cages and positioned in the other of said slots, and means for moving said adjusting sleeves together in the same axial direction to cause opposite rotational movement of said cages to effect reversal of direction of rotation of the driven shaft.

79. A variable-speed power transmission comprising a driving shaft, a driven shaft, an abutment, mechanism actuated by the driving shaft for alternately producing opposite turning moments, a plurality of clutches for transmitting the produced opposite turning moments to said driven shaft and said abutment respectively to produce rotation of the driven shaft in selected direction, said clutches comprising a common clutch sleeve, an action sleeve connected to the driven shaft, a reaction sleeve connected to the abutment, a cage between said common sleeve and said action sleeve, roller detents positioned in said cage and acting between said common sleeve and said action sleeve, a cage between said common sleeve and said reaction sleeve and roller detents positioned in the last mentioned cage and acting between said common sleeve and said reaction sleeve, said action sleeve and reaction sleeve having surfaces oppositely inclined with respect to the surfaces of said common sleeve, means for moving said cages rotationally in opposite directions to effect reversal of direction of rotation of the driven shaft, and means for exerting pressure against said roller detents for urging said roller detents into contact with the surface of the common sleeve and the cooperating inclined surfaces.

80. A variable-speed power transmission comprising a driving shaft, a driven shaft, an abutment, mechanism actuated by the driving shaft for alternately producing opposite turning moments, a plurality of clutches for transmitting the produced opposite turning moments to said driven shaft and said abutment respectively to produce rotation of the driven shaft in selected direction, said clutches comprising a common clutch sleeve, an action sleeve connected to the driven shaft, a reaction sleeve connected to the abutment, a cage between said common sleeve and said action sleeve, roller detents positioned in said cage and acting between said common sleeve and said action sleeve, a cage between said common sleeve and said reaction sleeve, roller detents positioned in the last mentioned cage and acting between said common sleeve and said reaction sleeve, said action sleeve and said reaction sleeve having surfaces oppositely inclined with respect to the surface of said common sleeve and springs positioned in and retained by said cages for exerting pressure against said roller detents for urging said roller detents into contact with the surface of the common sleeve and the cooperating inclined surfaces, and means for moving said cages rotationally in opposite directions to effect reversal of direction of rotation of the driven shaft.

81. A variable-speed power transmission comprising a driving shaft, a driven shaft, an abutment, mechanism actuated by the driving shaft for alternately producing opposite turning moments, a plurality of clutches for transmitting the produced opposite turning moments to said driven shaft and said abutment respectively to produce rotation of the driven shaft in selected direction, said clutches comprising a common clutch sleeve, an action sleeve connected to the driven shaft, a reaction sleeve connected to the abutment, a cage between said common sleeve and said action sleeve, roller detents positioned in said cage and acting between said common sleeve and said action sleeve, a cage between said common sleeve and said reaction sleeve, roller detents positioned in the last mentioned cage and acting between said common sleeve and said reaction sleeve, said action sleeve and said reaction sleeve having surfaces oppositely inclined with respect to the surface of said common sleeve and springs positioned in and retained by said cages for exerting pressure against said roller detents for urging said roller detents into contact with the surface of the common sleeve and the cooperating inclined surfaces, the springs in the first mentioned cage being stronger than the springs in the second mentioned cage, and means for moving said cages rotationally in opposite directions to effect reversal of direction of rotation of the driven shaft.

82. A variable-speed power transmission comprising a driving shaft, a driven shaft, an abutment, mechanism actuated by the driving shaft for alternately producing opposite turning moments, a plurality of clutches for transmitting the produced opposite turning moments to said driven shaft and said abutment respectively to produce rotation of the driven shaft in selected direction, said clutches comprising a common clutch sleeve, an action sleeve connected to the driven shaft, a reaction sleeve connected to the abutment, a cage between said common sleeve and said action sleeve, roller detents positioned in said cage and acting between said common sleeve and said action sleeve, a cage between said common sleeve and said reaction sleeve and roller detents positioned in the last mentioned cage and acting between said common sleeve and said reaction sleeve, said action sleeve and reaction sleeve having surfaces oppositely inclined with respect to the surface of said common sleeve, axially displaceable adjusting sleeves for moving said cages rotationally to effect reversal of direction of rotation of the driven shaft, and a shift sleeve for effecting axial movement of the adjusting sleeves.

83. A variable speed power transmission comprising a driving shaft, a driven shaft, an abutment, mechanism actuated by the driving shaft for alternately producing opposite turning moments, a plurality of clutches for transmitting the produced opposite turning moments to said driven shaft and said abutment respectively to produce rotation of the driven shaft in selected direction, said clutches comprising a common clutch sleeve, an action sleeve connected to the driven shaft, a reaction sleeve connected to the abutment, a cage between said common sleeve and said action sleeve, roller detents positioned in said cage and acting between said common sleeve and said action sleeve, a cage between said common sleeve and said reaction sleeve and roller detents positioned in the last mentioned cage and acting between said common sleeve and said reaction sleeve, said action sleeve and reaction sleeve having surfaces oppositely inclined with respect to the surface of said common sleeve, axially displaceable adjusting sleeve for moving said cages rotationally to effect reversal of direction of rotation of the driven shaft, a shift sleeve for effecting axial movement of the adjusting sleeves, and means for preventing axial movement of the shift sleeve to effect reversal unless rotational movement of said common clutch sleeve has ceased.

84. A variable-speed power transmission comprising a driving shaft, a driven shaft, an abutment, mechanism actuated by the driving shaft for alternately producing opposite turning moments, a plurality of clutches for transmitting the produced opposite turning moments to said driven shaft and said abutment respectively to produce rotation of the driven shaft in selected direction, said clutches comprising a common clutch sleeve, an action sleeve connected to the driven shaft, a reaction sleeve connected to the abutment, a cage between said common sleeve and said action sleeve, roller detents positioned in said cage and acting between said common sleeve and said action sleeve, a cage between said common sleeve and said reaction sleeve, and roller detents positioned in the last mentioned cage and acting between said common sleeve and said reaction sleeve, said action sleeve and reaction sleeve having surfaces oppositely inclined with respect to the surface of said common sleeve, axially displaceable adjusting sleeves for moving said cages rotationally to effect reversal of direction of rotation of the driven shaft, a rotationally fixed axially displaceable shift sleeve for effecting axial movement of the adjusting sleeves, and means for preventing axial movement of the shift sleeve to effect reversal unless rotational movement of said common clutch sleeve has ceased, said means comprising cooperating teeth on said shift sleeve and said common clutch sleeve.

85. A variable-speed power transmission comprising a driving shaft, a driven shaft, an abutment, mechanism actuated by the driving shaft for alternately producing opposite turning moments, a plurality of clutches for transmitting the produced opposite turning moments to said driven shaft and said abutment respectively to produce rotation of the driven shaft in selected direction, said clutches comprising a common clutch sleeve, an action sleeve connected to the driven shaft, a reaction sleeve connected to the abutment, a cage between said common sleeve and said action sleeve, roller detents positioned in said cage and acting between said common sleeve and said action sleeve, a cage between said common sleeve and said reaction sleeve and roller detents positioned in the last mentioned cage and acting between said common sleeve and said reaction sleeve, said action sleeve and reaction sleeve having surfaces oppositely inclined with respect to the surface of said common sleeve, axially displaceable adjusting sleeves for moving said cages rotationally to effect reversal of direction of rotation of the driven shaft, a shift sleeve for effecting axial movement of the adjusting sleeves, a fly-wheel on the driven shaft, and means to prevent axial movement of the shift sleeve to effect reversal unless rotation of the driven shaft has ceased, said means comprising cooperating teeth on said fly-wheel and said shift sleeve.

86. A variable-speed power transmission comprising driving mechanism for producing oppositely directed forces, a driven member, a clutch assembly comprising reversible elements adapted to transmit forces in selected direction from the driving mechanism to the driven member, means for reversing said clutch elements, means for arresting movement of the clutch assembly in the direction opposite the selected direction comprising an abutment and a releasable coupling between the clutch assembly and the abutment, and means operated by the reversing means to effect release of the coupling upon abnormal resistance to actuation of the reversing means and operating to automatically reengage the coupling upon cessation of said abnormal resistance.

87. A variable-speed power transmission comprising driving means for producing forces of alternately opposite sense; a driven member; an abutment; and mechanism including an intermediate power transmitting member actuated by the driving means, a one-way roller clutch for transmitting forces of one sense from the intermediate member to the driven member, and a second one-way roller clutch for transmitting forces of opposite sense to the abutment, said first mentioned clutch comprising a roller cage adapted to rotate with said driven member.

88. A variable-speed power transmission comprising driving means for producing forces of alternately opposite sense; a driven member; an abutment; mechanism including an intermediate power transmitting member for receiving the produced forces, a reversible one-way roller clutch for transmitting forces of one sense from the intermediate member to the driven member, said clutch comprising a roller cage adapted to rotate with said driven member and capable of relative rotational movement with respect thereto, a second reversible one-way roller clutch for transmitting forces of the opposite sense from the intermediate member to the abutment, said last mentioned clutch comprising a roller cage capable of relative rotational movement with respect to said abutment; and means for moving said cages rotationally with respect to the driven member and the abutment to effect reversal of the clutches.

89. A variable-speed power transmission comprising clutch mechanism and driving means therefor rotatably mounted about the axis of the transmission, said driving means comprising parts requiring lubrication and located radially farther from said axis than said clutch mechanism, means for conducting a supply of oil to said clutch mechanism, and passages forming a path for axial and radial flow of oil under the influence of centrifugal force to lubricate first the clutch mechanism and then said driving means.

90. A variable-speed power transmission comprising driving means including inertia masses and bearings for rotatably mounting the same, rotatably mounted clutch mechanism for transmitting forces developed by the rotation of said masses, said bearings comprising parts requiring lubrication located radially farther from the axis of the transmission than said clutch mechanism, and means for conducting a continuous supply of oil to the clutch mechanism and for directing it axially therethrough due to centrifugal force, said oil being discharged from the clutch mechanism at a point such that it is caused to flow from the clutch mechanism to said bearings due to centrifugal force.

91. A variable-speed power transmission comprising driving means mounted to rotate about the axis of the transmission for producing a series of forces, a driven member, an abutment, axially extending clutch mechanism mounted to rotate about the axis of the transmission for transmitting the produced forces in alternation to the abutment and the driven member, said driving means comprising parts requiring lubrication and located radially farther from said axis than said clutch mechanism, means for conducting a continuous supply of oil to said clutch mechanism, and passages forming a path for flow of oil for causing it to flow axially over the clutch mechanism and radially therefrom to said parts of the driving means under the influence of centrifugal force due to operation of the transmission.

92. A variable-speed power transmission comprising a driving member, mechanism actuated by the driving member for alternately producing turning moments of opposite sense, a driven member, an abutment, rotatable clutch mechanism for transmitting the produced forces in alternation to the driven member and the abutment, said mechanism comprising a plurality of axially arranged gripping detents and means utilizing centrifugal force due to rotation of said clutch mechanism for causing oil to flow axially between said detents.

93. A variable-speed power transmission comprising a driving member, mechanism actuated by the driving member for alternately producing turning moments of opposite sense, a driven member, an abutment, rotatable clutch mechanism for transmitting the produced turning moments in alternation to the driven member and the abutment, said mechanism comprising a plurality of axially arranged gripping detents, and means utilizing centrifugal force due to rotation of said clutch mechanism for causing oil to flow first axially between said detents and then radially to said first mentioned mechanism.

94. A variable-speed power transmission comprising a driving member, mechanism actuated by the driving member for alternately producing turning moments of opposite sense, a driven member, an abutment, rotatable clutch mechanism for transmitting the produced turning moments in alternation to the driven member and the abutment, said clutch mechanism including an axially extending annular member and axially positioned gripping detents within said member, means for conducting oil to the interior of said member, and means for causing the oil to flow axially of said member between said detents comprising passages axially remote from the discharge end of said oil conducting means, said passages acting to discharge oil radially from said member due to centrifugal force.

95. In a variable-speed power transmission comprising clutch mechanism having rotatably mounted parts requiring lubrication, a circulating lubrication system comprising means for conducting oil continuously to said clutch mechanism, means for retaining the oil supplied to said mechanism and causing it to flow axially therethrough under the influence of centrifugal force, and means for continuously conducting from the transmission the oil which has passed through said mechanism and been discharged therefrom.

96. In a variable-speed power transmission comprising a casing, clutch mechanism having rotating parts and rotating means for actuating said mechanism, a circulating lubrication system comprising means for conducting oil continuously to said clutch mechanism, means for causing the oil to flow axially through the clutch mechanism and to be discharged radially therefrom under the influence of centrifugal force due to rotation of some of said clutch parts, the lower part of said casing forming a receptacle for receiving the oil discharged from the clutch mechanism, and means cooperating with said rotating means for effecting continuous removal of the oil from the lower part of the casing.

97. In a variable-speed power transmission comprising a casing, clutch mechanism including rotating parts requiring lubrication and means for actuating said clutch mechanism including rotating members requiring lubrication, a circulating lubrication system comprising means for conducting oil continuously to the clutch mechanism, means for causing the oil to flow axially through the clutch mechanism and to be discharged therefrom under the influence of centrifugal force due to rotation of said clutch parts, passages for directing the discharged oil to the rotating members, means forming a pocket in said casing for receiving the oil discharged from said rotating members by centrifugal force and means for conducting oil from said pocket.

98. In a variable-speed power transmission comprising a casing, a driving member, means actuated by said driving member for producing a series of forces and clutch mechanism for transmitting the produced forces, a circulating lubrication system comprising means for conducting oil continuously to the clutch mechanism, means for causing the oil to flow under the influence of centrifugal force first through the clutch mechanism and then to said first named means to lubricate the same, the lower part of said casing forming an oil-receiving space for collecting the oil discharged from said first named means, said driving member extending into said space, means forming a pocket in said casing above the level of said space, said driving member operating upon rotation to lift oil from said space to said pocket, and means for conducting oil from said pocket.

99. A variable-speed power transmission comprising a driving member, a rotatable driven sleeve, an intermediate power transmitting sleeve separate from the driven sleeve, means actuated by the driving member for producing a series of forces and applying said forces to the intermediate sleeve, said sleeves being concentrically mounted and relatively rotatable, clutch mechanism comprising gripping members acting between said sleeves to transmit forces from the intermediate sleeve to the driven sleeve, and means for causing oil to flow axially between said sleeves to lubricate said gripping members.

100. A variable-speed power transmission comprising a driving member, a rotatable driven sleeve, an intermediate power transmitting sleeve separate from the driven sleeve, means actuated by the driving member for producing a series of forces and applying said forces to the intermediate sleeve, said sleeves being concentrically mounted and relatively rotatable, clutch mechanism comprising gripping members acting between said sleeves to transmit forces from the intermediate sleeve to the driven sleeve, and means for causing oil to flow axially between said sleeves to lubricate said gripping members, said means comprising a conduit for supplying oil to the interior of the outer of said sleeves at one end thereof, and an oil retaining rib at the inlet end of the outer sleeve.

101. A variable-speed power transmission comprising a driving member, a rotatable driven sleeve, an intermediate power transmitting sleeve separate from the driven sleeve, means actuated by the driving member for producing a series of forces and applying said forces to the intermediate sleeve, an abutment, a reaction sleeve connected to said abutment, both said driven sleeve and said reaction sleeve being concentrically mounted with respect to the intermediate sleeve, clutch mechanism comprising gripping members acting between the intermediate sleeve and the driven sleeve and between the intermediate sleeve and the reaction sleeve, and means for causing oil to flow axially between the intermediate sleeve and the driven sleeve and axially between the intermediate sleeve and the reaction sleeve.

102. A variable-speed power transmission comprising a driving member, an intermediate power transmitting sleeve having openings therein, means actuated by the driving member for producing a series of forces and applying said forces to the intermediate sleeve, a rotatable driven sleeve concentrically mounted within said intermediate sleeve, an abutment, a reaction sleeve connected to said abutment and concentrically mounted within said intermediate sleeve, clutch mechanism comprising reversible gripping members acting between the intermediate sleeve and the driven sleeve and between the intermediate sleeve and the reaction sleeve, means for effecting reversal of said gripping members comprising elements extending through the openings in said intermediate sleeve, and means for causing oil to flow axially from end to end of said intermediate sleeve comprising a conduit for supplying oil to the inner surface of the intermediate sleeve at one end thereof, an oil retaining rib at the inlet end of said intermediate sleeve, and oil retaining ribs around the openings in said intermediate sleeve.

103. A variable-speed power transmission comprising a driving member, mechanism actuated by said driving member for alternately producing turning moments of opposite sense, a driven member, an abutment, clutch mechanism including a plurality of concentrically mounted sleeves for transmitting the produced moments of opposite sense to said driven member and said abutment respectively, means for causing oil to flow axially between said concentrically mounted sleeves, and means for conducting oil flowing from between said sleeves to said first mentioned mechanism.

104. A variable-speed power transmission comprising a driving member, mechanism actuated by said driving member for alternately producing turning moments of opposite sense, a driven member, an abutment, clutch mechanism for transmitting the produced moments of opposite sense to said driven member and said abutment respectively comprising an intermediate force-transmitting sleeve and a plurality of force-receiving sleeves, each of said force-receiving sleeves being concentrically mounted with respect to the force-transmitting sleeve, means for causing oil to flow axially first between the force-transmitting sleeve and one of the force-receiving sleeves and next between the force-transmitting sleeve and a second of the force-receiving sleeves and means for conducting oil from between said last mentioned sleeves to said first mentioned mechanism.

105. In a variable-speed power transmission, a driving member, a driven member, an abutment, means actuated by the driving member for alternately producing opposite turning moments, reversible clutch mechanism including an intermediate power transmitting member to which the produced turning moments are applied for transmitting the produced opposite turning moments to the driven member and to the abutment respectively, said intermediate member being axially movable to reverse the direction of drive through said clutch mechanism, and means for moving said intermediate member.

106. In a variable-speed power transmission, a driving member, a driven member, an abutment, an intermediate power transmitting member, mechanism actuated by the driving member for alternately producing opposite turning moments and applying said turning moments to said intermediate member, parts co-acting with one portion of said intermediate member to provide a reversible action clutch for transmitting turning moments of selected sense from the intermediate member to the driven member, and parts co-acting with another portion of said intermediate member to provide a reaction clutch for transmitting turning moments of a sense opposite the selected sense from the intermediate member to the abutment, said intermediate member being axially movable to effect reversal of the sense of force transmission through said clutches.

107. In a variable-speed power transmission, a driving member, a driven member, an abutment, an intermediate power transmitting member, mechanism actuated by the driving member for alternately producing opposite turning moments and applying said turning moments to said intermediate member, parts including two sets of gripping detents adapted to co-act with said intermediate member to provide an action clutch for transmitting turning moments of selected sense from the intermediate member to the driven member, one of said sets of detents being arranged to transmit turning moments of one sense from the intermediate member to the driven member and the other of said sets being arranged to transmit turning moments of the opposite sense from the intermediate member to the driven member, said sets of detents being arranged to alternatively engage said intermediate member, said intermediate member being axially movable with respect to said detents to bring one or the other of said sets into engagement with the same, and means for transmitting to said abutment turning moments of a sense opposite that of the turning moments transmitted to the driven member.

108. In a variable-speed power transmission, a driving member, a driven member, an abutment, an intermediate power transmitting member, mechanism actuated by the driving member for alternately producing opposite turning moments and applying said turning moments to said intermediate member, a plurality of reversible one-way clutches for transmitting the produced turning moments to the driven member and to the abutment respectively, said clutches including said intermediate member and each of said clutches comprising two sets of roller detents, said sets of detents being arranged to grip and release in opposed relations respectively and being axially displaceable with respect to said intermediate member to alternatively engage the same, and means for causing relative axial movement between said roller detents and said member to reverse said clutches.

109. A variable-speed power transmission comprising a driving member, a driven member, an abutment, means actuated by the driving member for alternately producing opposite turning moments, means including reversible one-way clutch mechanism for transmitting the produced opposite turning moments in alternation to the driven member and to the abutment, and a friction plate coupling between the clutch mechanism and the abutment, said coupling being releasable to relieve the clutch mechanism from stress before effecting reversal thereof.

110. In a variable-speed power transmission, a driving member, a rotatable driven member, an abutment, a reversible one-way clutch for transmitting force from the driving member to the driven member, a reversible one-way clutch for transmitting force from the driving member to the abutment, and a releasable coupling between said last named clutch and the abutment, said coupling comprising a plurality of parallel friction plates secured to the last mentioned clutch and arranged transverse to the axis of rotation of the driven member, a plurality of parallel friction plates secured to said abutment and arranged alternately with respect to the first mentioned plates and means axially movable to release said plates from frictional engagement.

111. In a variable-speed power transmission, a driving member, a driven member, an abutment, a reversible one-way clutch for transmitting force from the driving member to the driven member, a reversible one-way clutch for transmitting force from the driving member to the abutment, mechanism for reversing said clutches, a releasable coupling comprising a plurality of friction plates between the last mentioned clutch and the abutment, and means adapted to be moved axially by said mechanism to release said plates from frictional engagement upon abnormal resistance to actuation of said mechanism.

In testimony whereof I have hereunto affixed my signature.

FREDRIK LJUNGSTRÖM.